(12) United States Patent
Okawara

(10) Patent No.: US 6,314,240 B1
(45) Date of Patent: *Nov. 6, 2001

(54) LENS CONTROL APPARATUS

(75) Inventor: Hiroto Okawara, Toride (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/803,551

(22) Filed: Feb. 20, 1997

Related U.S. Application Data

(63) Continuation of application No. 08/427,490, filed on Apr. 24, 1995, now abandoned, which is a continuation of application No. 08/083,545, filed on Jun. 25, 1993, now abandoned.

(30) Foreign Application Priority Data

| Jun. 29, 1992 | (JP) | 04-196329 |
| Aug. 11, 1992 | (JP) | 04-235302 |
| Aug. 11, 1992 | (JP) | 04-235303 |
| Aug. 11, 1992 | (JP) | 04-235305 |
| Aug. 11, 1992 | (JP) | 04-235306 |

(51) Int. Cl.$^7$ .................................................. G03B 17/00
(52) U.S. Cl. ........................... 396/81; 396/82; 396/87
(58) Field of Search ................................ 396/72, 75, 77, 396/81, 82, 85, 87

(56) References Cited

U.S. PATENT DOCUMENTS

| 4,920,369 | 4/1990 | Kaneda et al. | 354/400 |
| 5,027,147 | 6/1991 | Kaneda | 354/400 |
| 5,060,001 | 10/1991 | Kaneda | 354/400 |
| 5,164,756 | * 11/1992 | Hirasawa | 354/400 |
| 5,173,807 | * 12/1992 | Kaneda et al. | 359/698 |
| 5,200,860 | * 4/1993 | Hirasawa et al. | 359/696 |
| 5,202,717 | * 4/1993 | Ookubo et al. | 354/400 |
| 5,202,992 | * 4/1993 | Banno et al. | 359/684 |
| 5,210,566 | * 5/1993 | Nishida | 354/402 |
| 5,212,516 | * 5/1993 | Yamada et al. | 354/402 |
| 5,212,557 | * 5/1993 | Lleda | 358/228 |
| 5,212,598 | * 5/1993 | Kikuchi | 359/823 |
| 5,223,981 | * 6/1993 | Kaneda | 359/698 |
| 5,235,428 | * 8/1993 | Hirota | 358/227 |
| 5,249,058 | * 9/1993 | Murata et al. | 358/227 |
| 5,264,890 | * 11/1993 | Komiya | 354/402 |
| 5,287,223 | * 2/1994 | Hirasawa | 359/697 |
| 5,323,200 | 6/1994 | Hirasawa | 351/195 |
| 5,363,165 | * 11/1994 | Kawasaki et al. | 354/195.12 |
| 5,436,684 | * 7/1995 | Hirasawa | 354/195.12 |
| 5,438,190 | * 8/1995 | Kanoda et al. | 359/698 |

FOREIGN PATENT DOCUMENTS

| 0456234 | 11/1991 | (EP) . |
| 0479671 | 4/1992 | (EP) | H04N/5/232 |

OTHER PUBLICATIONS

U.S. Patent Application No. 08/559,717, filed Nov. 15, 1995 (continuation of U.S. Serial No. 083,005, filed Jun. 24, 1993).

* cited by examiner

Primary Examiner—Christopher E. Mahoney
(74) Attorney, Agent, or Firm—Robin, Blecker & Daley

(57) ABSTRACT

In a lens control apparatus for detecting a magnification lens position and a focus compensation lens and controlling a focus compensation position in zooming such that a focused position of the focus compensation lens with respect to a discrete magnification lens position is controlled with reference to a stored table in accordance with an object distance, when the magnification lens position and the focus compensation lens position are not stored in the table, the focus compensation lens position is estimated from the table data and the current lens positions.

21 Claims, 33 Drawing Sheets

FIG. 12

STORAGE TABLE

→ COLUMN DIRECTION

| | NUMBER m OF CAMS | | ZOOM AREA |
|---|---|---|---|
| $a_0$, | $b_0$, | ------ $I_0$, | 0 |
| $a_1$, | $b_1$, | ------ $I_1$, | 1 |
| $a_2$, | $b_2$, | ------ $I_2$, | 2 |
| ⋮ | ⋮ | ⋮ | ⋮ |
| $a_{11}$, | $b_{11}$, | ------ $I_{11}$, | 11 |
| ⋮ | ⋮ | ⋮ | ⋮ |
| $a_n$, | $b_n$, | ------ $I_n$, | n |

↑ ROW DIRECTION

↑ CAMa (OBJECT DISTANCE ∞)   ↑ CAMb   ↑ CAMl

FORM TABLE UNDER CONDITION OF $a(n) \neq b(n) \neq$ ------ $\neq I(n)$

| n<br>z | 0 | 1 | 2 | ------- | k | ------- | m |
|---|---|---|---|---|---|---|---|
| 0 | $A_{00}$ | $A_{10}$ | $A_{20}$ | ------- | $A_{k0}$ | ------- | $A_{m0}$ |
| 1 | $A_{01}$ | $A_{11}$ | $A_{21}$ | ------- | $A_{k1}$ | ------- | $A_{m1}$ |
| 2 | $A_{02}$ | $A_{12}$ | $A_{22}$ | ------- | $A_{k2}$ | ------- | $A_{m2}$ |
| ⋮ | ⋮ | ⋮ | ⋮ | ⋮ | | | ⋮ |
| k | $A_{0k}$ | $A_{1k}$ | $A_{2k}$ | ------- | $A_{kk}$ | ------- | $A_{mk}$ |
| ⋮ | ⋮ | ⋮ | ⋮ | ⋮ | | | ⋮ |
| ℓ | $A_{0\ell}$ | $A_{1\ell}$ | $A_{2\ell}$ | ------- | $A_{k\ell}$ | ------- | $A_{m\ell}$ |

FIG. 24A
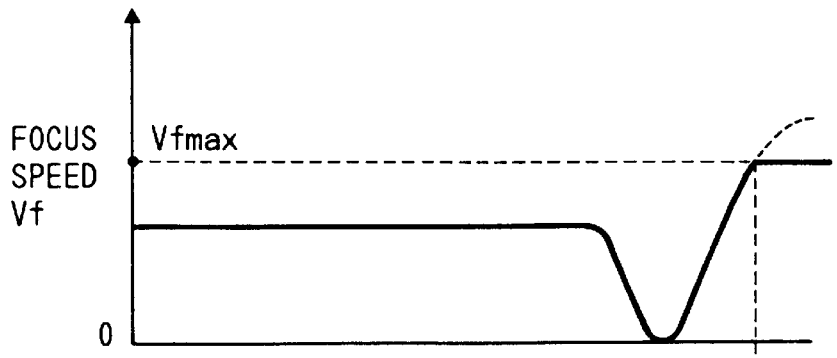
FIG. 24B
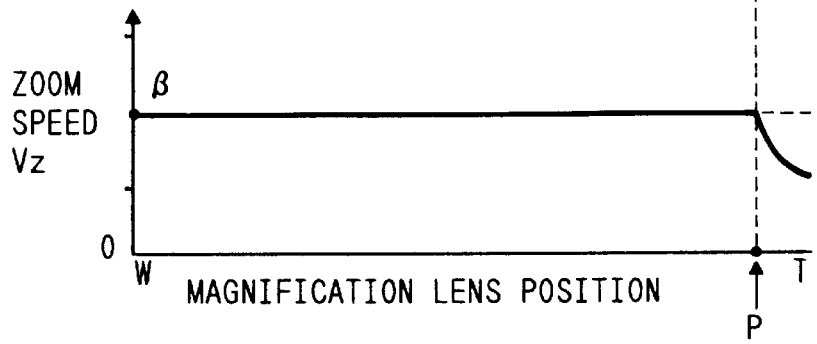
FIG. 25A
| n | 0 | 1 | 2 | ------- | k | ------- | m |
|---|---|---|---|---------|---|---------|---|
| Vfmax | B₀ | B₁ | B₂ | ------- | Bk | ------- | Bm |
FIG. 25B
| Vz | α | β | γ |
|----|---|---|---|
| Vfmax | Bα | Bβ | Bγ |

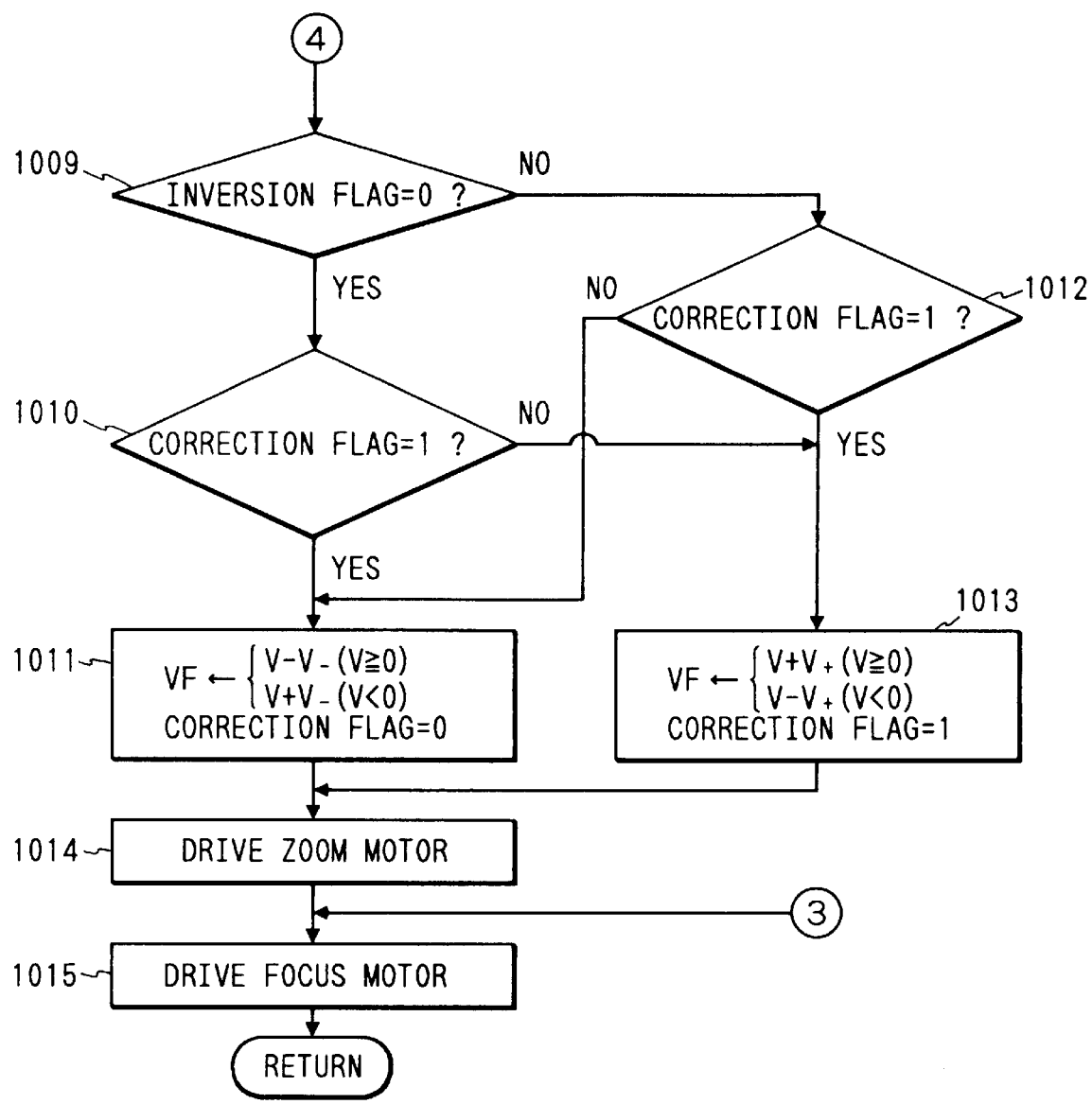

| MAGNIFICATION LENS POSITION | WIDE | MIDDLE | TELE |
|---|---|---|---|
| $\gamma$ | 1 | 0.8 | 2 |

| IRIS VALUE | 0, 1 | 2 | 3 | 4 | 5 | 6 | 7 | 8~10 |
|---|---|---|---|---|---|---|---|---|
| $\gamma$ | 1 | 1.4 | 2 | 2.8 | 4 | 5.6 | 8 | 11 |

| OBJECT | NORMAL | HIGH LUMINANCE |
|---|---|---|
| $\gamma$ | 1 | 2 |

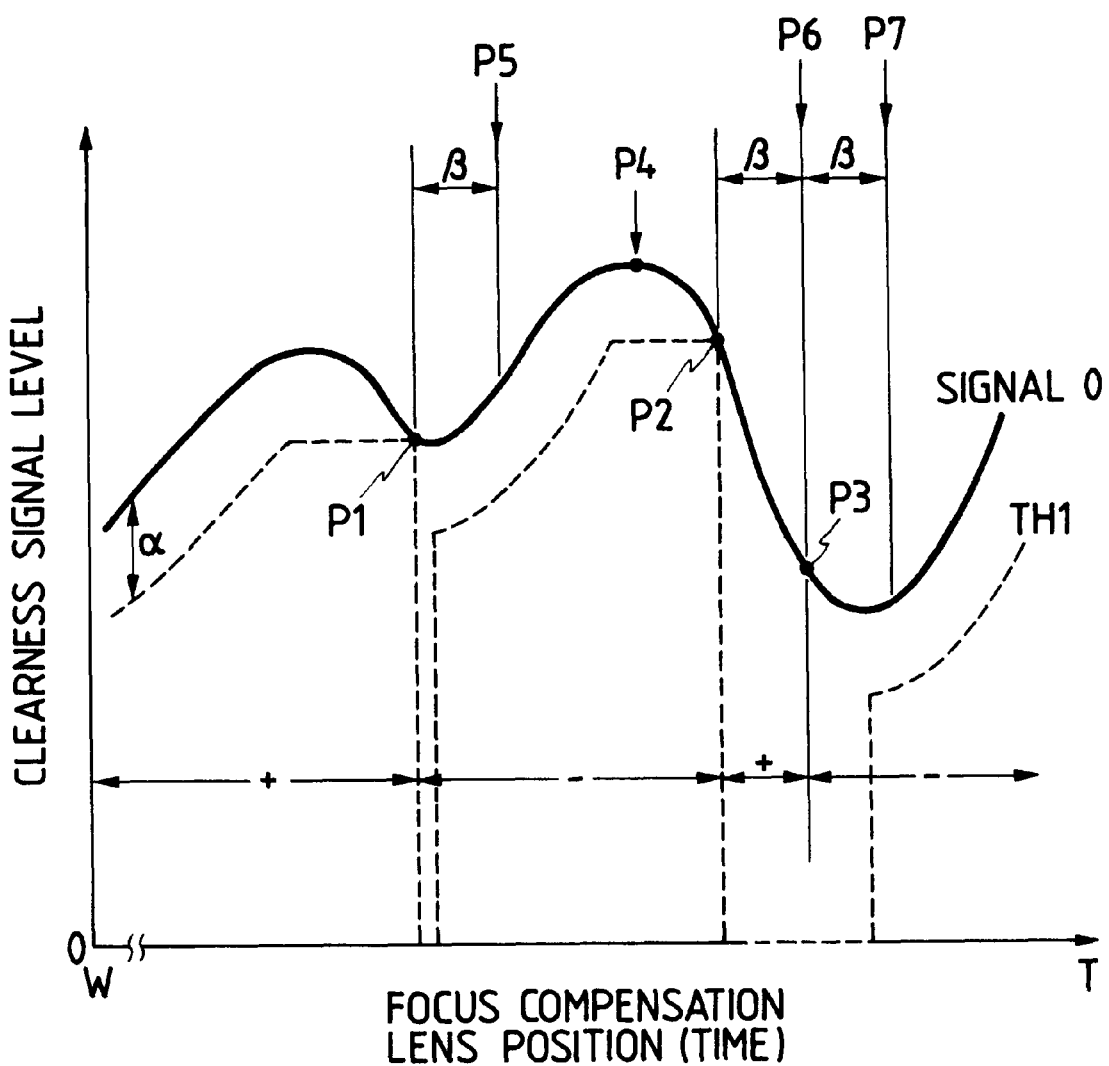

LENS CONTROL APPARATUS

This is a continuation divisional application under 37 CFR 1.62 of prior application Ser. No. 08/427,490 filed on Apr. 24, 1995 (aban.), which is a continuation Ser. No. 08/083,545 filed Jun. 25, 1993 (aban.).

BACKGROUND OF THE INVENTION

1. Field of the Invention

The present invention relates to a lens control apparatus for controlling a lens moving parallel to an optical axis in an inner focus type lens system. Related Art of the Invention

2. Related Background Art

FIG. 1 is a view showing the structure of an inner focus type lens system. An inner focus type lens system 1 includes a first fixed lens 2, a magnification lens 3, an iris 4, a second fixed lens 5, and a focus compensation lens 6, all of which are sequentially arranged from the left object side to the right side along the optical axis. The magnification lens 3 is moved parallel to the optical axis to perform magnification. The focus compensation lens 6 has a focus control function upon parallel movement along the optical axis and a so-called compensation function of correcting movement of a focal plane upon magnification. An optical object image obtained by the lens system 1 is focused on an image pickup surface 7a of an image pickup element 7 and is photoelectrically converted into a video signal.

In the lens system 1 having the arrangement described above, if the focal length remains the same, the position of the focus compensation lens 6 for focusing an object image on the image pickup surface 7a of the image pickup element 7 varies depending on object distances because the focus compensation lens 6 has both the compensation function and the focus control function.

When the object distance is changed at the respective focal lengths, and the positions of the focus compensation lens 6 for focusing object images on the image pickup surface 7a are continuously plotted, the result is obtained, as shown in FIG. 2. Under magnification, a locus (FIG. 2) corresponding to an object distance is selected. When the focus compensation lens 6 is moved in accordance with the selected locus, zooming free from blurring can be performed.

In a front-element focus type lens system, a compensation lens independently of a magnification lens is arranged, and the magnification lens is coupled to the compensation lens through a mechanical cam ring. For example, when a manual zoom knob is attached to this cam ring to manually change the focal length, the cam ring can follow the quick movement of the knob, and the magnification lens and the compensation lens are moved along the cam groove of the cam ring. If the focus lens is set in a focused condition, blurring will not occur.

In control of an inner focus type lens system having the above characteristic feature, a plurality of pieces of lens locus information shown in FIG. 2 are stored in a lens control microcomputer in any form. A proper lens locus is selected in accordance with the positions of the magnification lens 3 and the focus compensation lens 6. Zooming is thus generally performed in accordance with the selected locus.

The position of the focus compensation lens 6 with respect to the position of the magnification lens 3 is read out from a storage element to control the lenses 3 and 6. Read access of the positions of the lenses 3 and 6 must be performed with high precision. In particular, as can be apparent from FIG. 2, when the magnification lens 3 is moved at a constant speed or a speed close thereto, the inclination of the locus of the focus compensation lens 6 is instantaneously changed in accordance with a change in focal length. This indicates that the speed and orientation of the movement of the focus compensation lens 6 are instantaneously changed. In other words, the actuator for the focus compensation lens 6 must have a high-precision speed response of 1 Hz to several hundreds of Hz.

As a focus compensation lens drive actuator in an inner focus type lens system which satisfies the above requirement, a stepping motor is generally used. This stepping motor rotates in perfect synchronism with a stepping pulse output from the lens control microcomputer. High speed response precision and stop precision, and positional precision can be obtained because a stepping angle per pulse is predetermined.

The stepping pulses for the stepping motor can be used for an increment type position encoder because a rotation angle corresponding to a stepping pulse count is predetermined. Any special position encoder need not be used.

As described above, when a magnification operation is to be performed using a stepping motor while maintaining a focused condition, the locus information in FIG. 2 must be stored in the lens control microcomputer or the like in any form (i.e., a locus itself or a function using a lens position as a variable), and proper locus information is read out in correspondence with a given position or moving speed of the magnification lens. The focus compensation lens must be moved on the basis of the readout locus information.

FIG. 3 is a view for explaining a locus tracking method proposed prior to the present invention. Referring to FIG. 3, the focus compensation lens position is plotted along the ordinate, and the magnification lens position is plotted along the abscissa. Positions $z_0$, $z_1$, $z_{d\ 2}$, . . . $z_{11}$ represent magnification lens positions, and loci $a_0$, $a_1$, $a_2$, . . . , $a_{11}$, and loci $b_0$, $b_1$, $b_2$, . . . , $b_{11}$ represent typical lens loci stored in the lens control microcomputer. Loci $p_0$, $p_1$, $p_2$, . . . , $p_{11}$ represent lens loci calculated on the basis of the above two different loci stored in the lens control microcomputer. The calculation equation of this lens locus will be described below:

$$p_{(n+1)} = |p_{(n)} - a_{(n)}| / |b_{(n)} - a_{(n)}| \times |b_{(n+1)} - a_{(n+1)}| + a_{(n+1)} \quad (1)$$

According to equation (1), when the focus compensation lens is located on the locus $p_0$ in FIG. 3, the locus $p_0$ calculates a ratio which interpolates a line segment $b_0$–$a_0$, and a point which interpolates a line segment $b_1$–$a_1$ is defined as $p_1$ in accordance with the resultant ratio.

In this case, however, when the magnification lens position is not located on a zoom boundary (i.e., any of the positions $z_0$, $z_1$, . . . , $z_{11}$ in FIG. 3), i.e., when the magnification lens position and the focus compensation lens positions are given as $Z_x$ and $P_x$, respectively, the locus tracking position is not updated. For example, when the focus compensation lens position is changed from $P_x$ to $Q_x$ in FIG. 3 in accordance with AF (auto-focus) information changing in correspondence with a change in object distance in zooming in the AF mode, the locus tracking position is not immediately updated to cause blurring. When the moving speed of the magnification lens increases as in high-speed zooming, a period for causing the magnification lens position to update a zoom zone on a zoom boundary (i.e., a time required to move the magnification lens from $Z_{(n)}$ to $Z_{(n+1)}$ is shorter than the period of local tracking position calculation of the microcomputer. For this reason, the locus tracking position cannot be updated on all the zoom boundaries. As a result, blurring frequently occurs.

In the above case, when the magnification lens position is not located on the zoom boundary (i.e., any of the positions $z_0, z_1, z_2, \ldots, z_{11}$ in FIG. 3), i.e., when the magnification lens position and the focus compensation lens position are $Z_x$ and $P_x$, respectively, locus data is not available in the lens control microcomputer. In this case, positions $a_x$ and $b_x$ in FIG. 3 must be calculated, and $p_{(n+1)}$ must be obtained by substituting $a_{(n)}=a_x$ and $b_{(n)}=b_x$, and $p_{(n)}=p_x$ into conventional equation (1). Processing thus becomes complicated, and calculation errors may be accumulated. As a result, trouble occurs in zooming in the focused condition.

SUMMARY OF THE INVENTION

The present invention has been made in consideration of the above situation, and has as its first object to provide a lens control apparatus capable of achieving zooming free from blurring in a focused condition against a change in zoom speed as in high-speed zooming or the like and a change in object distance.

It is the second object of the present invention to provide a lens control apparatus capable of performing interpolation type locus tracking zooming and enabling zooming free from blurring in a small processing volume within a short period of processing time.

In order to achieve the first object according to the first embodiment of the present invention, there is disclosed a lens control apparatus including lens position detecting means for detecting a position of a magnification lens and a position of a focus compensation lens, lens moving means for moving the magnification and focus compensation lenses to be parallel to an optical axis, and recording means for recording a focused position of the focus compensation lens with respect to a discrete position of the magnification lens in accordance with an object distance, comprising estimating means for estimating a lens moving target position by a calculation using the position of the magnification lens, the position of the focus compensation lens, discretely stored lens position information when the magnification lens is not located at the discrete position of the magnification lens.

In order to achieve the second object according to the second embodiment of the present invention, there is disclosed a lens control apparatus including lens position detecting means for detecting a position of a magnification lens and a position of a focus compensation lens, lens moving means for moving the magnification and focus compensation lenses to be parallel to an optical axis, and recording means for recording a focused position of the focus compensation lens with respect to a discrete position of the magnification lens in accordance with an object distance, comprising control means for inhibiting to stop the magnification lens at a position except for the discrete position of the magnification lens.

In the lens control apparatus of the first embodiment, when the magnification lens is not located at the discrete position of the magnification lens, the estimating means calculates and estimates the lens moving target position in accordance with the position of the magnification lens, the position of the focus compensation lens, and the discretely stored lens position information.

Even at a magnification lens position whose lens locus information is not stored in the lens control microcomputer, zooming free from blurring in a focused condition can be performed in high-speed zooming and upon a change in object distance in the zoom mode in accordance with the interpolation calculation of the magnification lens position.

In the lens control apparatus of the second embodiment, the control means controls not to stop the magnification lens at a position except for discrete magnification lens position.

Interpolation type locus tracking zooming can be performed by simple processing. At the same time, if the zoom area is divided into a certain number of zones, processing is almost the same as in a complicated interpolation calculation. Zooming free from blurring in a small processing volume within a short period of time can be performed without degrading performance.

It is the third object of the present invention to save the processing volume and the processing time in zooming in an AF OFF condition (i.e., a condition in which blurring in zooming cannot be corrected by AF) and to perform zooming while maintaining an accurately focused condition.

In order to achieve the third object according to the third embodiment of the present invention, there is disclosed a lens control apparatus including a first lens for performing a magnification operation, a second lens for correcting movement of a focal plane during movement of the first lens, lens moving means for independently moving the first and second lenses to be parallel to an optical axis, and focused position storage means for prestoring a focused position of the second lens with respect to a discrete position of the first lens in accordance with a discrete object distance, comprising object distance specifying means for specifying an object distance on the basis of the current positions of the first and second lenses and information stored in the focused position storage means when manual focus control is performed while a position of the first lens is fixed, and focused position calculating means for calculating a focused position of the second lens with respect to a moving position of the first lens on the basis of the object distance specified by the object distance specifying means and the information stored in the focused position storage means when the first lens is moved by the lens moving means to perform a magnification operation.

The first lens serves as a lens for performing the magnification operation, and the second lens serves as a lens for correcting movement of the focal plane during movement of the first lens. The lens moving means independently moves the first and second lenses to be parallel to the optical axis. The focused position storage means prestores the focused position of the second lens with respect to the discrete position of the first lens in accordance with the discrete object distance of the first lens.

The object distance specifying means specifies the object distance on the basis of the current positions of the first and second lenses and the information stored in the focused position storage means when the focus control is manually performed while the first lens position is fixed.

When the first lens is moved by the lens moving means to perform the magnification operation, the focused position calculating means calculates the focused position of the second lens with respect to the moving position of the first lens on the basis of the object distance specified by the object distance specifying means and the information stored in the focused position storage means.

It is the fourth object of the present invention to increase the resolution of the magnification lens position as in high-speed zooming without increasing the number of focusing lens locus data, to appropriately update the moving speed of a focus compensation lens, and to perform zooming having good focusing lens locus tracking characteristics.

In order to achieve the fourth object according to still another preferred embodiment, there is disclosed a lens control apparatus including a first lens for performing a magnification operation, a second lens for correcting movement of a focal plane during movement of the first lens, lens moving means for independently moving the first and second lenses to be parallel to an optical axis, focused position storage means for prestoring a focused position of the second lens with respect to a discrete position of the first lens in accordance with a discrete object distance, and focused position calculating means for calculating a focused position of the second lens with respect to a moving position of the first lens on the basis of current positions of the first and second lenses and information stored in the focused position storage means, comprising moving speed calculating means for calculating a moving speed of the second lens in accordance with a difference between the current position of the second lens and the focused position calculated by the focused position calculating means every time the first lens passes by the discrete position of the first lens which is stored in the focused position storage means during movement of the first lens.

It is the fifth object of the present invention to provide a lens control apparatus capable of always maintaining a focused condition by smoothly controlling a magnification lens moving speed by a simple arrangement and simple control, and capable of performing quick, natural speed reduction while always maintaining the focused condition without causing an unnatural movement of a focus compensation lens in a range falling outside a step-out limitation of a stepping motor and without causing an uncomfortable frame upon repetition of zoom acceleration/speed reduction.

In order to achieve the fifth object according to still another embodiment of the present invention, there is disclosed a lens control apparatus including a first lens for performing a magnification operation, a second lens for correcting movement of a focal plane during movement of the first lens, a stepping motor for moving the first lens to be parallel to an optical axis, lens moving means for moving the second lens to be parallel to the optical axis, focused position storage means for prestoring a focused position of the second lens with respect to a discrete position of the first lens in accordance with a discrete object distance, and focused position calculating means for calculating a focused position of the second lens with respect to a moving position of the first lens on the basis of current positions of the first and second lenses and information stored in the focused position storage means, comprising control means for controlling the stepping motor to change a moving speed of the first lens when a moving speed of the second lens exceeds a predetermined value during movement of the first lens.

It is the sixth object of the present invention to perform zooming while maintaining focusing precision always exceeding a predetermined precision level without being influenced by a zooming mode and an atmosphere when zooming is to be performed using a video signal of an object while maintaining a focused condition.

In order to achieve the sixth object according to still another preferred embodiment of the present invention, there is provided a lens control apparatus in a camera having a first lens for performing a magnification operation, a second lens for correcting movement of a focal plane during movement of the first lens, lens moving means for independently moving the first and second lenses to be parallel to an optical axis, and extracting means for extracting a high frequency component from a video signal of a photographed object, comprising first moving condition switching means for switching a moving condition of the second lens during movement of the first lens so that a high frequency component amount of the video signal changes.

The above and other objects, features, and advantages of the present invention will be apparent from the following detailed description in conjunction with the accompanying drawings.

BRIEF DESCRIPTION OF THE DRAWINGS

FIG. 12 is a view showing a storage table in a lens control microcomputer;

FIG. 14 is a view showing data contents of a focusing lens locus table;

FIGS. 24A and 24B are graphs showing control relationships between the magnification lens position and the focus speed and between the magnification lens position and the zoom speed in the flow charts of FIGS. 22 and 23, respectively;

FIGS. 25A and 25B are tables showing updated speed reduction conditions of the zoom speed;

FIG. 30 is a flow chart showing the continuation of FIG. 29;

FIG. 35 is a graph showing the processing contents of FIG. 33 in detail.

DETAILED DESCRIPTION OF THE PREFERRED EMBODIMENTS

First Embodiment

Figure 4:
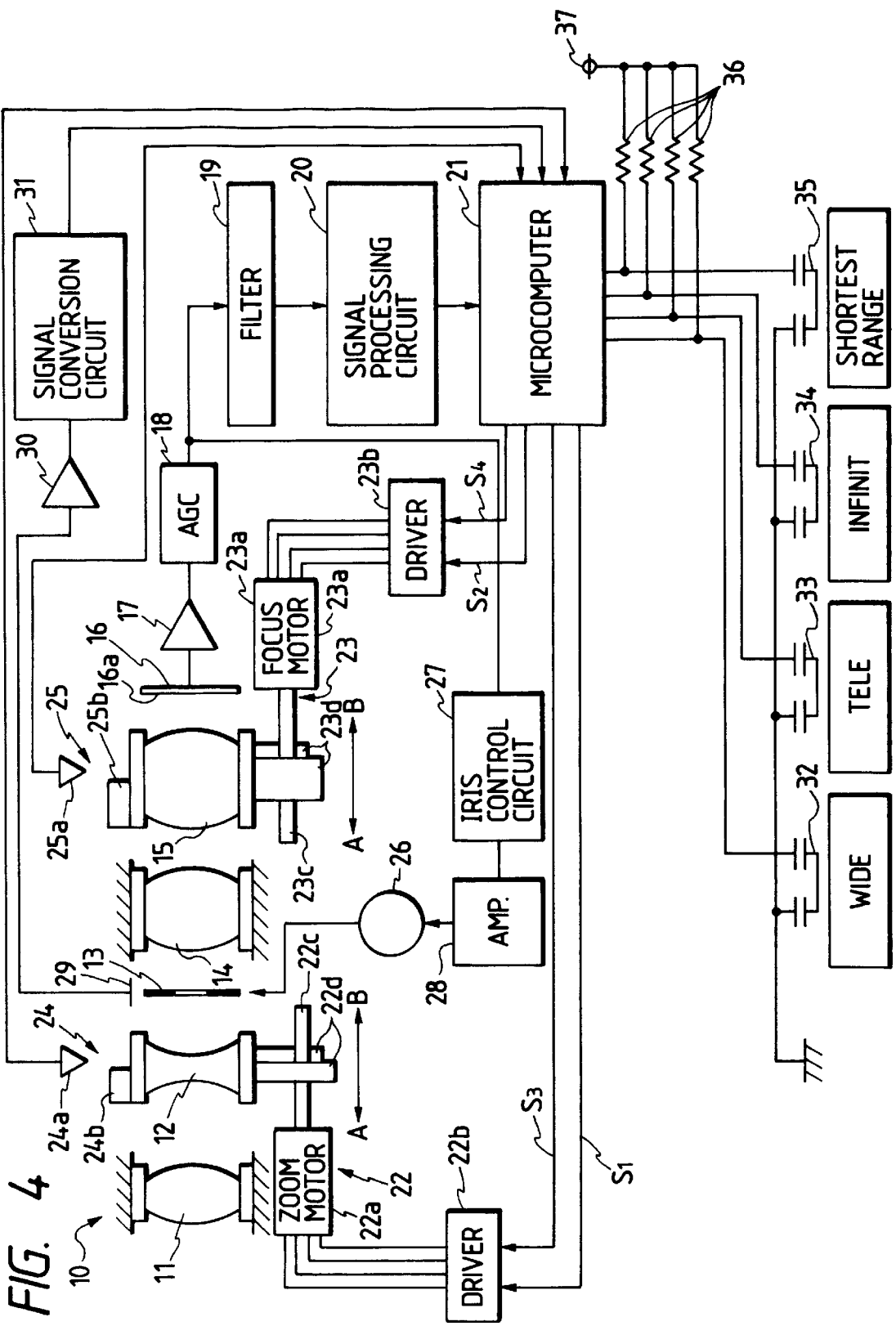
FIG. 4 is a block diagram of a video camera having a lens control apparatus according to the first embodiment of the present invention.

FIG. 4 is a block diagram of a video camera having a lens control apparatus according to the first embodiment of the present invention.

Referring to FIG. 4, an inner focus type lens system 10 comprises a first fixed lens (front-element lens) 11, a magnification lens 12, an iris 13, a second fixed lens 14, and a focus compensation lens 15, all of which are sequentially arranged from the left object side to the right side, as in the conventional arrangement. The magnification lens 12 is moved parallel to the optical axis to perform a magnification operation. The focus compensation lens 15 has a compensation function and a focusing function.

An optical object image from the lens system 10 is focused on an image pickup surface 16a of an image pickup element (C.C.D.) 16 and is photoelectrically converted into a video signal. This video signal is amplified by a first amplifier (or an impedance converter) 17. The amplitude of the output from the first amplifier 17 is maintained constant by an AGC (Automatic Gain Controller) 18. Only a high frequency component which changes in a focus condition is extracted by a filter 19. This high frequency component signal is processed to obtain a high frequency component intensity, a blurring width detection intensity, and the like to cause a signal processing circuit 20 to perform AF (Auto-Focus) control. The processed information is then fetched by a lens control microcomputer 21.

The magnification lens 12 and the focus compensation lens 15 are driven by driving means 22 and 23, respectively. The driving means 22 comprises a stepping motor 22a and a driver 22b, and the driving means 23 comprises a stepping motor 23a and a driver 23b (the stepping motor 22a for the magnification lens 12 and the stepping motor 23a for the focus compensation lens 15 will be referred to as zoom and focus motors, respectively). Racks 22d and 23d meshed with output shafts 22c and 23c directly coupled to the zoom and focus motors 22a and 23a are fixed to the magnification lens 12 and the focus compensation lens 15, respectively.

Drive energies are output from the drivers 22b and 23b to the zoom and focus motors 22a and 23a in accordance with drive instruction signals (i.e., direction signals S1 and S2 and speed signals S3 and S4) output from the lens control microcomputer 21 to rotate the output shafts 22c and 23c. The magnification and focus compensation lenses 12 and 15 are moved together with the racks 22d and 23d to be parallel to the optical axis (directions indicated by arrows A and B).

The positions of the magnification lens 12 and the focus compensation lens 15 are detected by lens position detecting means 24 and 25, respectively. The lens position detecting means 24 comprises a combination of a photosensor 24a and a light-shielding plate 24b, and the lens position detecting means 25 comprises a combination of a photosensor 25a and a light-shielding plate 25b, as shown in FIG. 4. Each of the photosensors 24a and 25a comprises a light-emitting portion and a light-receiving portion. The light-shielding plates 24b and 25b are fixed to the magnification lens 12 and the focus compensation lens 15, respectively.

When the magnification and focus compensation lenses 12 and 15 are moved parallel to the optical axis, the light-shielding plates 24b and 25b are moved together with the lenses 12 and 15. When the light-shielding plates 24b and 25b shield the optical paths between light-emitting portions 24c and 25c and light-receiving portions 24d and 25d, output signals from the light-receiving portions 24d and 25d go to low level. Otherwise, the output signals from the light-receiving portions 24d and 25d are set at high level.

Positions of changes in output signals from the light-receiving portions 24d and 25d are defined as reference positions to determine whether the lenses 12 and 15 are set at the reference positions. Position detection signals from the lens position detecting means 24 and 25, i.e., the output signals from the light-receiving portions 24d and 25d of the photosensors 24a and 25a are fetched by the lens control microcomputer 21. The lens positions can be known in accordance with the lens reference positions, the lens moving directions, and the like.

The iris 13 is driven by a driver 26 serving as a driving means so as to maintain an optimal exposure amount. That is, the level of an output signal from the AGC 18 is detected, and a control signal for adjusting the condition of the iris 13 so as to maintain this level is output from an iris control circuit 27 to a second amplifier 28. The control signal is amplified by the amplifier 28, and the amplified signal is supplied to the driver 26, so that the driver 26 drives the iris 13.

The condition of the iris 13 is detected by an encoder 29, and a detection signal from the encoder 29 is amplified by an amplifier 30. The amplified signal is converted by a signal conversion circuit 31 into a signal which can be read by the lens control microcomputer 21. The converted signal is fetched by the lens control microcomputer 21.

The lens control microcomputer 21 is connected to a-wide switch 32 for moving the magnification lens 12 in a wide direction, a tele switch 33 for moving the magnification lens 12 in a tele direction, an infinity switch 34 for moving the focus compensation lens 15 in an infinity direction, and a shortest range switch 35 for moving the focus compensation lens 15 in a shortest range direction.

A power source 37 is connected to the connection lines between the switches 32 to 35 and the lens control microcomputer 21 through pull-up resistors 36.

As described above, for example, when an interpolation type lens locus tracking system is employed, detection precision of the magnification lens position and the focus compensation lens position apparently influences directly lens locus tracking precision. In particular, use of the stepping motor 22a as the actuator for the magnification lens 12 will be described in this embodiment.

Figure 3:
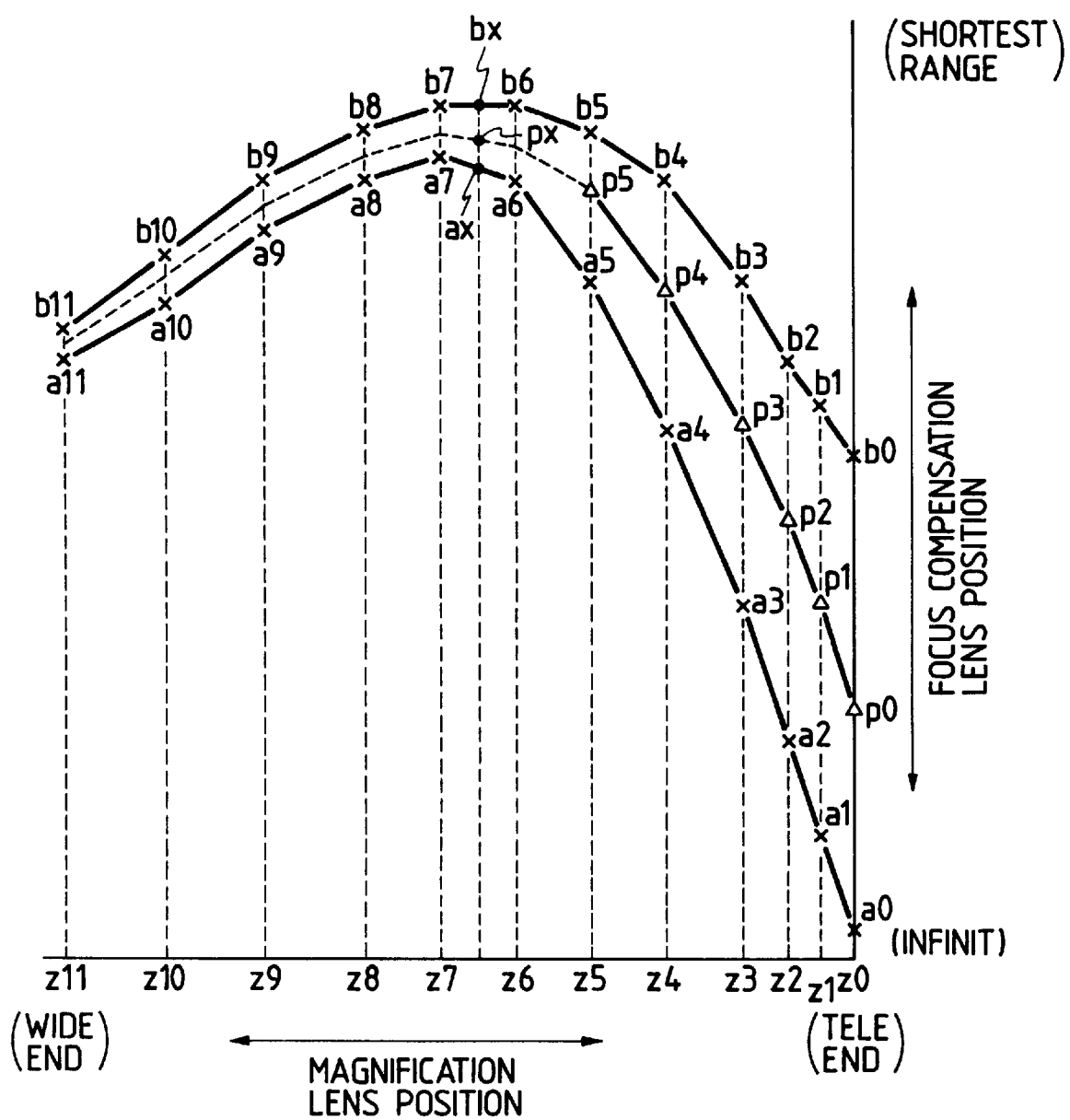
FIG. 3 is a graph for explaining a focusing lens locus tracking method.
Figure 5:
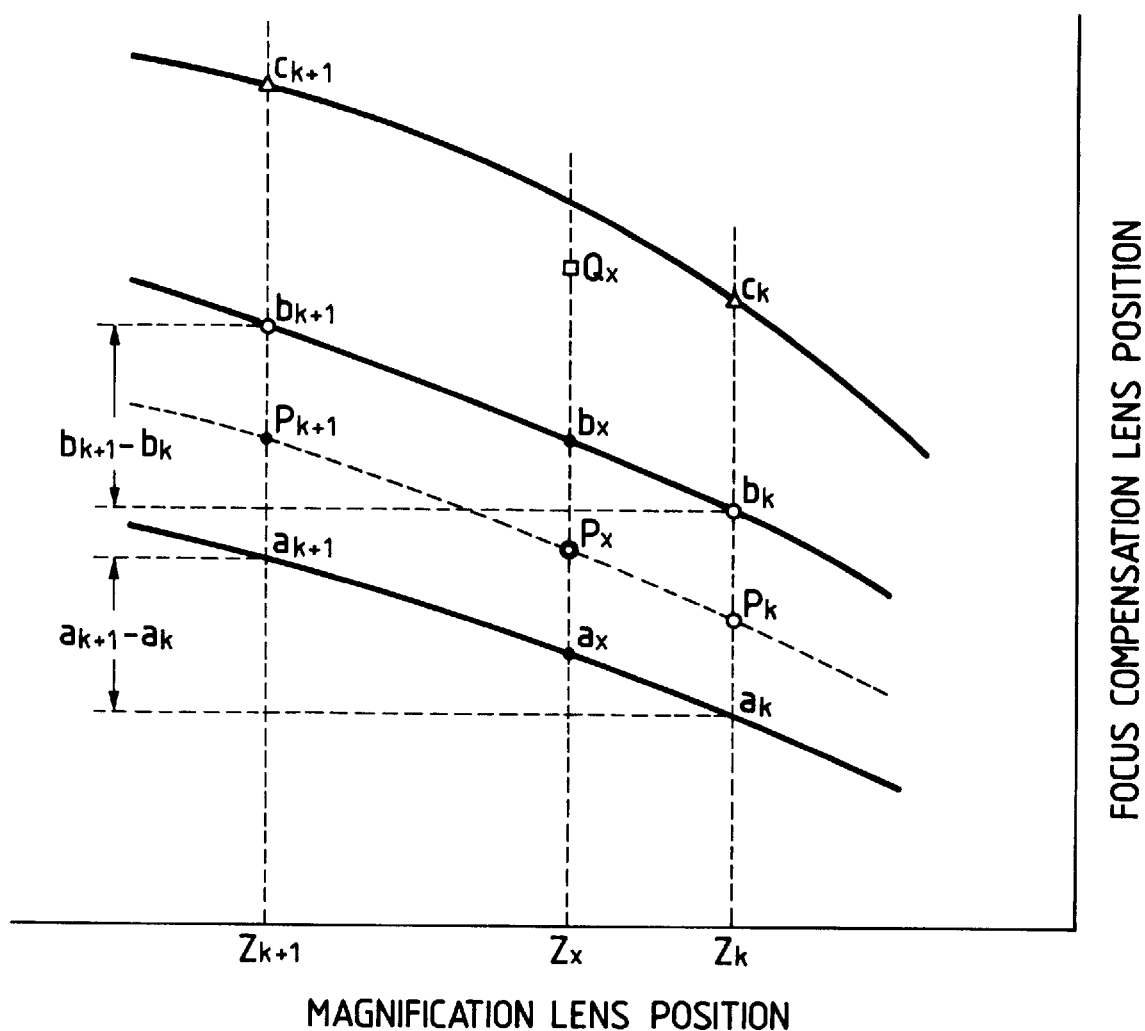
FIG. 5 is a graph for explaining an interpolation method in a direction of the magnification lens position in the lens control apparatus in FIG. 4.

FIG. 5 is a graph for explaining an interpolation method in the direction of the magnification lens position in this embodiment. The graph in FIG. 3 is partially extracted, and the magnification lens position is defined as an arbitrary position.

Referring to FIG. 5, the focus compensation lens position is plotted along the ordinate, and the magnification lens position is plotted along the abscissa. Lens locus positions (focus compensation lens positions with respect to the magnification lens positions) stored in the microcomputer 21 in FIG. 4 are defined as $Z_0, \ldots, Z_k, Z_{k+1}, \ldots, Z_n$ for the magnification lens positions, and $a_0, \ldots, a_k, a_{k+1}, a_n, b_0, \ldots, b_k, b_{k+1}, \ldots, b_n, c_0, \ldots, c_k, c_{k+1}, \ldots, c_n$ are defined as the corresponding focus compensation lens positions in accordance with object distances.

Assume that the magnification lens position is given as $Z_x$ which is not on the zoom boundary, and that the focus compensation lens position is given as $P_x$. In this case, the target position of lens locus tracking is given as $P_k$ or $P_{k+1}$ in FIG. 5 in accordance with the magnification lens moving direction. The positions $P_k$ and $P_{k+1}$ are obtained by the following equations:

$$P_k=(P_x-a_x)\times(b_k-a_k)/(b_x-a_x)+a_k \quad (2)$$

$$P_{k+1}=(P_x-a_x)\times(b_{k+1}-a_{k+1})/(b_x-a_x)+a_{k+1} \quad (3)$$

In this case, $a_x$ and $b_x$ are obtained by equations (4) and (5) below:

$$a_x=(Z_x-Z_k)\times(a_{k+1}-a_k)/(Z_{k+1}-Z_k)+a_k \quad (4)$$

$$b_x=(Z_x-Z_k)\times(b_{k+1}-b_k)/(Z_{k+1}-Z_k)+b_k \quad (5)$$

According to equations (2) to (5),

① a typical locus is interpolated in accordance with an interpolation ratio obtained from the current magnification lens position and two zoom boundary positions on both the sides of the current magnification lens position to obtain $a_x$ and $b_x$, and ② the target positions of lens locus tracking are defined as $P_k$ and $P_{k+1}$ in accordance with equation (1) on the basis of the magnification lens moving direction.

Figure 6:
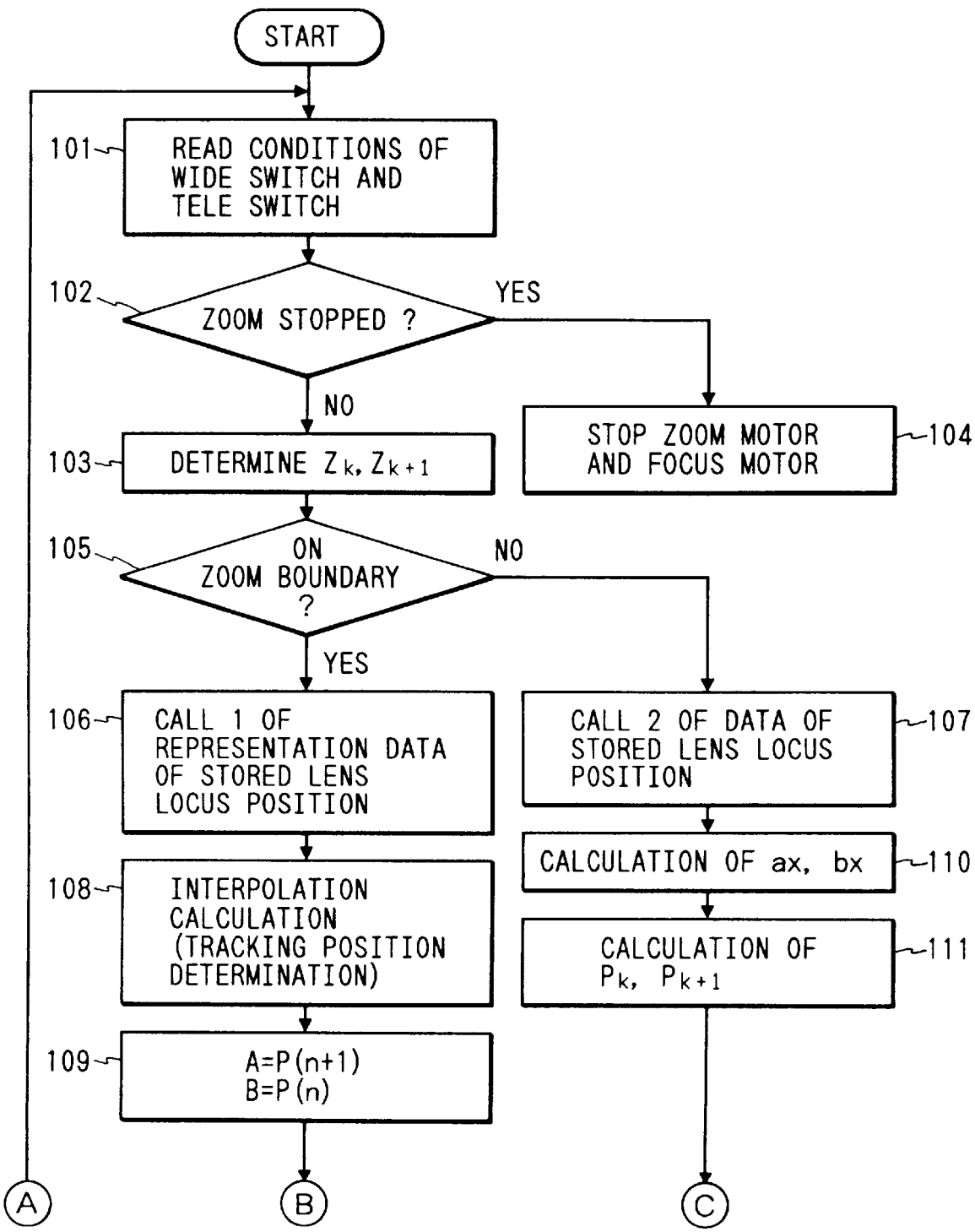
FIG. 6 is a flow chart showing a sequence of a magnification operation in the lens control apparatus in FIG. 4.
Figure 7:
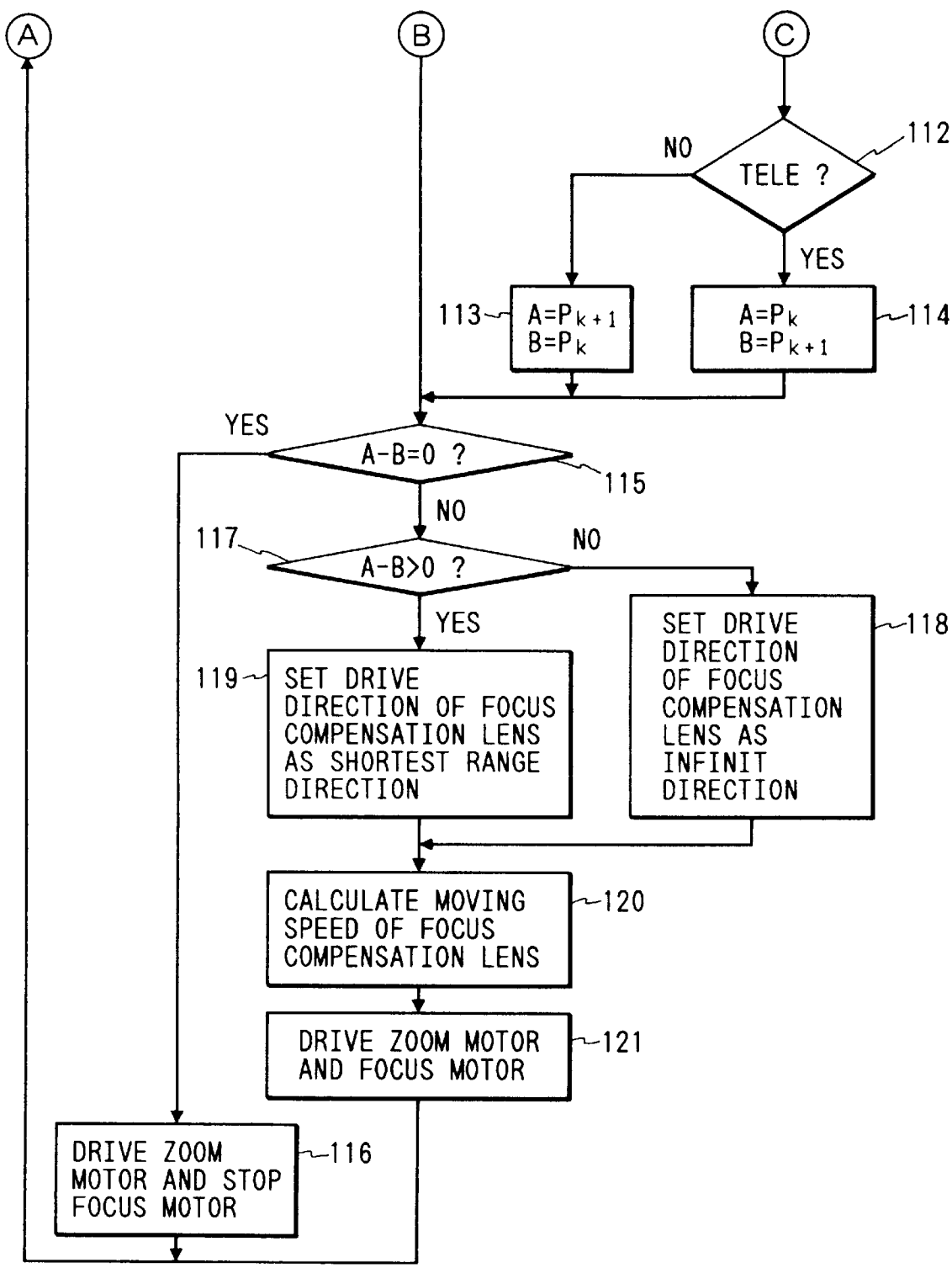
FIG. 7 is a flow chart showing a sequence of the magnification operation in the lens control apparatus in FIG. 4.

FIGS. 6 and 7 are flow charts showing a sequence of a magnification operation performed by the microcomputer 21 in the lens control apparatus of this embodiment.

Referring to FIG. 6, in step 101, conditions of the wide switch 32 and the tele switch 33 in FIG. 4 are read. In this embodiment, the wide, tele, infinity, and shortest range switches 32 to 35 are active low. When each switch is depressed, the motor is controlled to be rotated in a direction of a low-level voltage. That is, the switching voltages of the wide and tele switches 32 and 33 in the stop conditions are both high or both low.

The flow advances to step 102 to determine the conditions of the wide and tele switches 32 and 33 which are read are stop conditions. If YES in step 102, the flow advances to step 104 to stop both the zoom and focus motors 22a and 23a.

Otherwise, the flow advances to step 103 to set zoom boundary positions $Z_k$ and $Z_{k+1}$ on both the sides of the current magnification lens position $Z_x$. For example, if the zoom boundary positions are stored in the table in the microcomputer 21 in FIG. 4 (for descriptive convenience, $|Z_{k+1}-Z_k|$=constant=d), a processing flow in step 103 is shown in FIG. 8.

Figure 8:
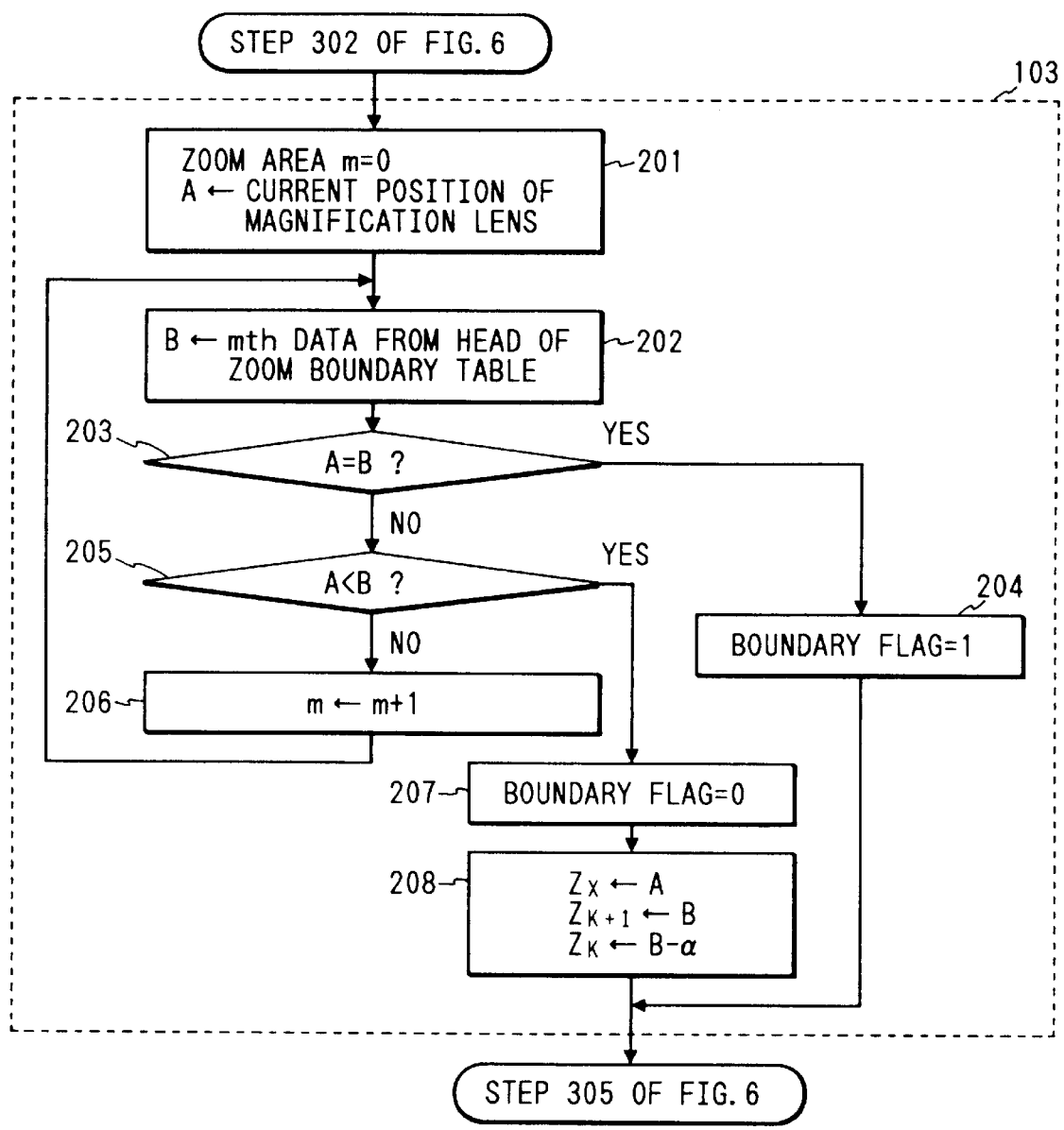
FIG. 8 is a flow chart showing a sequence in step 103 in FIG. 6.

Referring to FIG. 8, in step 201, an area number m of a zoom area divided into zoom zones is reset to zero, and the current magnification lens position is set to A. The math data from the head of the boundary table of the storing zoom area is stored in B in step 202. It is determined in step 203 whether A is equal to B (A=B). If YES in step 203, the flow advances to step 204 to set a "boundary flag" to "1" which represents that the current magnification lens position is on a zoom boundary. The flow then advances to step 105 in FIG. 6. However, if NO in step 203, it is determined in step 205 whether A is smaller than B. If NO in step 205, m=m+1 is set in step 206, and the flow returns to step 202. The operations described above are then repeated.

However, if it is determined that A is smaller than B, it is determined in step 207 that the current magnification lens position is not on the zoom boundary, and the "boundary flag" is reset to "0". "$Z_x$=A", "$Z_{k+1}$=B", and "$Z_k$=B−α" (where α represents the width of one zoom zone when the zoom area is divided into equal zoom zones, i.e., a difference (absolute value) between the adjacent data in the zoom storage table) are performed in step 208, and step 105 in FIG. 5 is then executed.

Referring back to FIG. 6, it is determined in step 105 on the basis of the condition of the "boundary flag" in steps 204 and 207 of FIG. 8 whether the magnification lens 12 in FIG. 4 is located on the zoom boundary. If YES in step 105, the representation data of lens local tracking which is stored in the microcomputer 21 in FIG. 4 is called in step 106. However, if NO in step 105, the lens local tracking data is called in step 107.

In steps 106 and 107, data are called. In step 106, different data are called to calculate equation (1) in accordance with zoom directions. That is, in step 106, data "$a_k$", "$a_{k+1}$", "$b_k$", and "$b_{k+1}$" for "tele→wide" and "$a_{k-1}$", "$a_k$", "$b_{k-1}$", and "$b_k$" for "wide→tele" are called when the current magnification lens position is given as "$Z_x=Z_k$" and the focus compensation lens position is given as "$P_x=P_k$ ($a_k \leqq P_k < b_k$). In step 107, data "$a_k$", "$a_{k+1}$", "$b_k$", and "$b_{k+1}$" required for calculating equations (4) and (5) are called.

When the magnification lens 12 is located on the zoom boundary, an interpolation calculation using the data called in step 106 is performed in step 108. Substitutions of "k→n" and "k+1→n+1" into equation (1) yield an interpolation calculation result. The lens locus tracking data stored in the microcomputer 21 in FIG. 4 are obtained as representation data so as to set the same magnification lens position data having different object distances to be different from each other, thus satisfying condition "$b_{(n)}-a_{(n)} \neq 0$". The target positions of lens locus tracking in zooming are determined in step 108, and these positions are defined as "$A=P_{(n+1)}$" and "$B=P_{(n)}$" in step 109. The flow advances to step 115 in FIG. 7.

When the magnification lens 12 is not located on the zoom boundary, "$a_x$" and "$b_x$" are calculated in step 110 by equations (4) and (5) using the data called in step 107. In step 111, "$P_k$" and "$P_{k+1}$" are determined by equations (2) and (3). The flow then advances to step 112 in FIG. 7 to determine whether the moving direction of the magnification lens 12 is the tele direction. If YES in step 112, "$A=P_{k+1}$" and "$B=P_k$" are set in step 113. Otherwise, "$A=P_k$" and "B=$P_{k+1}$" are set in step 114. The tracking target position A and the current focus compensation lens position B projected on the zoom boundary are determined. The flow then advances to step 115.

It is determined in step 115 whether a difference between the focus compensation lens position B on the zoom boundary and the tracking target position A is zero. If YES in step 115, the focus compensation lens 15 need not be moved. In step 116, the zoom motor 22a is driven, and the focus motor 23a is stopped. The flow then returns to step 101 in FIG. 6. However, if NO in step 115, it is determined in step 117 in FIG. 7 whether the difference is a positive value. If YES in step 117, the drive direction of the focus compensation lens 15 is set to the shortest range direction. Otherwise, the drive direction of the focus compensation lens 15 is set to the infinity direction in step 118. The flow then advances to step 120. In step 120, the moving speed of the focus compensation lens 15 is calculated using the difference. This moving speed is calculated as a pps value in the following equation:

$$\text{(Focus Compensation Lens Moving Speed)(pps)} = |A-B|/(\text{One Zoom Zone Passing Time}) \quad (6)$$

After the focus compensation moving speed is calculated as described above, the zoom motor 22a and the focus motor 23a are driven in step 121. The flow returns to step 101 in FIG. 6, and the above operations are repeated.

A method of driving the zoom motor 22a and the focus motor 23a will be described below.

The drivers 22b and 23b for driving the zoom motor 22a and the focus motor 23a are controlled by the direction signals S1 and S2 and the speed signals S3 and S4. The phases of the four outputs from the drivers 22b and 23b are selected as follows. The direction signals S1 and S2 are high/low signals. The zoom motor 22a and the focus motor 23a are rotated in the normal direction when the directions S1 and S2 are set at high level. The motors 22a and 23a are rotated in the reverse direction when the direction signals S1 and S2 are set at low level. The speed signals S3 and S4 are clock signals. The drivers 22b and 23b drive and rotate the zoom motor 22a and the focus motor 23a to change output voltages and phases at the leading edges of the input signals. The speeds of the zoom motor 22a and the focus motor 23a are determined in accordance with the clock signal frequencies of the input signals.

When the clock signals do not change, the output voltages and phases of the signals output from the drivers 22b and 23b do not change. The zoom motor 22a and the focus motor 23a are not driven. To stop the zoom motor 22a and the focus motor 23a, the input clock signals of the speed signals S3 and S4 are disabled. At this time, the pieces of information of the direction signals S1 and S2 do not influence driving of the zoom motor 22a and the focus motor 23a. The speeds of the zoom motor 22a and the focus motor 23a are set as predetermined values in the zoom mode and as a clock signal obtained from the microcomputer 21 by PWW conversion of the pps value calculated by equation (6) in step 120 in FIG. 7 in the focus mode.

Second Embodiment

The second embodiment of the present invention will be described with reference to FIGS. 9 to 12.

The block diagram of a video camera having a lens control apparatus in this embodiment is substantially the same as that of the first embodiment in FIG. 4. The arrangement will be described with reference to FIG. 4.

Figure 9:
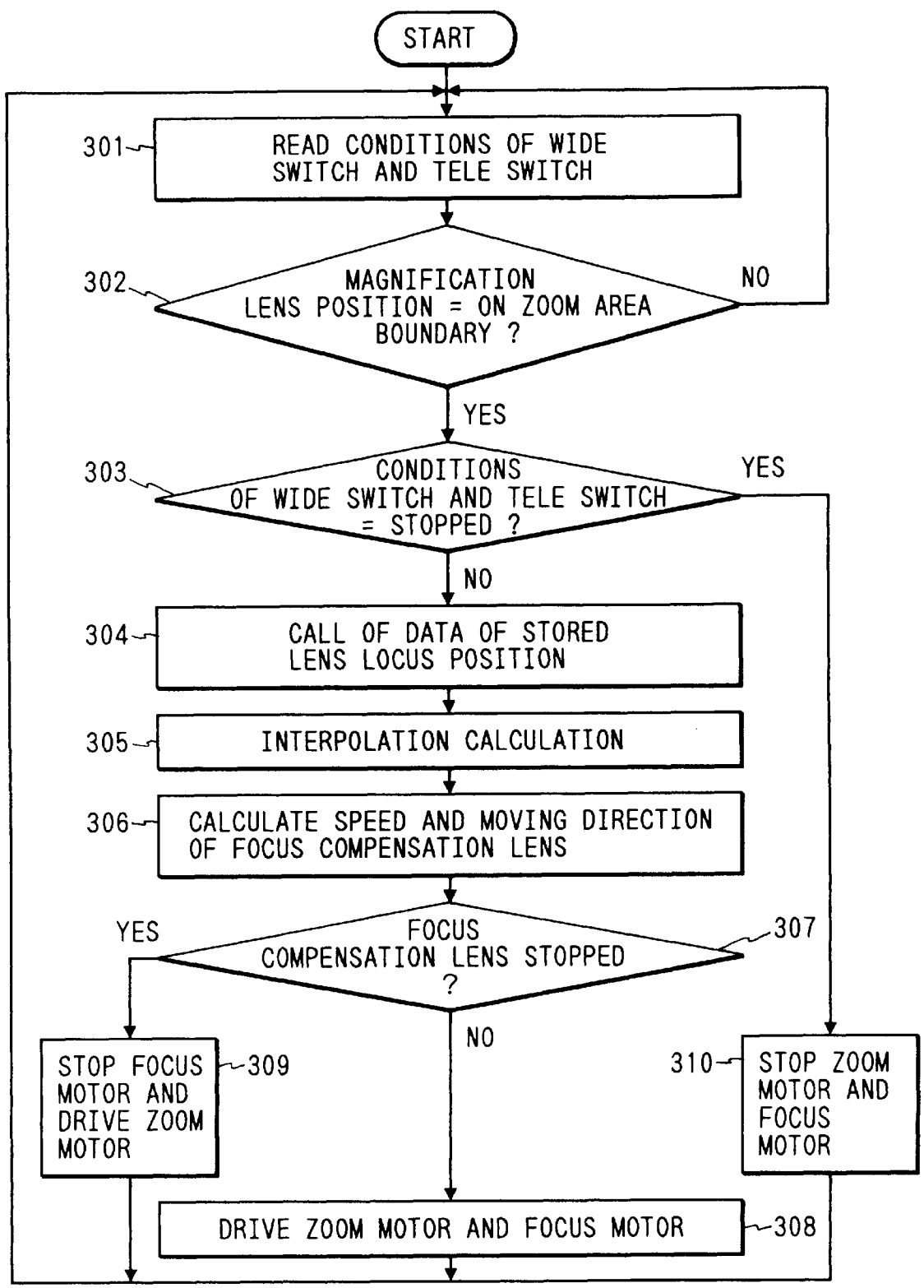
FIG. 9 is a flow chart showing a sequence of a magnification operation in a lens control apparatus according to the second embodiment of the present invention.

FIG. 9 is a flow chart showing the processing sequence of a magnification operation performed by a microcomputer 21 in the lens control apparatus of this embodiment. In step 301, the conditions of wide and tele switches 32 and 33 are read. In this embodiment, as in the first embodiment, the wide and tele switches 32 and 33, an infinity switch 34, and a shortest range switch 35 are active low. When each of these switches 32 to 35 is depressed, a motor is rotated in a direction of a low-level voltage. When both the wide and tele switches 32 and 33 or both the infinity and shortest range switches 34 and 35 are depressed, or when neither the wide nor tele switches 32 or neither the infinity and shortest range switches 34 nor 35 are depressed, logic calculations are performed to stop a zoom motor 22a and a focus motor 23a.

After the conditions of the switches 32 and 33 are read in step 301, it is determined in step 302 whether the magnification lens position is on a zoom area boundary. The zoom area boundaries are positions $z_0, z_1, \ldots, z_{11}$ in FIG. 3. A position corresponding to $Z_x$ indicates a state in which the magnification lens position is not on any boundary. The processing flow in step 302 is shown in FIG. 10.

Figure 10:
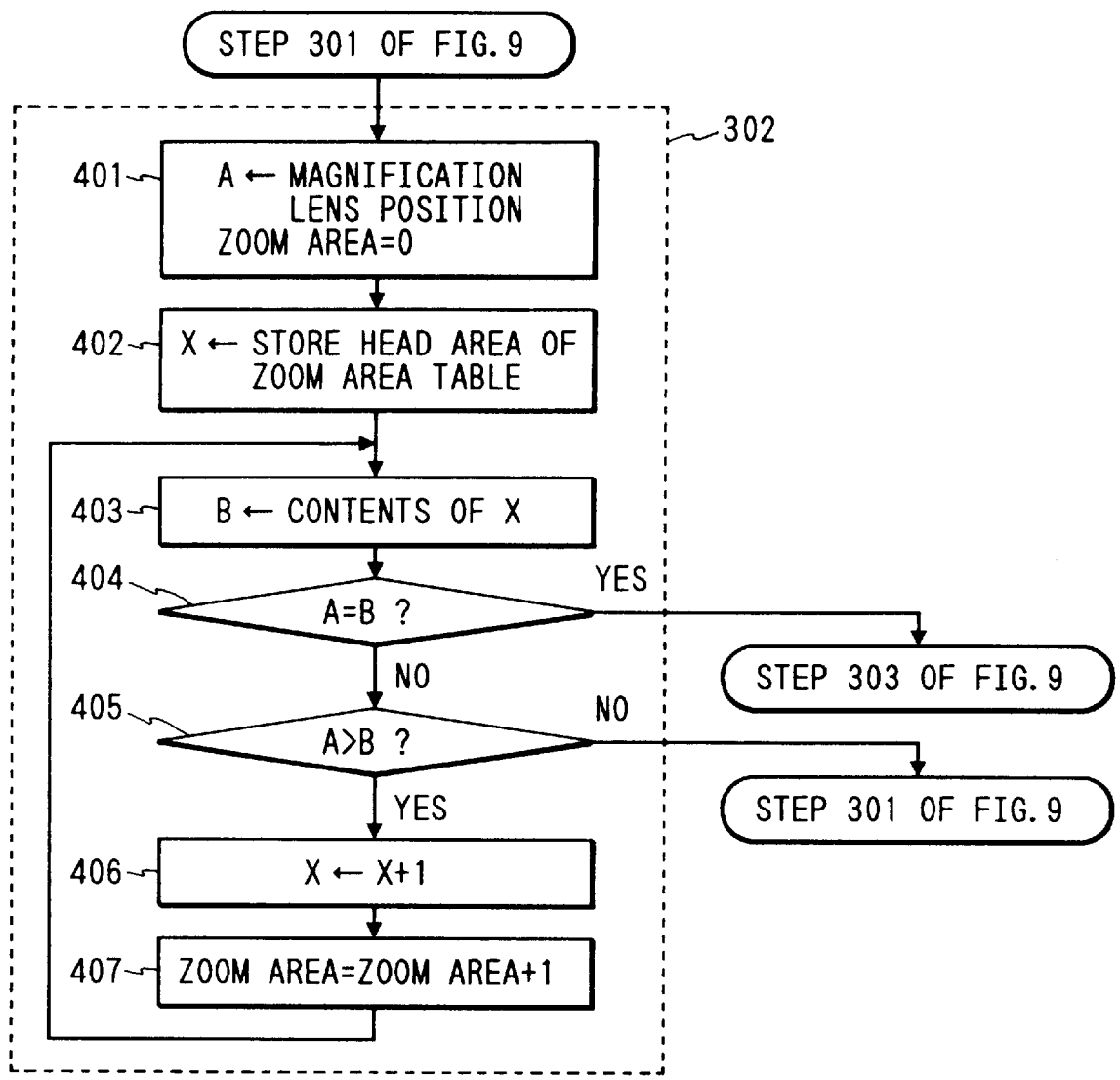
FIG. 10 is a flow chart showing a sequence in step 302 in FIG. 9.

In step 401 in FIG. 10, the current magnification lens position is set to A, and a zoom area is set to zero. In step 402, the start address of the zoom area table is set in x. The zoom area table is a table of values (1-byte data) of $z_0, z_1, z_2, \ldots, z_{(n)}$ in FIG. 3. The contents of this table are addressed to call the x contents to obtain B in step 403. It is determined in step 404 whether "A=B ($=z_0$)". If YES in step 404, the magnification lens position is on the boundary, and the flow advances to step 303 in FIG. 9.

If NO in step 404, it is determined in step 405 whether "A>B ($=z_0$)". If YES in step 405, "x←x+1" is calculated in step 406, and the zoom area is incremented in step 407. The flow returns to step 403 to set "B=$z_1$", and A is compared with B in step 404. Steps 403 to 407 are repeated until YES in step 404 or NO in step 405.

If NO in step 405, the flow returns to step 301 in FIG. 9 while the current conditions of a magnification lens 12 and a focus compensation lens 15 are kept maintained (if they are stopped, they are kept stopped; if they are driven, they are driven at the current speed in the current direction).

Referring back to FIG. 9, if the magnification lens position is not on the zoom area boundary in step 302, the flow returns to step 301. Otherwise, it is determined in step 303 whether the conditions of the wide and tele switches 32 and 33 which are read in step 301 are stop conditions. If YES in step 303, the zoom motor 22a and the focus motor 23a are stopped in step 310, and the flow returns to step 301. If the switches 32 and 33 are not set in the stop condition, lens locus position data stored in the microcomputer 21 is called in step 304. Step 304 has a processing flow in FIG. 11. The zoom motor 22a cannot be stopped unless the magnification lens position is on the zoom area boundary.

Figure 11:
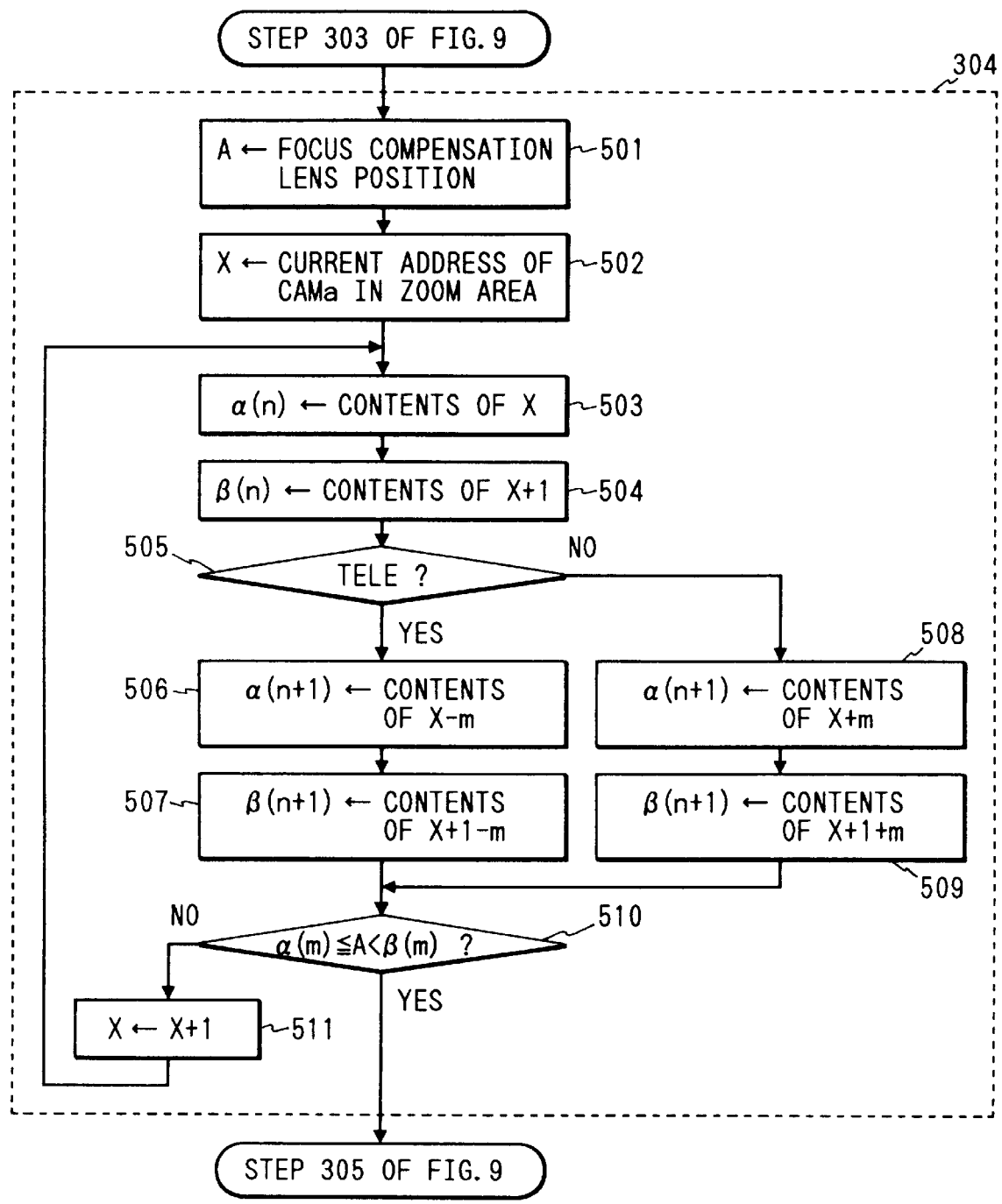
FIG. 11 is a flow chart showing a sequence in step 304 in FIG. 9.

In step 501 in FIG. 11, the focus compensation lens position is set to A, and the flow advances to step 502. The address of a cam locus a of an object distance ∞ corresponding to this zoom area is stored as x, and the flow advances to step 503.

The storage table is shown in FIG. 12. This table represents cam locus data whose object distance sequentially decreases in the column direction and whose zoom area sequentially increases in the row direction. A number m indicates the number of cam loci. Adjacent cam data within the same zoom area have different object distances.

Referring back to FIG. 11, the contents of x stored in step 502 are stored in $d_{(n)}$, and the contents of "x+1" are stored in $\beta_{(n)}$ in step 504. It is determined in step 505 whether the drive direction of the zoom motor 22a is the tele direction. If YES in step 505, the contents of "x−m" and "x+1−m" are stored in "$\alpha_{(n+1)}$" and "$\beta_{(n+1)}$", respectively, and the flow advances to step 510. If the drive direction of the zoom motor 22a is determined in step 505 to be the wide direction, the contents of "x+m" and "x+1+m" are stored in "$\alpha_{(n+1)}$" and "$\beta_{(n+1)}$" in steps 508 and 509, respectively, and the flow advances to step 510. If "$\alpha_{(n)}=a_1$" in the table in FIG. 12, then "$\beta_{(n)}=b_1$". If the drive direction is the tele direction, then "$\alpha_{(n+1)}=a_0$" and "$\beta_{(n+1)}=b_0$" are stored. If the drive direction is the wide direction, then "$\alpha_{(n+1)=a2}$" and "$\beta_{(n+1)}=b_2$" are stored.

In step 510, it is determined using the "$\alpha_{(n)}$" and "$\beta_{(n)}$" values whether "$a_{(n)} \leq A < \beta_{(n)}$" is satisfied. If YES in step 510, the flow advances to step 305 in FIG. 9. If NO in step 510, the retrieval address is updated as "x←x+1" in step 511, and the flow returns to step 503 to continue processing.

Referring back to FIG. 9, in step 305, an interpolation calculation in equation (1) is performed using the "$\alpha_{(n)}$", "$\beta_{(n)}$", "$\alpha_{(n+1)}$", "$\beta_{(n+1)}$", and "A (=Focus Motor Position)". In this case, equation (1) is rewritten using different variables as follows:

$$P = \frac{[A - \alpha_{(n)}] \times [\beta_{(n+1)} - \alpha_{(n+1)}]}{\beta_{(n)} - \alpha_{(n)}} + \alpha_{(n)} \quad (7)$$

where "$A \geq \alpha_{(n)} \beta_{(n+1)} > \alpha_{(n+1)}$" and "$\beta_{(n)} > \alpha_{(n)}$" from the table in FIG. 12.

In step 306, the moving speed and direction of the focus compensation lens 15 for cam locus tracking are determined.

The moving direction of the focus compensation lens 15 is determined as the shortest range direction for "P−A>0", the infinity direction for "P−A<0", and the stop position for "P=A" in accordance with the next moving target position P obtained in step 305 and the current focus compensation lens position A.

A focus compensation lens moving speed pps is obtained by equation (8) as follows:

$$pps = \frac{|P - A|}{\text{One Zoom Area Passing Time}} \quad (8)$$

It is determined in step 307 whether "P−A=0" is established, i.e., whether the focus compensation lens 15 is kept stopped. If YES in step 307, the focus motor 23a is stopped, and the zoom motor 22a is driven in step 309. The flow then returns to step 301.

If NO in step 307, both the zoom motor 22a and the focus motor 23a are driven in step 308, and the flow returns to step 301 to continue the above processing.

A method of driving the zoom motor 22a and the focus motor 23a in this embodiment is the same as in the first embodiment, and a detailed description thereof will be omitted.

In the lens control apparatus of this embodiment of the present invention, as has been described above, the interpolation calculation in the direction of a magnification lens position is performed even at a magnification lens position whose data is not stored, thereby forming lens locus tracking data. The same lens control can be performed as in control having stored locus data obtained by equally dividing the magnification lens moving area by one pulse lens moving amount. Therefore, the same zooming can be performed as in zooming having a large volume of storage data, and the storage capacity of the microcomputer can be saved.

Although lens locus tracking can be updated only at a magnification lens position whose data is stored, the lens locus tracking can be sequentially updated in the lens control apparatus of the first embodiment of the present invention. Therefore, zooming which has good tracking characteristics for a change in zoom speed as in high-speed zooming or a change in object distance and is free from blurring in the focused condition can be performed.

According to the above embodiment, in a zooming scheme for performing locus tracking while interpolation is being performed using stored cam information, the stop of the magnification lens is allowed only at a magnification lens position whose data is stored. For this reason, lens locus tracking can be performed by only an interpolation calculation of the focus compensation lens position. A complicated interpolation calculation of the magnification lens positions need not be performed. Therefore, blurring caused by calculation errors can be prevented in the zoom mode, and at the same time, the storage capacity of the microcomputer can be saved.

Third Embodiment

Figure 13:
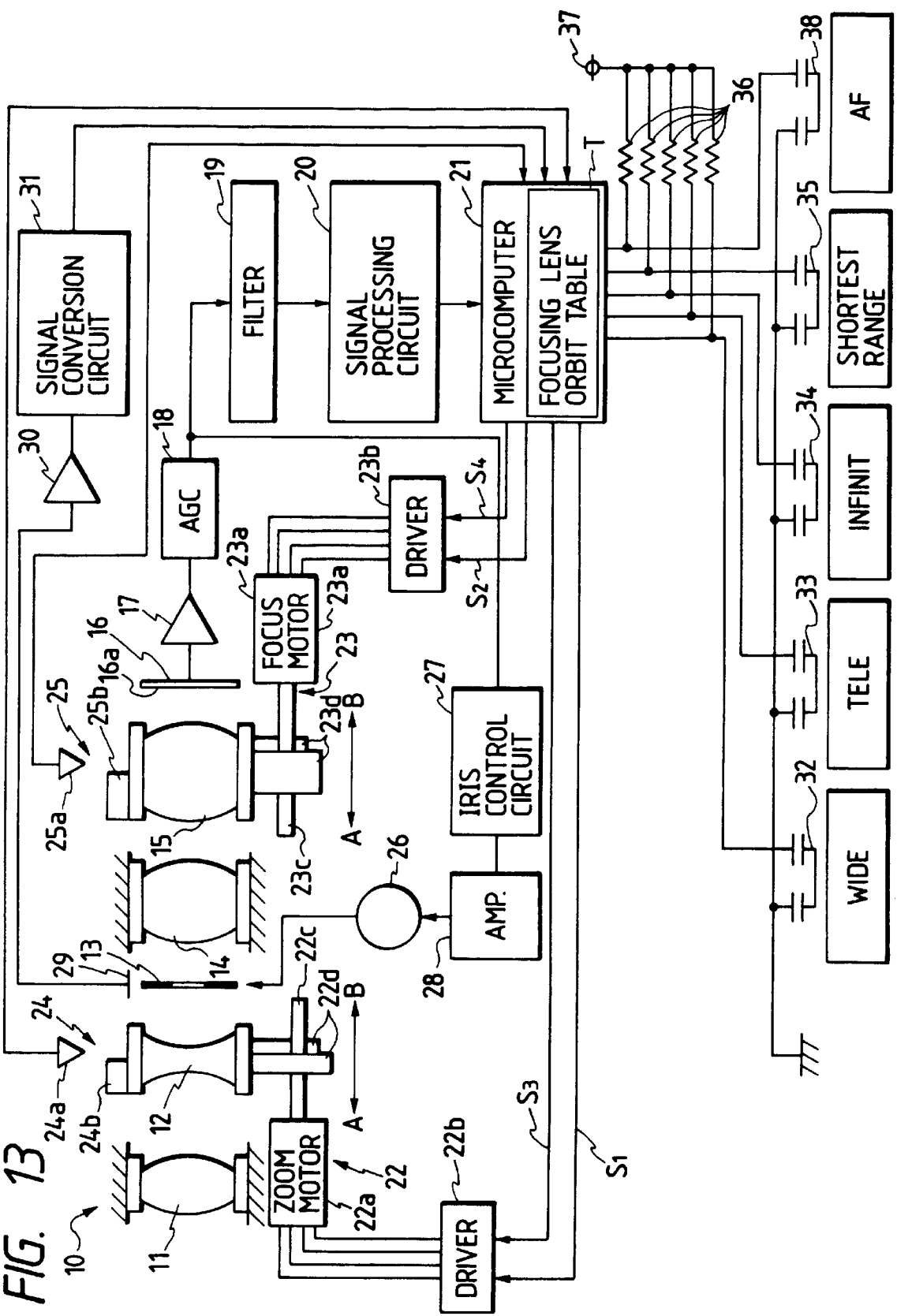
FIG. 13 is a block diagram showing a schematic arrangement of a video camera having a lens control apparatus according to the third embodiment of the present invention.

The third embodiment of the present invention will be described below. This embodiment aims at preventing blurring in the zoom mode. In particular, this embodiment realizes control in consideration of zooming in an AF OFF condition or manual focus control. The circuit arrangement of this embodiment is the same as that shown in the block diagram of FIG. 13.

The background and outline of this embodiment will be described below.

In equation (1) described above, for example, in FIG. 3, when a focus compensation lens 6 is located at a position $p_0$, a ratio of interpolating a line segment "$b_0-a_0$" using the position $p_0$, and a point for interpolating a line segment "$b_1-a_1$" is defined as $p_1$ in accordance with this interpolation ratio. The moving speed of the focus compensation lens 6 to maintain the focused condition is obtained from a difference between the points $p_1$ and $p_0$ and a time required for a magnification lens 3 to move from a position $z_0$ to a position $z_1$.

Figure 2:
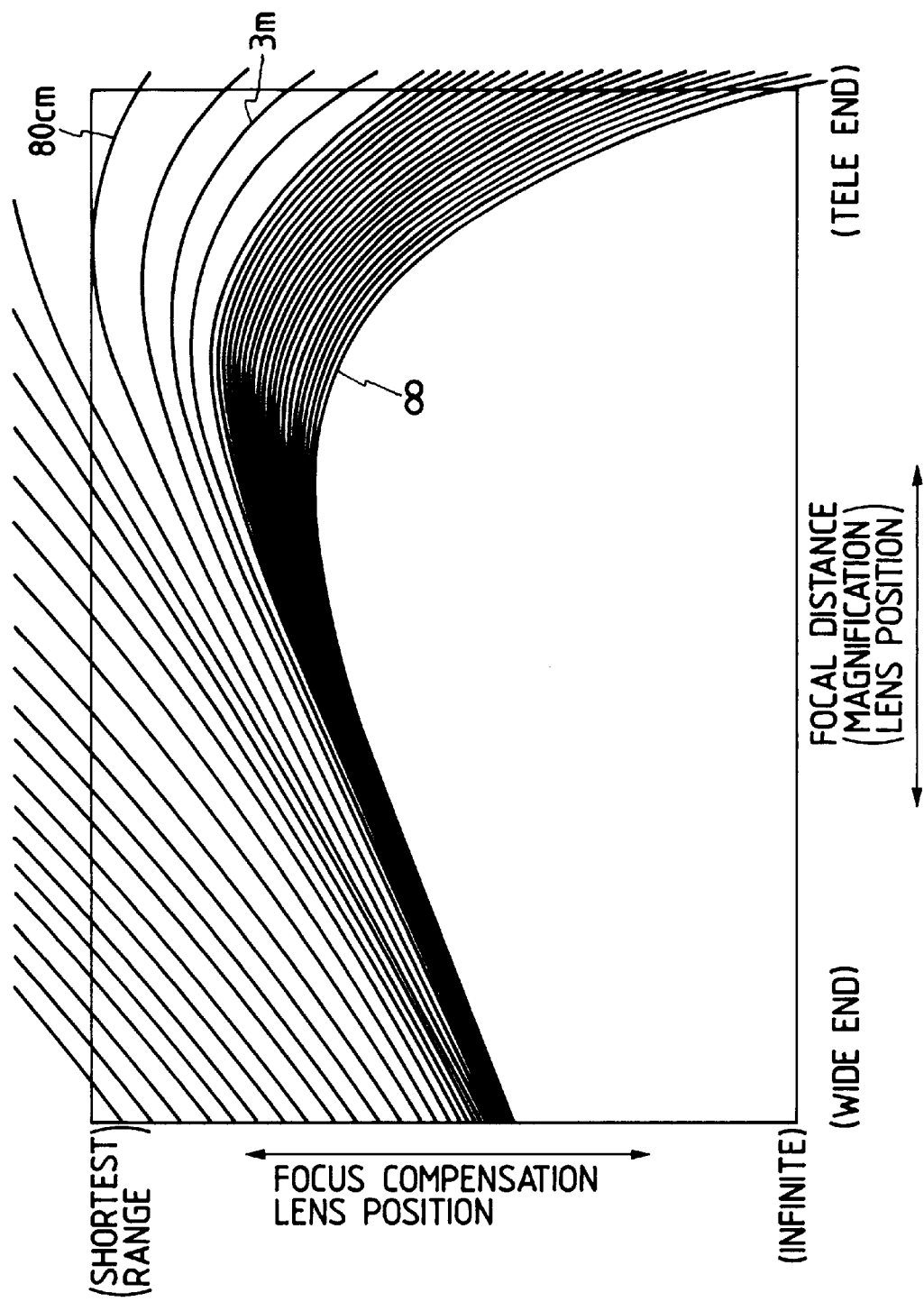
FIG. 2 is a graph showing a relationship between a magnification lens position and a focus compensation lens position to maintain a focused condition for each object distance.

When the magnification lens 3 is moved from the tele direction to the wide direction, this direction is a direction to converge divergent focusing lens loci, as is apparent from FIG. 2. However, from the wide direction to the tele direction, it is unknown for the focus compensation lens 6 located at a convergent position to follow a specific focusing lens locus. Therefore, focusing cannot be maintained in the same locus tracking scheme described above.

A focusing lens locus for minimizing near- and far-focus pieces of information (blurring information) obtained in an automatic focus control operation (AF) of a contrast scheme (hill climbing scheme) is selected, and zooming is performed such that the focus compensation lens 6 is moved along with the selected focusing lens locus.

According to this scheme, however, a focusing lens locus cannot be selected in the AF function OF condition. When zooming is performed in the AF function OFF condition, focusing is maintained as follows.

More specifically, in the AF function OFF condition, every time zooming is performed from the tele direction to the wide direction so as to maintain focusing, positions $p_0$, $p_1$, $p_2$, ..., $p_{11}$, ... (focusing lens loci) of the focus compensation lens 6 are calculated at positions $z_0$, $z_1$, $z_2$, ..., $z_{11}$ of the magnification lens 3 in FIG. 3 and are sequentially stored in a memory of a microcomputer. In zooming from the wide direction to the tele direction, the focus compensation lens 6 reversely traces the loci in zooming from the tele direction to the wide direction.

Figure 1:
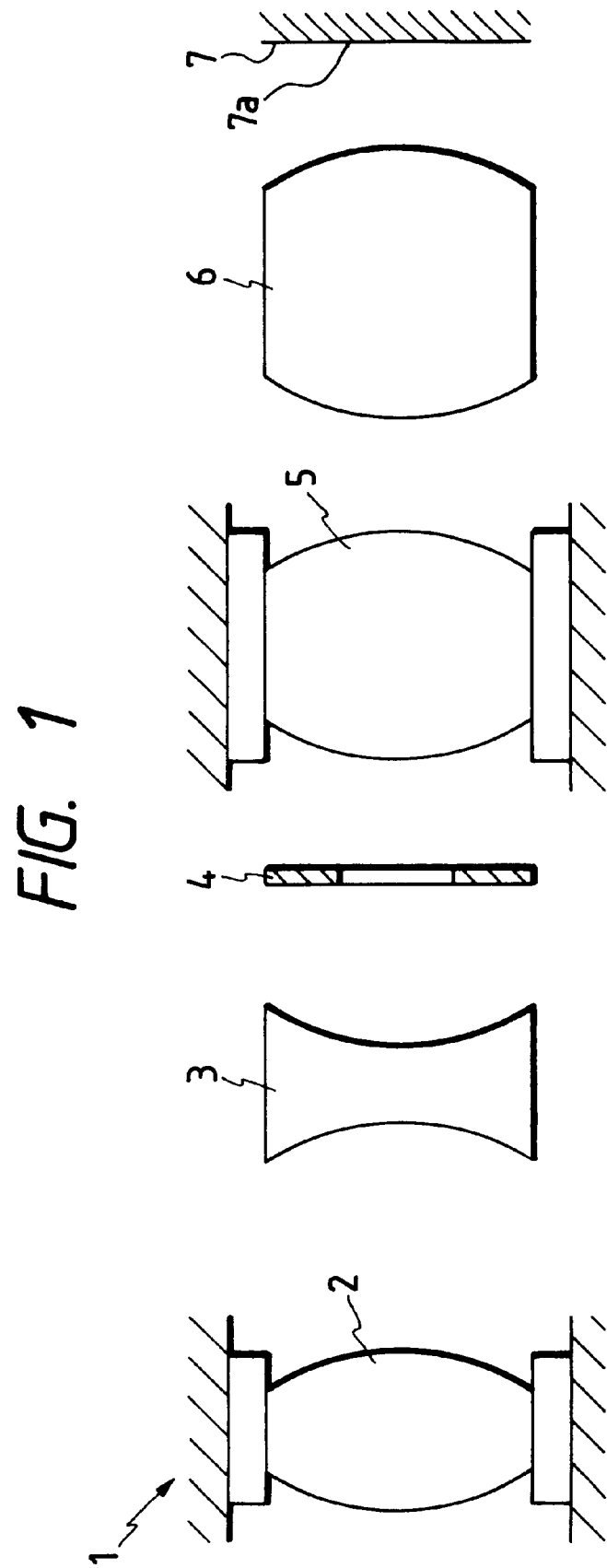
FIG. 1 is a view showing an inner focus type lens system.

In the example shown in FIGS. 1 to 3, the focused positions $p_0, p_1, p_2, \ldots, p_{11}, \ldots$ of the focus compensation lens 6 at the positions $z_0, z_1, z_2, \ldots, z_{11}, \ldots$ of the magnification lens 3 must be calculated and stored in a table separate from the focusing lens locus table. A large number of focused positions of the focus compensation lens 6 must be calculated and stored, so that the storage capacity of the lens control microcomputer undesirably increases, and the processing time is also prolonged. In addition, processing is complicated.

Every time zooming is performed when the direction changes from the tele direction to the wide direction, repeated zooming from the tele direction to the wide direction and from the wide direction to the tele direction in the AF OFF condition causes storage of focusing lens loci having object distances different from the initially stored object distances due to errors in focusing lens locus tracking operations. Therefore, the blurring range is gradually widened.

In the conventional storage scheme, even if the stored focused positions are connected to each other, the resultant locus does not coincide with a focusing lens locus in optical design, and blurring occurs in zooming.

This embodiment has been made in consideration of the above circumstances and aims at saving the processing capacity and time in an AF OFF condition, and performing zooming while maintaining an accurately focused condition.

As an arrangement, a lens control apparatus including a first lens for performing a magnification operation, a second lens for correcting movement of a focal plane during movement of the first lens, lens moving means for independently moving the first and second lenses to be parallel to an optical axis, and focused position storage means for prestoring a focused position of the second lens with respect to a discrete position of the first lens in accordance with a discrete object distance, comprises object distance specifying means for specifying an object distance on the basis of the current positions of the first and second lenses and information stored in the focused position storage means when manual focus control is performed while a position of the first lens is fixed, and focused position calculating means for calculating a focused position of the second lens with respect to a moving position of the first lens on the basis of the object distance specified by the object distance specifying means and the information stored in the focused position storage means when the first lens is moved by the lens moving means to perform a magnification operation.

The first lens serves as a lens for performing the magnification operation, and the second lens serves as a lens for correcting movement of the focal plane during movement of the first lens. The lens moving means independently moves the first and second lenses to be parallel to the optical axis. The focused position storage means prestores the focused position of the second lens with respect to the discrete position of the first lens in accordance with the discrete object distance of the first lens.

The object distance specifying means specifies the object distance on the basis of the current positions of the first and second lenses and the information stored in the focused position storage means when the focus control is manually performed while the first lens position is fixed.

When the first lens is moved by the lens moving means to perform the magnification operation, the focused position calculating means calculates the focused position of the second lens with respect to the moving position of the first lens on the basis of the object distance specified by the object distance specifying means and the information stored in the focused position storage means.

The system circuit arrangement itself is substantially the same as that in the block diagram of FIG. 4 except that an AF mode switch 38 for setting an AF mode is arranged and connected to a lens control microcomputer 21, and a detailed description thereof will be omitted.

This embodiment can be achieved by the processing programs in the lens control microcomputer 21.

The detailed operation of this embodiment will be described below.

A focusing lens locus table T (FIG. 14) having focus lens locus contents in FIG. 2 is preset in the lens control microcomputer 21. The focusing lens locus table T in FIG. 14 is a table in which focused positions of the focus compensation lens 15 which correspond to discrete positions of the magnification lens 12 are stored for each object distance. In this table, n $(0, 1, \ldots, k, \ldots, m)$ in the column direction (horizontal direction in FIG. 14) represents a discrete object distance, and z $(0, 1, \ldots, k, \ldots, l)$ in the row direction (vertical direction in FIG. 14) represents a discrete position of the magnification lens 12. A focused position of the focus compensation lens 15 which corresponds to the discrete position of the magnification lens 12 and the object distance is stored at an intersection position of the column and row. The object distance decreases toward the right direction, 0 represents the infinity, and "m" represents the shortest range as 1 cm. Lower magnification lens positions represent larger zoom areas, "0" represents a tele end, and "1" represents a wide end. A focused position $A_{0k}$ of the focus compensation lens 15, for example, represents the focused position of the focus compensation lens 15 for the object distance of "0" and the position of the magnification lens 12 of "k".

When zooming is performed in the AF mode, the lens control microcomputer 21 performs zooming while selecting a focusing lens locus in the focusing lens locus table T using near- and far-focus pieces of information or while calculating a focusing lens position on the basis of the above focusing lens locus. In contrast to this, in zooming in the AF OFF mode, when a manual focusing operation is performed prior to zooming, the lens control microcomputer 21 specifies the object distance, calculates an interpolation ratio of equation (1) which corresponds to this object distance, calculates the focused position of the focus compensation lens 15 in accordance with equation (1) using this interpolation ratio during zooming, and causes the focus compensation lens 15 to trace the locus.

Figure 15:
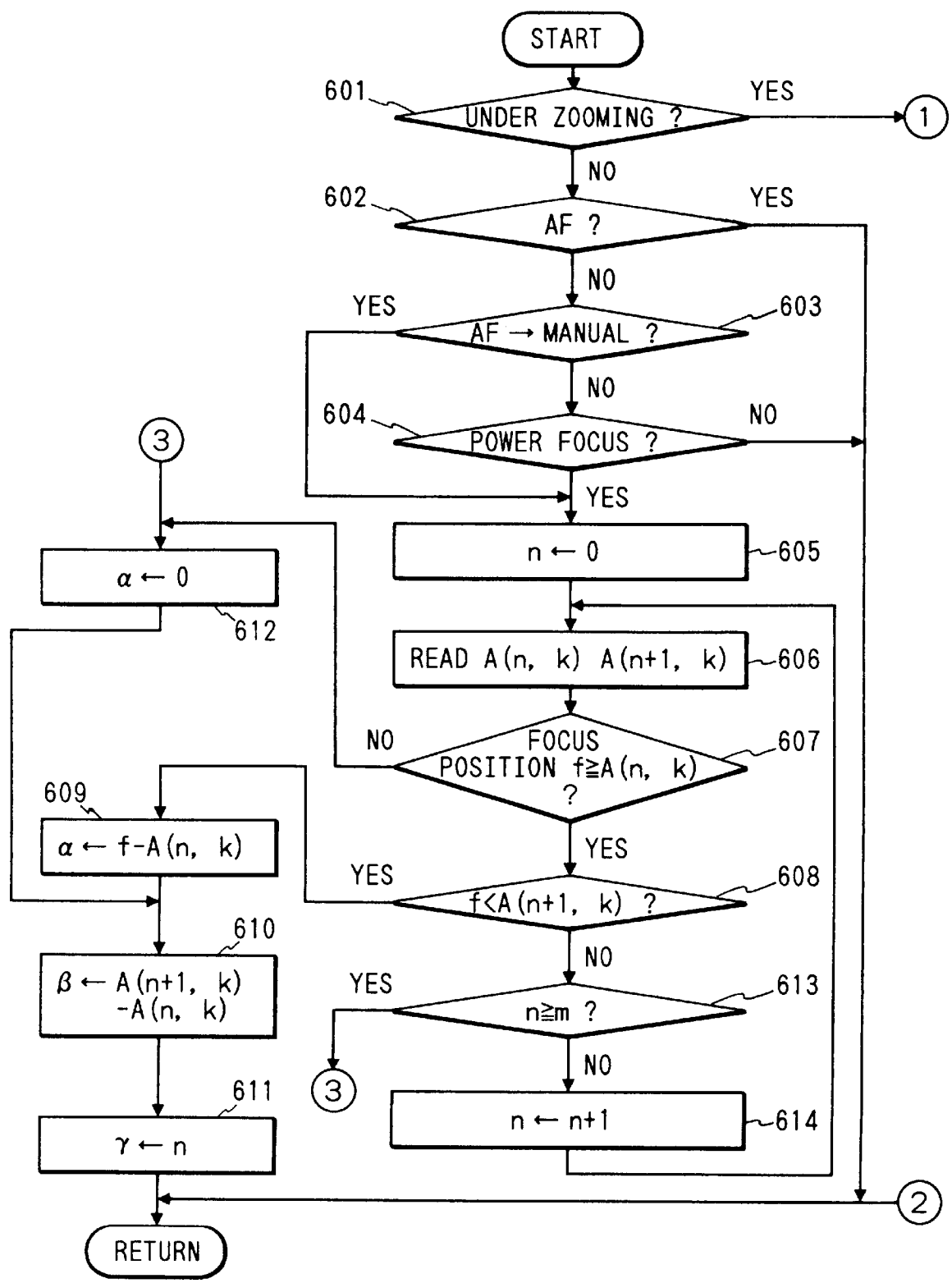
FIG. 15 is a flow chart showing lens control in zooming in an AF OFF mode.
Figure 16:
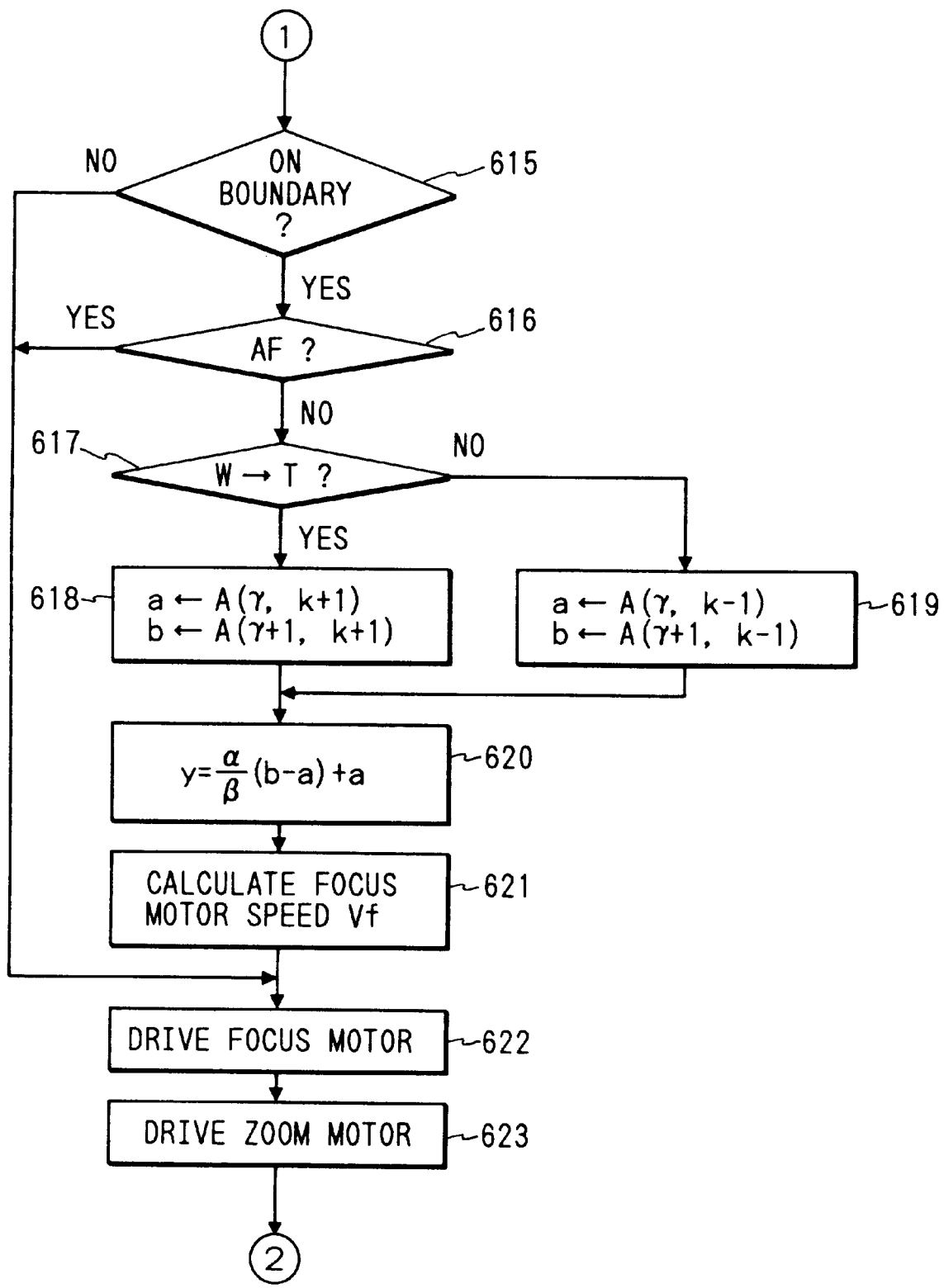
FIG. 16 is a flow chart showing the continuation of FIG. 15.

Lens control for zooming in the AF OFF mode will be described with reference to flow charts in FIGS. 15 and 16. The flows in FIGS. 15 and 16 are subroutines in which AF mode processing is executed in accordance with the contrast scheme (hill climbing scheme) for performing automatic focus control in accordance with focus voltage (clearness of a video signal) prior to execution of these flows. The flows in FIGS. 15 and 16 are based on an assumption that the magnification lens 12 is stopped at only a discrete position stored in the focusing lens locus table T in FIG. 14.

The lens control microcomputer 21 detects the ON/OFF conditions of a wide switch 32 and a tele switch 33 to determine whether the current condition is under zooming (step 601). If NO in step 601, one of the wide and tele switches 32 and 33 is turned on. However, if YES in step 601, the flow advances to step 615. If neither the wide switch 32 nor the tele switch 33 are ON, and zooming is not being performed, the ON/OFF condition of an AF switch 38 is detected to determine whether the AF mode is set (step 602). If the AF switch 38 is ON so that the AF mode is set, the subroutine returns to the main flow. In this manner, when the AF mode is set, focusing control is performed in an AF processing routine (not shown). However, if the AF switch 38 is OFF and the AF mode is not set, this indicates that a manual focusing mode is currently set. The lens control microcomputer 21 determines whether this manual focusing mode is switched from the AF mode or the manual focusing mode is kept set (step 603). If the lens control microcomputer 21 determines that the manual focusing mode is kept set, the ON/OFF conditions of an infinity switch 34 and a shortest range switch 35 are detected to determine whether a power focus condition is set (step 604). If one of the infinity switch 34 and the shortest range switch 35 is ON and the power focus condition is set, this indicates that manual focusing control is being performed. In this case, the flow advances to step 605. However, when neither the infinity switch 34 nor the shortest range switch 35 are ON, and the power focus condition is not set, manual focus control is performed, and the subroutine returns to the main flow to perform operations from step 605.

If the manual focusing mode is determined in step 603 to be switched from the AF mode, this indicates that automatic focusing control has already been performed in the AF mode before switching to the manual focusing mode. In this case, the flow skips step 604 and advances to step 605.

In steps 605 to 614, the object distance and the interpolation ratio in equation (1) are specified. That is, in step 605, an initial value of "0" is set in an object distance variable n. $A_{(n,k)}$ and $A_{(n+1,k)}$, i.e., the focus compensation lens corresponding to the distance n and the current magnification lens position k, and the object distance n+1 and the current magnification lens position k, are read out from the focusing lens locus table T (step 606).

The lens control microcomputer 21 determines whether the value of a current focus compensation lens position f is equal to or larger than the value of $A_{(n,k)}$ (step 607). As shown in FIG. 2, at a predetermined magnification lens position, the value of the focus compensation lens position f increases when the object distance comes close to the shortest range. Step 607 indicates that the microcomputer 21 determines whether the current focus compensation lens position f is located on the shortest range side as compared with the object distance n. If YES in step 607, the lens control microcomputer 21 determines whether the value of the current focus compensation lens position f is smaller than that corresponding to $A_{(n+1,k)}$, i.e., whether the current focus compensation lens position f is located on the infinity side as compared with the object distance n+1 (step 608). If YES in step 608, the current focus compensation lens position f is located between the magnification lens positions as the object distances n and n+1. In this case, f-$A_{(n,k)}$ is calculated, and the calculation result is stored as a constant α (step 609). $A_{(n+1,k)}$-$A_{(n,k)}$ is then calculated, and the calculation result is stored as a constant β (step 609). The contents of the current variable n are updated and stored as a constant γ (step 610), and the subroutine returns to the main flow.

If NO in step 607, the current focus compensation lens position f is located on the infinity side as compared with the object distance. In this case, "0" is stored as the constant α (step 612), and the flow advances to step 610.

If NO in step 608, the lens control microcomputer 231 determines whether the contents of the object distance variable n is equal to or more than m as the shortest range object distance (step 613). If NO in step 613, the contents of the variable n are incremented by one (step 614), and the flow returns to step 606 to check specific object distances between which the current focus compensation lens position f is located.

If the contents of the object distance variable n exceed m, this indicates that the current focus compensation lens position f is located at the shortest range object distance. In this case, as in the case wherein the current focus compensation lens position is located at the infinity object distance, "0" is stored as the constant α step 612), and the flow advances to step 610. These constants α, β, and γ are used as locus tracking parameters to be described later.

As described above, prior to zooming, the object distance corresponding to the focusing lens locus along which the focus compensation lens 15 traces is specified.

If the lens control microcomputer 21 determines in step 601 that the current condition is under zooming, the flow advances to step 615. The lens control microcomputer 21 determines in step 615 whether the current magnification lens position z=k is a discrete position (boundary position) stored in the focusing lens locus table T. In this flow, as described above, the magnification lens 12 is stopped only at each boundary position, and the magnification lens 12 is located on the boundary position at the start of zooming. The flow advances to step 616 to determine whether the AF mode is set. If YES in step 616, the flow advances to step 622.

If NO in step 616, the lens control microcomputer 21 determines whether the tele switch 33 is ON and the current condition is under zooming from the wide direction to the tele direction (step 617). If YES in step 617, the focus compensation lens position $A_{(\gamma,k+1)}$ corresponding to the object distance γ and the magnification lens position k+1 is read out from the focusing lens locus table T and is defined as a constant a. At the same time, the focus compensation lens position $A_{(\gamma+1,k+1)}$ corresponding to the object distance γ+1 and the magnification lens position k+1 is read out from the focusing lens locus table T and is defined as a constant b (step 618). That is, focus compensation lens position data each shifted by one position from the current magnification lens position k toward the tele direction are read out from the focusing lens locus table T in accordance with the focusing lens locus data of the object distance γ and the focusing lens locus data shifted by one position from the object distance γ toward the shortest range to store the constants a and b. In contrast to this, under zooming from the tele direction to the wide direction, the focus compensation lens position $A_{(\gamma,k-1)}$ corresponding to the object distance γ and the magnification lens position k-1 is read out from the focusing lens locus table T and is stored as a constant a, and the focus compensation lens position $A_{(\gamma-1,k-1)}$ corresponding to the object distance γ-1 and the magnification lens position k-1 is read out from the focusing lens locus table T and is stored as a constant b (step 619). That is, the focus compensation lens position data shifted by one position from the current magnification lens position k toward the wide direction are read out from the focusing lens locus table T using the focusing lens locus data of the object distance γ and the focusing lens locus data shifted from that of the current object distance γ by one position toward the wide direction, and the readout data are stored as the constants a and b.

A focused position (i.e., a position traced for focusing) y of the focus compensation lens 15 which corresponds to the magnification lens position z=k+1 or z=k-1 is obtained by equation (9) corresponding to equation (1) (step 620):

$$y=(b-a)\alpha/\beta+a \quad (9)$$

the selected focusing lens locus is solely determined because the constants $\alpha$ and $\beta$ are determined prior to the start of zooming.

A speed (called a focus speed) Vf for moving the focus compensation lens 15 in locus tracking upon movement of the magnification lens 12 during zooming is calculated (step 621). This focus speed Vf is calculated in accordance with a difference value (y–f: moving distance) between the target focus compensation lens position y and the current focus compensation lens position f, and a time required for the magnification lens 12 to move between the magnification lens positions z=k and z=k+1 or between the magnification lens positions z=k and z=k−1.

A focus motor 23a is driven (step 622), and a zoom motor 22a is driven (step 623). The flow then returns to the main flow.

When the lens control microcomputer 21 determines in step 615 that the magnification lens position is not a discrete position (boundary position) stored in the focusing lens locus table T, the flow skips steps 616 to 621 and advances to step 622. That is, the focus motor speed Vf is updated only when the magnification lens 12 is located on a boundary position. The focus compensation lens 15 is moved at the focus motor speed Vf at positions except for the boundary positions.

A method of driving the focus motor 23a and the zoom motor 22a in steps 622 and 623 will be described below.

Drivers 22b and 23b for driving the zoom motor 22a and the focus motor 23a are controlled by H/L direction signals S1 and S2 output from the lens control microcomputer 21 and speed signals S3 and S4 serving as rotation frequency signals having clock waveforms. The H (high) or L (low) level of the direction signal S1 input to the zoom motor 22a is determined in accordance with an ON or OFF state of each of a wide switch 32 and a tele switch 33. The H or L level of the direction signal S2 input to the focus motor 23a is determined by a positive or negative direction of the focus motor speed Vf.

The drivers 22b and 23b set the forward or reverse cycle of four motor excitation phases in accordance with the direction signals S1 and S2 and change applied voltages (or currents) of the four motor excitation phases in accordance with the speed signals S3 and S4, thereby controlling the direction and frequency of motor rotation.

The constants $\alpha$, $\beta$, $\gamma$, a, and b, and the variable n are stored in a work area or registers in the memory of the lens control microcomputer 21, and a special storage area (memory) need not be prepared for the constants and the variable.

In the flow charts described above, the magnification lens 12 is stopped at only each boundary position. However, an operation for causing the magnification lens 12 to stop at an arbitrary position in addition to the boundary positions will be described below.

In this case, in step 606 of FIG. 15, a focus compensation lens position is interpolated in accordance with the interpolation method shown in FIG. 5.

Referring to FIG. 5, the focus lens compensation lens position is plotted along the ordinate, and the magnification lens position is plotted along the abscissa. Lens locus positions (focus compensation lens positions with respect to the magnification lens positions) stored in the focusing lens locus table T are defined as $Z_0, \ldots, Z_k, Z_{k+1}, \ldots, Z_n$ for the magnification lens positions, and $a_0, \ldots, a_k, a_{k+1}, a_n$, $b_0, \ldots, b_k, b_{k+1}, \ldots, b_n, C_0, \ldots, C_k, C_{k+1}, \ldots, C_n$ are defined as the corresponding focus compensation lens positions in accordance with object distances.

Assume that the magnification lens position is located at the position $Z_x$ which is not stored in the focusing lens locus table T, and that the focus compensation lens position is $P_x$. The focus compensation lens positions $a_x$ and $b_x$ on the two focus lens loci corresponding to the magnification lens position $Z_x$ are obtained by the following equations:

$$a_x=(Z_x-Z_k)\times(a_{k+1}-a_k)/(Z_{k+1}-Z_k)+a_k$$

$$b_x=(Z_x-Z_k)\times(b_{k+1}-b_k)/(Z_{k+1}-Z_k)+b_k \quad (10)$$

An interpolation ratio is obtained from a nonstored magnification lens position and two stored magnification lens positions (e.g., Z=k and Z=k+1) on both the sides of the nonstored magnification lens position. A difference value between the two stored focus compensation lens positions on both the sides of the nonstored magnification lens position is interpolated to obtain two focus compensation lens positions $a_x$ and $b_x$ on the focus lens loci corresponding to the nonstored magnification lens position. Processing from step 607 in FIG. 15 will be performed.

As described above, in the lens control apparatus of this embodiment, the storage capacity and the processing time can be reduced in zooming in the AF OFF condition, and zooming can be performed while maintaining an accurately focused condition.

Unlike in the conventional case, focus compensation lens positions corresponding to a large number of magnification lens positions need not be newly stored, and the memory capacity can be reduced. The specific locus tracking parameters can be repeatedly used without being updated until a power focus operation. Even if zooming is repeated, blurring will not occur. The locus tracking parameters are specified prior to zooming, and this specifying processing can be performed separately from locus tracking control. Therefore, the control program capacity and the processing time can be advantageously reduced.

Fourth Embodiment

The fourth embodiment of the present invention will be described below.

In the inner focus type lens described above, zooming and focusing are performed while correcting the focal plane position with a focus compensation lens. For this reason, the focus compensation lens position (focusing lens locus) information corresponding to each lens position is stored in the microcomputer in advance.

The following method is also proposed. A current object distance is specified prior to zooming, and the interpolation ratio $\alpha/\beta=|P_{(n)}-a_{(a)}|/|b_{(n)}-a_{(n)}|$ of equation (1) is stored in advance. During zooming, the interpolation ratio $\alpha/\beta$ is fixed, and a focusing lens locus tracking target is obtained from equation (1).

In the prior art in FIGS. 1 to 3, the moving speed of the focus compensation lens 6 during movement of the magnification lens 3 is calculated and updated when the magnification lens 3 is located at a position (to be referred to as a boundary position) stored in the focusing lens locus table. However, when the zooming time is short as in high-speed zooming, a probability of causing the magnification lens 3 to set at a boundary position at the time of calculation of the moving speed of the focus compensation lens 6 becomes low. As a result, the moving speed of the focus compensation lens 6 cannot be appropriately updated, and the focused condition cannot be maintained.

In high-speed zooming, in order to appropriately perform updating of the moving speed of the focus compensation lens 6 and to always maintain the focused condition, the resolutions of typical focusing lens locus data stored in the focusing lens locus table in the magnification lens direction must be increased. That is, the number of data must be increased.

This embodiment has been made in consideration of these circumstances and has its object to appropriately update the moving speed of the focus compensation lens and perform zooming having good focusing lens locus tracking characteristics.

In order to achieve the above object, there is provided a lens control apparatus including a first lens for performing a magnification operation, a second lens for correcting movement of a focal plane during movement of the first lens, lens moving means for independently moving the first and second lenses to be parallel to an optical axis, focused position storage means for prestoring a focused position of the second lens with respect to a discrete position of the first lens in accordance with a discrete object distance, and focused position calculating means for calculating a focused position of the second lens with respect to a moving position of the first lens on the basis of current positions of the first and second lenses and information stored in the focused position storage means, comprising moving speed calculating means for calculating a moving speed of the second lens in accordance with a difference between the current position of the second lens and the focused position calculated by the focused position calculating means every time the first lens passes by the discrete position of the first lens which is stored in the focused position storage means during movement of the first lens.

The first lens serves as a lens for performing a magnification operation, and the second lens serves as a lens for correcting movement of the focal plane during movement of the first lens. The lens moving means independently moves the first and second lenses parallel to the optical axis. The focused position storage means prestores the focused positions of the second lens with respect to the discrete positions of the fist lens in accordance with the discrete object positions.

The object distance specifying means specifies the object distance on the basis of the current positions of the first and second lenses and the information stored in the focused position storage means when manual focus control is performed while the first lens position is being fixed.

The focused position calculating means calculates the focused position of the second lens with respect to the moving position of the first lens on the basis of the object distance specified by the object distance specifying means and the information stored in the focused position storage means when the lens moving means moves the first lens to perform the magnification operation.

The moving speed calculating means calculates the moving speed of the second lens in accordance with the current position of the second lens and the focused position calculated by the focused position calculating means every time the first lens passes by the discrete position of the first lens which is stored in the focused position storage means, during movement of the first lens.

The arrangement and operation of this embodiment will be described below. The circuit arrangement of this embodiment is the same as that in FIG. 13, and a detailed description thereof will be omitted. A processing program in a lens control microcomputer in this embodiment is different from that the embodiment shown in FIG. 14, and detailed processing operations will be described below.

When zooming is performed in the AF mode using the focusing lens locus table T shown in FIG. 14, the lens control microcomputer 21 performs zooming while selecting a focusing lens locus in the focusing lens locus table T using near- and far-focus pieces of information or while calculating a focusing lens position on the basis of the above focusing lens locus. In contrast to this, in zooming in the AF OFF mode, when a manual focusing operation is performed prior to zooming, the lens control microcomputer 21 specifies the object distance, calculates an interpolation ratio of equation (1) which corresponds to this object distance, calculates the focused position of the focus compensation lens 15 in accordance with equation (1) using this interpolation ratio during zooming, and causes the focus compensation lens 15 to trace the locus.

In zooming performed regardless of the AF or AF OFF mode, when the lens control microcomputer 21 causes the focus compensation lens 15 to trace the focusing lens locus and the magnification lens position is not located at a boundary position stored in the focusing lens locus table T, information interpolation in the direction of the magnification lens position (this position is also processed as a boundary position) to specify the locus tracking. At the same time, the lens control microcomputer 21 calculates and updates the speed of the focus compensation lens 15 every time a magnification lens 12 passes by a boundary position during zooming.

Figure 17:
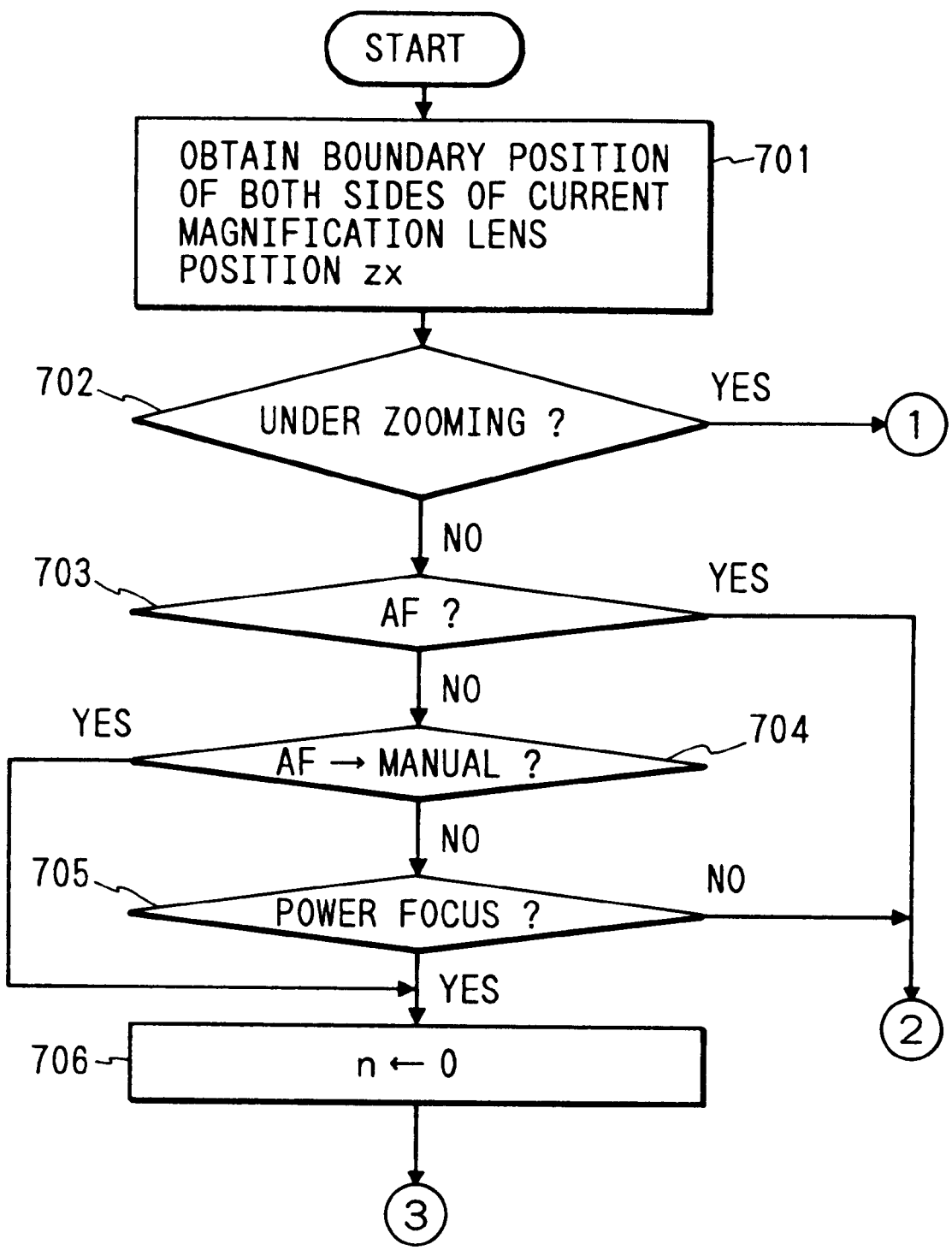
FIG. 17 is a flow chart showing a lens control operation according to the fourth embodiment of the present invention.
Figure 18:
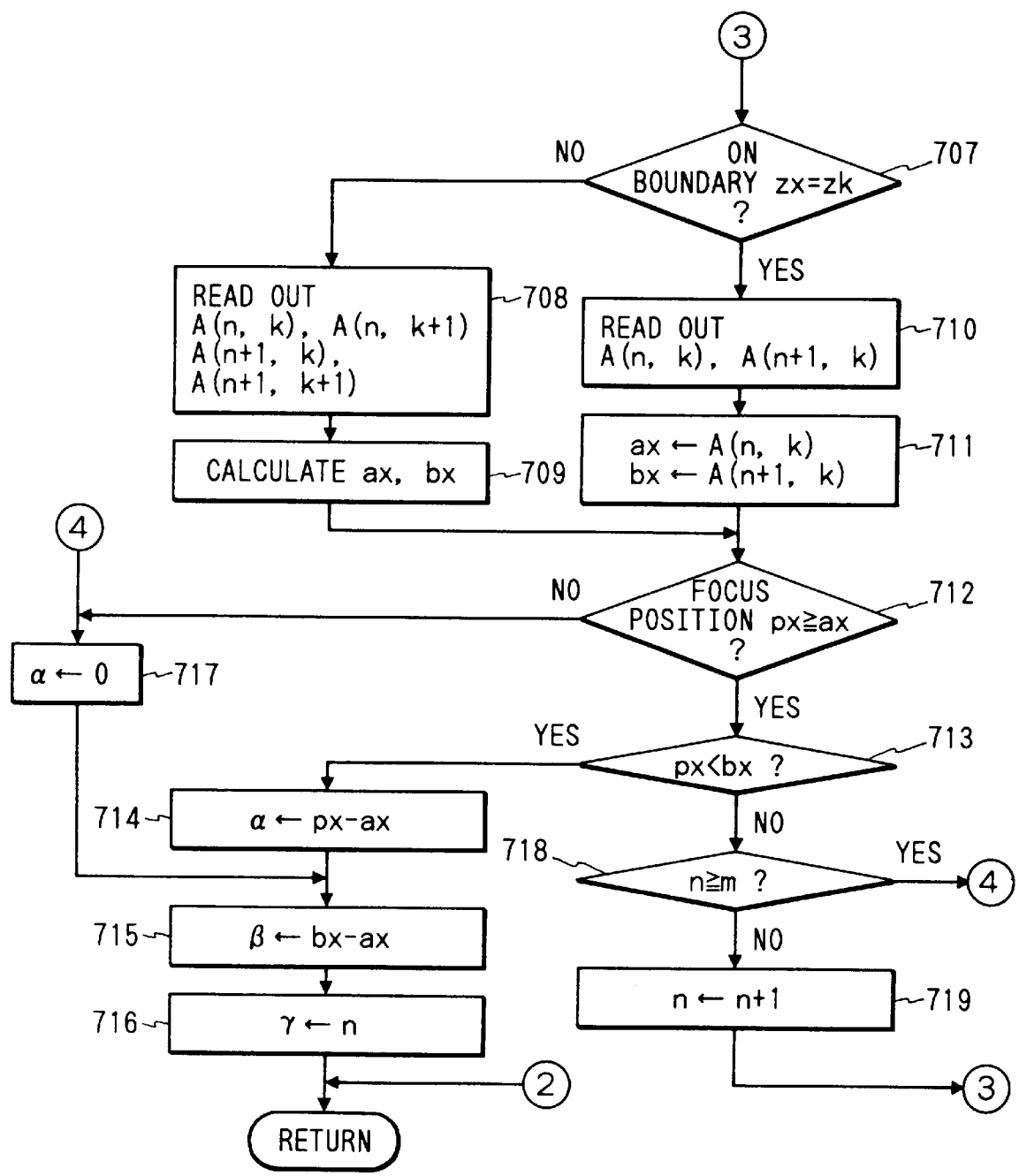
FIG. 18 is a flow chart showing the continuation of FIG. 17.
Figure 19:
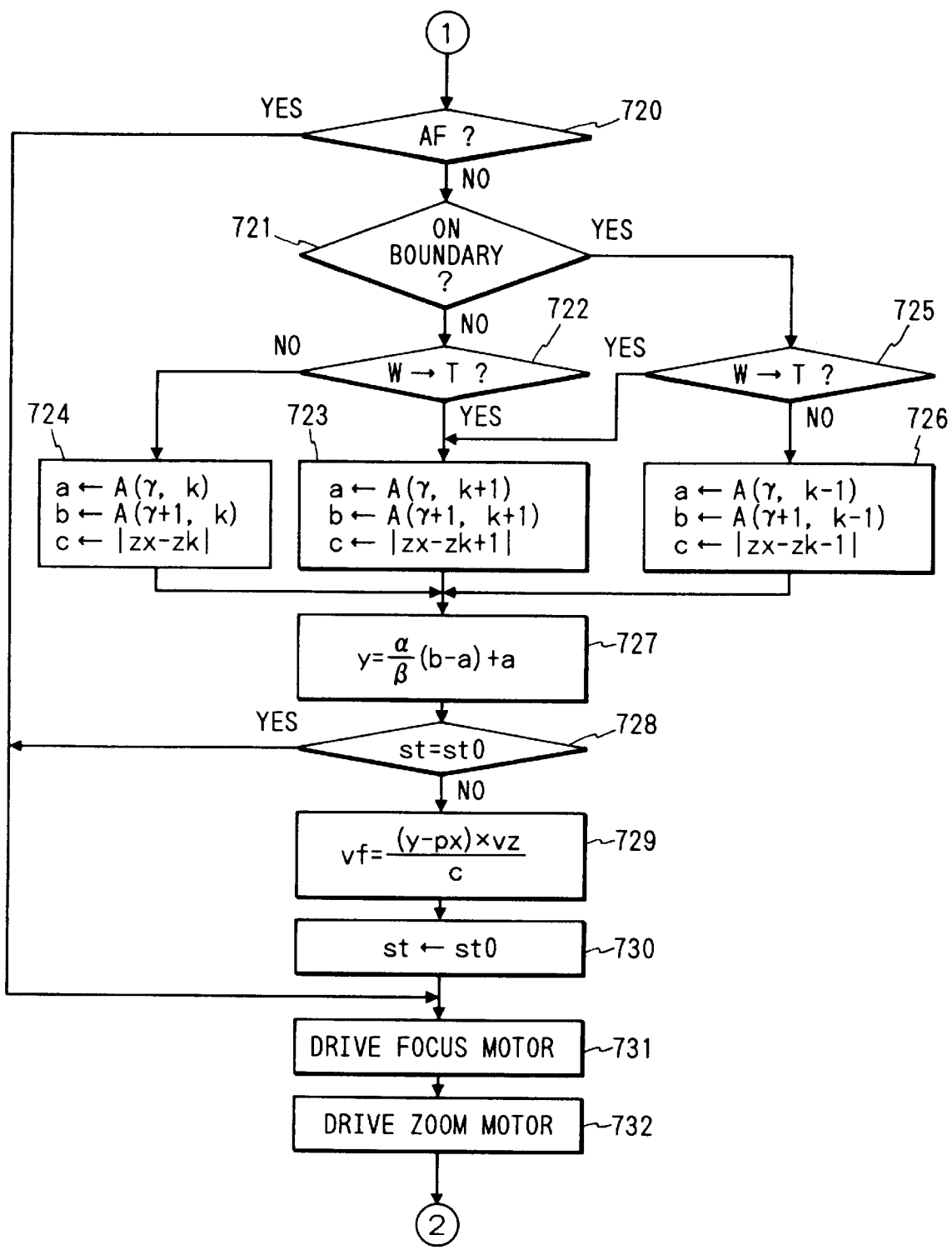
FIG. 19 is a flow chart showing the continuation of FIG. 18.

The lens control operations will be described with reference to flow charts in FIGS. 17, 18, and 19. The flows in FIGS. 17 to 19 are flows executed when zooming is performed in the AF OFF mode. The flows in FIGS. 17 to 19 are subroutines. Prior to execution of these flows, AF mode processing using the contrast scheme (hill climbing scheme) for performing automatic focus control in accordance with a focal voltage (clearness of a video signal), arithmetic processing for determining a specific zoom zone (to be described with reference to FIG. 20) of the magnification lens 12, and the like are performed.

The lens control microcomputer 21 checks specific boundaries which are stored in the focusing lens locus table T and between which the current magnification lens position $z_x$ (FIG. 14) is interposed. That is, the lens control microcomputer 21 checks the boundary positions of both the sides of the current magnification lens position (step 701). In this case, if the current magnification lens position $z_x$ is the same as the boundary position stored in the focusing lens locus table T (i.e., the magnification lens position $z_x$ is located above the boundary z=k), the boundaries on both the sides of the current magnification lens position zX are given as z=k−1 and k+1.

The ON/OFF conditions of a wide switch 32 and a tele switch 33 are detected to determine whether the current condition is under zooming (step 702). When one of the wide and tele switches 32 and 33 is turned on, and the current condition is under zooming, the flow advances to step 720 to be described later. However, if neither the wide switch 32 nor the tele switch 33 are turned on, and the current condition is not under zooming, the ON/OFF condition of an AF switch 38 is detected to determine whether the AF mode is set (step 703). If the AF switch 38 is ON so that the AF mode is set, the subroutine returns to the main flow. However, when the AF mode is set, focusing control is performed in an AF processing routine (not shown). However, if the AF switch 38 is OFF and the AF mode is not set, this indicates that a manual focusing mode is currently set. The lens control microcomputer 21 determines whether this manual focusing mode is switched from the AF mode or the manual focusing mode is kept set (step 704). If the lens control microcomputer 21 determines that the manual focusing mode is kept set, the ON/OFF conditions of an infinity switch 34 and a shortest range switch 35 are detected to determine whether a power focus condition is set (step 705). If one of the infinity switch 34 and the shortest range switch 35 is ON and the power focus condition is set, this indicates that manual focusing control is being performed. In this case, the flow advances to step 706. However, when neither the infinity switch 34 nor the shortest range switch 35 are ON, and the power focus condition is not set, manual focus control is performed, and the subroutine returns to the main flow to perform operations from step 706.

If the manual focusing mode is determined in step 704 to be switched from the AF mode, this indicates that automatic focusing control has already been performed in the AF mode before switching to the manual focusing mode. In this case, the flow skips step 705 and advances to step 706.

In steps 706 to 719, the object distance and the interpolation ratio in equation (1) are specified. That is, in step 706, an initial value of "0" is set in an object distance variable n. It is determined whether the current magnification lens position $z_x$ is not located at a boundary position, the flow advances to steps 708 and 709. In steps 708 and 709, processing for obtaining focusing lens locus points is performed in accordance with the interpolation in the direction of the magnification lens position, as shown in FIG. 5, when the current magnification lens position $Z_x$ is not stored in the focusing lens locus table T.

Referring to FIG. 5, the focus lens compensation lens position is plotted along the ordinate, and the magnification lens position is plotted along the abscissa. Lens locus positions (focus compensation lens positions with respect to the magnification lens positions) stored in the focusing lens locus table T are defined as $Z_0, \ldots, Z_k, Z_{k+1}, \ldots, Z_n$ for the magnification lens positions, and $a_0, \ldots, a_k, a_{k+1}, a_n$, $b_0, \ldots, b_k, b_{k+1}, \ldots, b_n, C_0, \ldots, C_k, C_{k+1}, \ldots, C_n$ are defined as the correspond focus compensation lens positions in accordance with object distances.

Assume that the magnification lens position is located at the position $Z_x$ which is not stored in the focusing lens locus table T, and that the focus compensation lens position is $P_x$. The focus compensation lens positions $a_x$ and $b_x$ on the two focus lens loci corresponding to the magnification lens position $Z_x$ are obtained by equations (10) described above:

$$a_x=(Z_x-Z_k)\times(a_{k+1}-a_k)/(Z_{k+1}-Z_k)+a_k$$

$$b_x=(Z_x-Z_k)\times(b_{k+1}-b_k)/(Z_{k+1}-Z_k)+b_k \qquad (10)$$

An interpolation ratio is obtained from a nonstored magnification lens position and two stored magnification lens positions (e.g., Z=k and Z=k+1 in FIG. 5) on both the sides of the nonstored magnification lens position. A difference value between the two stored focus compensation lens positions on both the sides of the nonstored magnification lens position is interpolated to obtain two focus compensation lens positions $a_x$ and $b_x$ on the focus lens loci corresponding to the nonstored magnification lens position.

In step 708, focusing lens locus data $A_{(n,k)}$, $A_{(n,k+1)}$, $A_{(n+1,k)}$, and $A_{(n+1,k+1)}$ corresponding to the two object distances n and n+1 on both the sides of the magnification lens position $z_x$, which are required to perform calculations according to equations (10) are read out. In step 709, $a_x$ and $b_x$ are calculated in accordance with equation (2) using $a_k=A_{(n,k)}$, $a_{k+1}=A_{(n,k+1)}$, $b_k=A_{(n+1,k)}$, and $b_{k+1}=A_{(n+1,k+1)}$.

If it is determined in step 707 that the current magnification lens position $z_x$ is on the boundary, $A_{(n,k)}$ and $A_{(n+1,k)}$, i.e., the focus compensation lens positions corresponding to the distance n and the current magnification lens position k, and the object distance n+1 and the current magnification lens position k, are read out from the focusing lens locus table T (step 710). $A_{(n,k)}$ is stored as the constant $a_x$, and $A_{(n+1,k)}$ is stored as the constant $b_x$.

After step 709 or 711, the flow advances to step 712 to determine whether the value of the current focus compensation lens $p_x$ is equal to or larger than the constant $a_x$. As shown in FIG. 2, at the predetermined magnification lens position, the value of the focus compensation lens $p_x$ increases when the object distance comes close to the shortest range. This indicates that step 712 determines whether the current focus compensation lens position $p_x$ is located on the shortest range side as compared with the object distance n. It is determined in step 712 that the current focus compensation lens position $p_x$ is located on the shortest side as compared with the object distance n, it is determined whether the value of the current focus compensation lens position $p_x$ is smaller than $A_{(n+1,k)}$, i.e., whether the current focus compensation lens position $p_x$ is located on the infinity side as compared with the object distance n+1 (step 713). As a result, when it is determined that the current focus compensation lens position f is located on the infinity side as compared with the object distance n+1, this indicates that the current focus compensation lens $p_x$ is located between magnification lens positions of the object distances n and n+1. In this case, $(p_x-a_x)$ is calculated, and the calculation result is stored as a constant α step 714). The contents of the current variable n are stored as a constant γ (step 716), and the subroutine returns to the main flow.

It is determined in step 712 that the current focus compensation lens position $p_x$ is located on the infinity side as compared with the object distance n, the current focus compensation lens position $p_x$ is located at the infinity object distance. In this case, "0" is stored as the constant α step 717), and the flow advances to step 715.

When it is determined in step 713 whether the current focus compensation lens position $p_x$ is located on the shortest range side as compared with the object distance n+1, the contents of the object distance variable n are determined whether to be m (the shortest range in the focusing lens locus table T) or more (step 718). If NO in step 718, the contents of the variable n are incremented by one (step 719). The flow returns to step 707 to repeat the same operations as described above.

To the contrary, if the contents of the object distance variable n are m or more, this indicates that the current focus compensation lens position $p_x$ is located at the shortest range object distance. In this case, as in the case wherein the current focus compensation lens position px is located at the infinity object distance, "0" is set as the constant α step 717), and the flow advances to step 715. These constants α, β, and γ are utilized as locus tracking parameters.

As described above, prior to zooming, the object distance corresponding to the focusing lens locus traced by the focus compensation lens 15 is specified.

When it is determined in step 702 that the current condition is under zooming, the flow advances to step 720, as described above. It is determined in step 720 whether the AF mode is set. If YES in step 720, the flow advances to step 731 to be described later. However, if NO in step 720, it is determined that the current magnification lens position z=k is on a discrete position (boundary) recorded in the focusing lens locus table T (step 721). If NO in step 721, it is determined whether the tele switch 33 is ON and zooming is being performed from the wide direction to the tele direction (step 722). If YES in step 722, of all the boundary position data on both the sides of the current magnification lens position $z_x$, tele-side data are read out from the focusing lens locus table T. $A_{(\gamma,k+1)}$ is stored as a constant a, $A_{(\gamma+1,k+1)}$ is stored as a constant b, and $z_x-z_{k+1}$ as a constant c (step 723). However, it is determined that zooming is being performed from the tele side to the wide side, of all the boundary position data on both the sides of the current magnification lens position $z_x$, wide-side data are read out from the focusing lens locus table T. $A_{(\gamma,k)}$ is stored as a constant a, $A_{(\gamma+1,k)}$ is stored as a constant b, and $z_x -z_k$ is stored as a constant c (step 724).

If it is determined in step 721 that the current magnification lens position z=k is on a boundary, it is determined whether zooming is being performed from the wide direction to the tele direction (step 725). If YES in step 725, the flow advances to step 723. If NO in step 725, the flow advances to step 726. In step 726, wide-side boundary data shifted from the current magnification lens position $z=z_k$ by one position toward the wide side is read out from the focusing lens locus table T. $A_{(\gamma,k-1)}$ is stored as a constant a, $A_{(\gamma+1,k-1)}$ is stored as a constant b, and $z_z-z_k-1$ is stored as a constant c.

When the operation in any one of steps 723, 724, and 726 is completed, the flow advances to step 727 to calculate a focused position (i.e., a position to be traced for focusing) of the focus compensation lens 15 which corresponds to the magnification lens position z=k+1 or z=k−1 in accordance with equation (9) described above:

$$y=(b-a)\alpha/\beta+a$$

since the constants α and β are determined prior to zooming, as described above, the focusing lens locus to be traced is solely determined.

It is determined whether the magnification lens 12 enters from a previous zone st to a next zoom zone st0 through a boundary during movement (step 728). This zoom zone is determined by a zoom zone calculation processing routine (FIG. 20) different from those in FIGS. 17 to 19.

Figure 20:
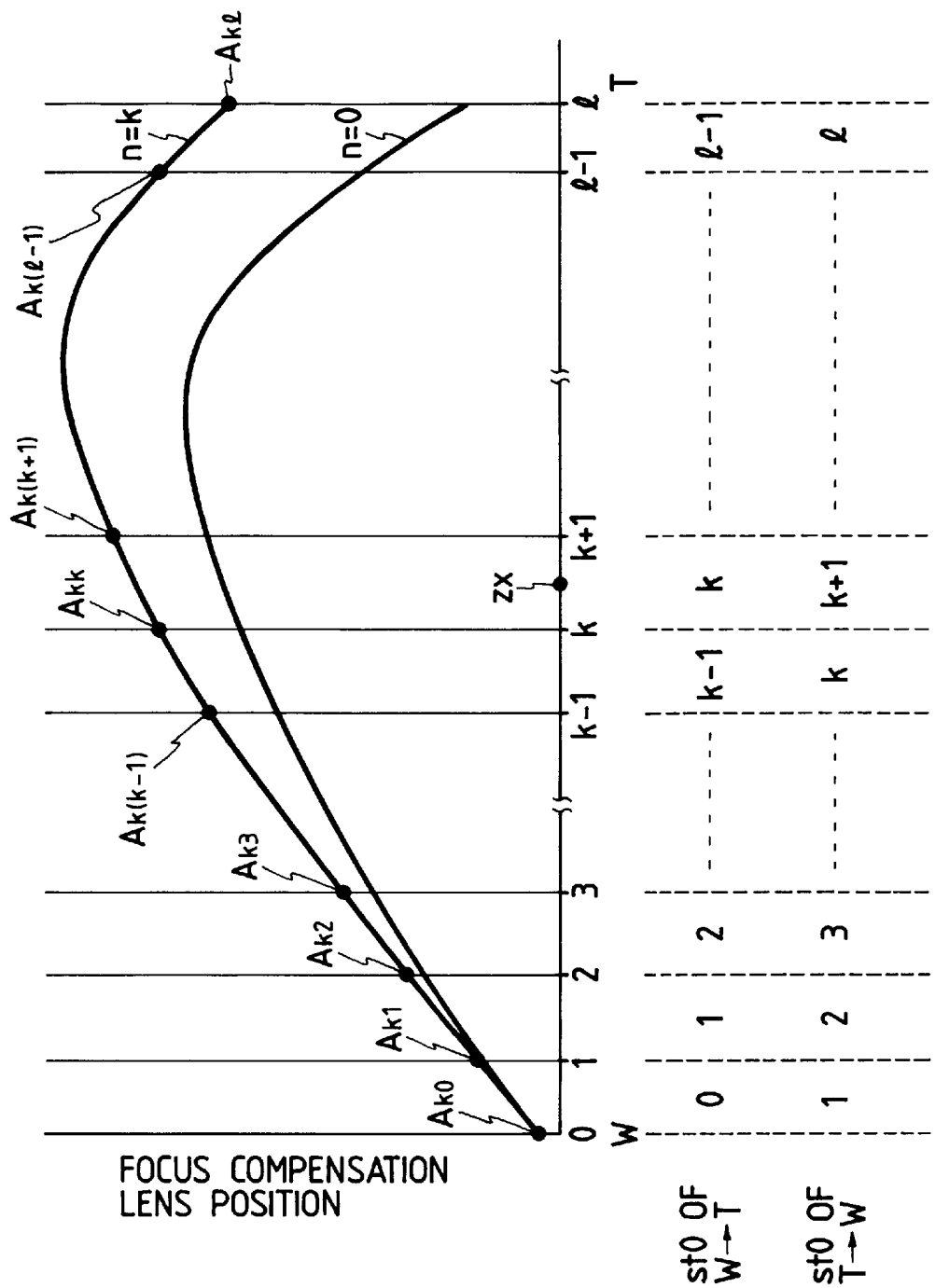
FIG. 20 is a graph showing a method of determining a zoom zone.
Figure 21:
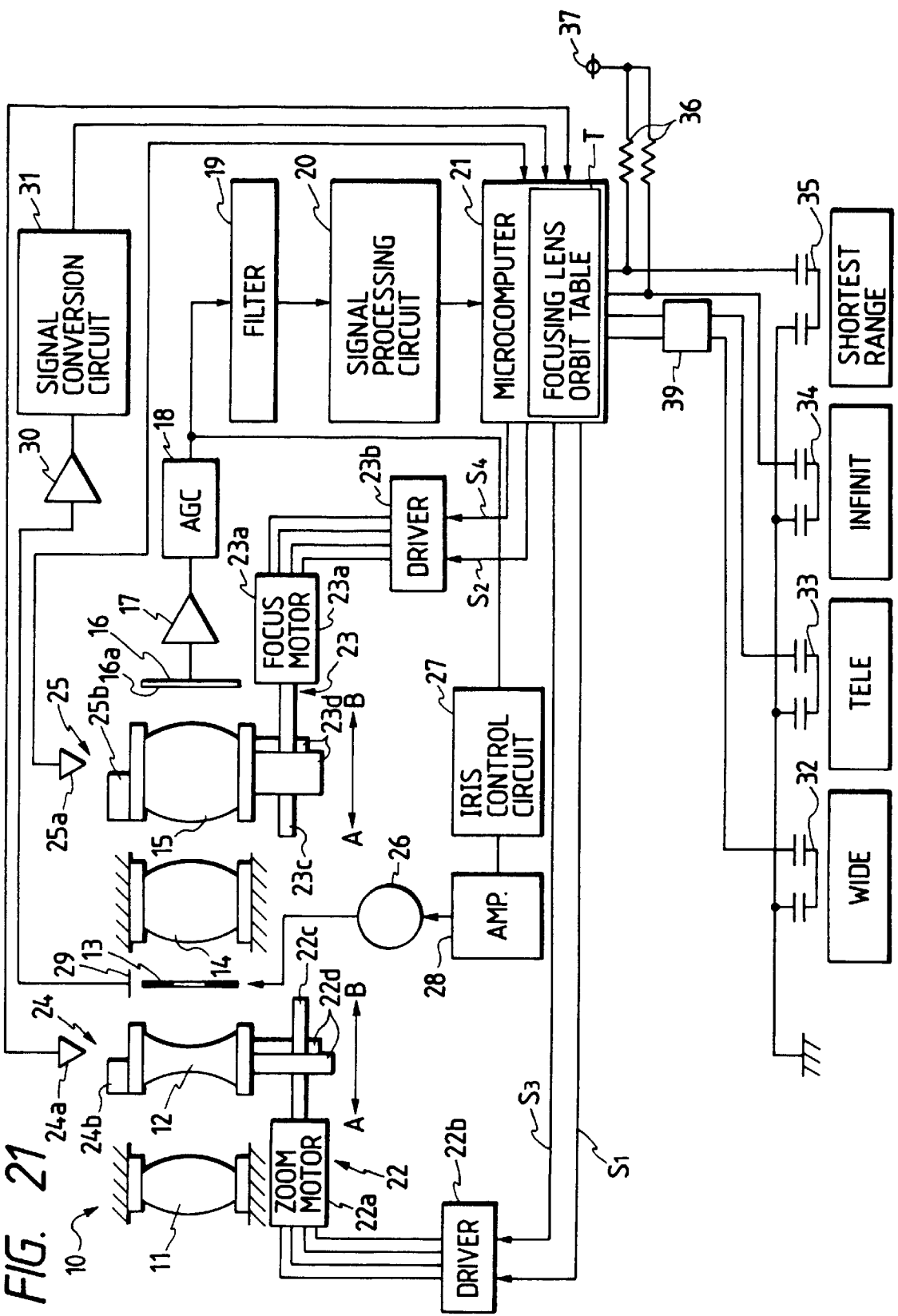
FIG. 21 is a block diagram showing a schematic arrangement of a video camera having a lens control apparatus according to the fifth embodiment of the present invention.

FIG. 20 is a graph obtained by extracting and imaging two focusing lens locus data for object distances n=0 and n=k from the focusing lens locus table T in FIG. 14. The zoom zone st0 represents a zone (including values on the boundary) interposed by the stored boundaries (magnification lens positions). The definitions of the zoom zone st0 are different depending on different zoom directions.

That is, when the magnification lens 12 is located on a boundary, the value of the zoom zone st0 is equal to that of the magnification lens position z.

Assume that the magnification lens 12 is not located on any boundary. In this case, as shown in FIG. 20, if the zooming direction is directed from the wide direction to the tele direction, the value of the zoom zone st0 is determined as a tele-side boundary value of the boundary values on both the sides of the current magnification lens position. However, if the zooming direction is directed from the tele direction to the wide direction, the value of the zoom zone st0 is determined as a wide-side boundary value on both the sides of the current magnification lens position.

It is determined in step 728 using the determined value of the zoom zone st0 whether the value of the current zoom zone st0 is equal to the value of the zoom zone (reference zoom zone) st obtained upon previous processing through the flow from step 720. If YES in step 728, and it is determined that the current zone is not changed to the next zoom zone, the flow advances to step 731. However, if NO in step 728, and the current zoom zone is changed to the next zoom zone, a speed vf (to be referred to as a focus speed) for moving the focus compensation lens 15 upon movement of the magnification lens 12 during zooming is calculated (step 729). This focus speed vf is calculated in accordance with a difference $(y-p_x)$ between the target focus compensation lens position y and the current magnification lens position $p_x$, and a time ([Magnification Lens Position Difference c]/[Constant Zoom Speed vz]) required for the magnification lens to move between the current magnification lens position and the target magnification lens position. That is, the focus speed vf is obtained by the following equation:

$$vf=\{(y-p_x)\times Vz\}/c \qquad (11)$$

The value of the current zoom zone st0 is stored as the reference zoom zone st (step 730).

In the processing of steps 728 to 730, every time the magnification lens position is shifted into a new zoom zone (every time the value of the position exceeds a boundary value), the focus speed vf is calculated and updated. When the magnification lens is located within the same zoom zone, the focus speed vf is not updated. As described above, every time the magnification lens position is shifted to a new zoom zone, the focus speed vf is calculated and updated. Even if high-speed zooming is performed, the focus speed vf can be appropriately updated to maintain the focused condition.

Since the focus speed vf is not updated within the same zoom zone, the influence of calculation errors in equation (11) can be minimized. Since the decimal part is neglected, calculation accuracy may be degraded. When the magnification lens position difference c is very small, the focus speed vf may be excessively high. When a focusing operation (compensation operation) is performed at this high focus speed vf, the locus is deviated from the accurate locus to cause blurring. In this embodiment, however, the focus speed vf is not updated within the same zoom zone, the magnification lens position difference c can be set considerably large, thus solving the above problem.

The tracking focus speed vf is always determined on the basis of the current focus lens position under the above lens control. For this reason, even if a small error occurs in the tracking target position due to speed calculation accuracy and tracking operation accuracy, the error will not be accumulated in the next speed calculation. Therefore, zooming almost free from blurring can be performed.

A focus motor 23a is driven (step 731), a zoom motor 22a is driven (step 732), and the subroutine returns to the main flow.

A method of driving the focus motor 23a and the zoom motor 22a in steps 731 and 732 will be described below.

Drivers 22b and 23b for driving the zoom motor 22a and the focus motor 23a are controlled by H/L direction signals S1 and S2 output from the lens control microcomputer 21 and speed signals S3 and S4 serving as rotation frequency signals having clock waveforms. The H (high) or L (low) level of the direction signal Si input to the zoom motor 22a is determined in accordance with an ON or OFF state of each of a wide switch 32 and a tele switch 33. The H or L level of the direction signal S2 input to the focus motor 23a is determined by a positive or negative direction of the focus motor speed Vf.

The drivers 22b and 23b set the forward or reverse cycle of four motor excitation phases in accordance with the direction signals S1 and S2 and change applied voltages (or currents) of the four motor excitation phases in accordance with the speed signals S3 and S4, thereby controlling the direction and frequency of motor rotation.

According to the lens control apparatus of this embodiment, as has been described above in detail, every time the magnification lens position is shifted to a new zoom zone (every time the magnification lens passes by a boundary position), the moving speed of the focus compensation lens is calculated. Even in high-speed zooming, the moving speed of the focus compensation lens can be appropriately updated without increasing the number of focusing lens locus data, thereby performing zooming having good focusing lens tracking characteristics.

Fifth Embodiment

In the conventional inner focus lens control prior to the present invention, as shown in FIG. 3, the magnification lens position and the focus compensation lens position are detected, and the pieces of detection information are compared with the pieces of prestored focusing lens locus information to calculate the focus compensation lens speed or the next moving position.

When the moving speed of the magnification lens 3 is high as in high-speed zooming, the moving speed of the focus compensation lens 6 for maintaining the focused condition may be increased near a tele end and may often exceed the step-out limitation speed of a focus compensation lens moving motor. In this case, the focused condition cannot be maintained, and an image becomes largely blurred.

A scheme for decreasing the moving speed of the magnification lens 3 near the tele end so as to prevent the moving speed of the focus compensation lens 6 from exceeding the step-out limitation speed is realized. According to this scheme, a DC motor is generally used as a magnification lens moving actuator.

In speed reduction control of the moving speed of the magnification lens 3 by means of the DC motor, the DC motor must be servo-controlled. For this purpose, the size of the control circuit becomes bulky, and control becomes complicated.

In speed reduction control of the moving speed of the magnification lens 3, assume that speed reduction is interrupted when the moving speed of the focus compensation lens 6 is lower than the step-out limitation speed, and that speed reduction is performed again because the moving speed of the focus compensation lens 6 exceeds the step-out limitation speed. In this case, acceleration and speed reduction for the zoom speed are repeated to make the user feel discomfort.

Since speed reduction itself makes the user feel discomfort, it is preferable to minimize the speed reduction time. It is also preferable to smoothly perform speed reduction while maintaining the focused condition.

This embodiment has been made in consideration of the above circumstances, and has as its object to smoothly control a magnification lens moving speed with a simple arrangement and simple control, thereby always maintaining a focused condition.

In order to achieve the above object, there is disclosed a lens control apparatus including a first lens for performing a magnification operation, a second lens for correcting movement of a focal plane during movement of the first lens, a stepping motor for moving the first lens to be parallel to an optical axis, lens moving means for moving the second lens to be parallel to the optical axis, focused position storage means for prestoring a focused position of the second lens with respect to a discrete position of the first lens in accordance with a discrete object distance, and focused position calculating means for calculating a focused position of the second lens with respect to a moving position of the first lens on the basis of current positions of the first and second lenses and information stored in the focused position storage means, comprising control means for controlling the stepping motor to change a moving speed of the first lens when a moving speed of the second lens exceeds a predetermined value during movement of the first lens.

That is, the first lens serves as a lens for performing a magnification operation, and the second lens serves as a lens for correcting movement of the focal plane during movement of the first lens. The stepping motor and the lens moving means independently move the first and second lenses parallel to the optical axis.

The focused position storage means prestores the focused positions of the second lens with respect to the discrete positions of the fist lens in accordance with the discrete object positions.

The focused position calculating means calculates the focused position of the second lens with respect to the moving position of the first lens on the basis of the current positions of the first and second positions and the information stored in the focused position storage means.

The control means controls the stepping motor to change the moving speed of the first lens when the moving speed of the second lens exceeds a predetermined value during movement of the first lens.

The detailed arrangement and operation of this embodiment will be described below. The circuit arrangement is substantially the same as those in FIGS. 4 and 13, except that wide and tele switches 32 and 33 are connected to a lens control microcomputer 21 through a voltage control circuit 36. Processing programs in the lens control microcomputer 21 are different from those in the embodiments of FIGS. 4 and 13. The processing operations of this embodiment will be described below.

When the wide or tele switch 32 or 33 is depressed, the voltage control circuit 36 changes a voltage to the lens control microcomputer 21 in accordance with a depression force of the depressed switch. The lens control microcomputer 21 determines a specific zoom speed level of the variable speed zooming for moving a magnification lens 12 in accordance with the voltage from the voltage control circuit 36. For example, when the voltage is lower than 2 V, the magnification lens 12 is moved in low speed zooming. When the voltage is equal to or higher than 2 V and lower than 4 V, the magnification lens 12 is moved in middle speed zooming. When the voltage is equal to or higher than 4 V and less than 5 V, the magnification lens 12 is moved in high speed zooming.

A focusing lens locus table T of focusing lens locus information, as shown in FIG. 14 is preset in the lens control microcomputer 21. On the basis of this table, each lens control operation is performed as described above.

In zooming control, the lens control microcomputer 21 causes a focus compensation lens 15 to follow movement of the magnification lens 12 in accordance with the focusing lens locus, thereby performing zooming while maintaining a focused condition. In this case, when the moving speed of the focus compensation lens 15 is a predetermined value or more, the lens control microcomputer 21 decreases the moving speed of the magnification lens 12.

Figure 22:
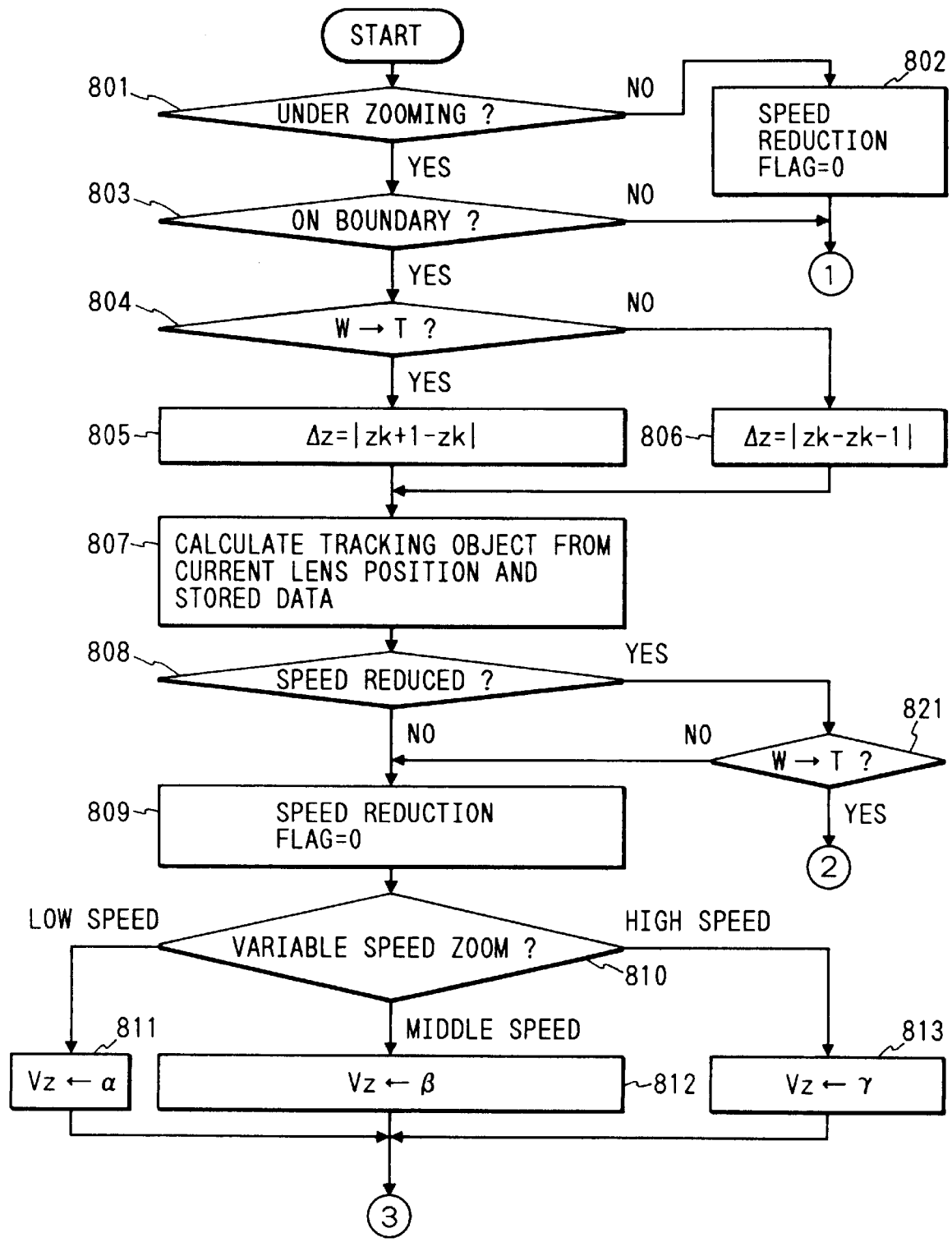
FIG. 22 is a flow chart showing a lens control operation of the fifth embodiment.
Figure 23:
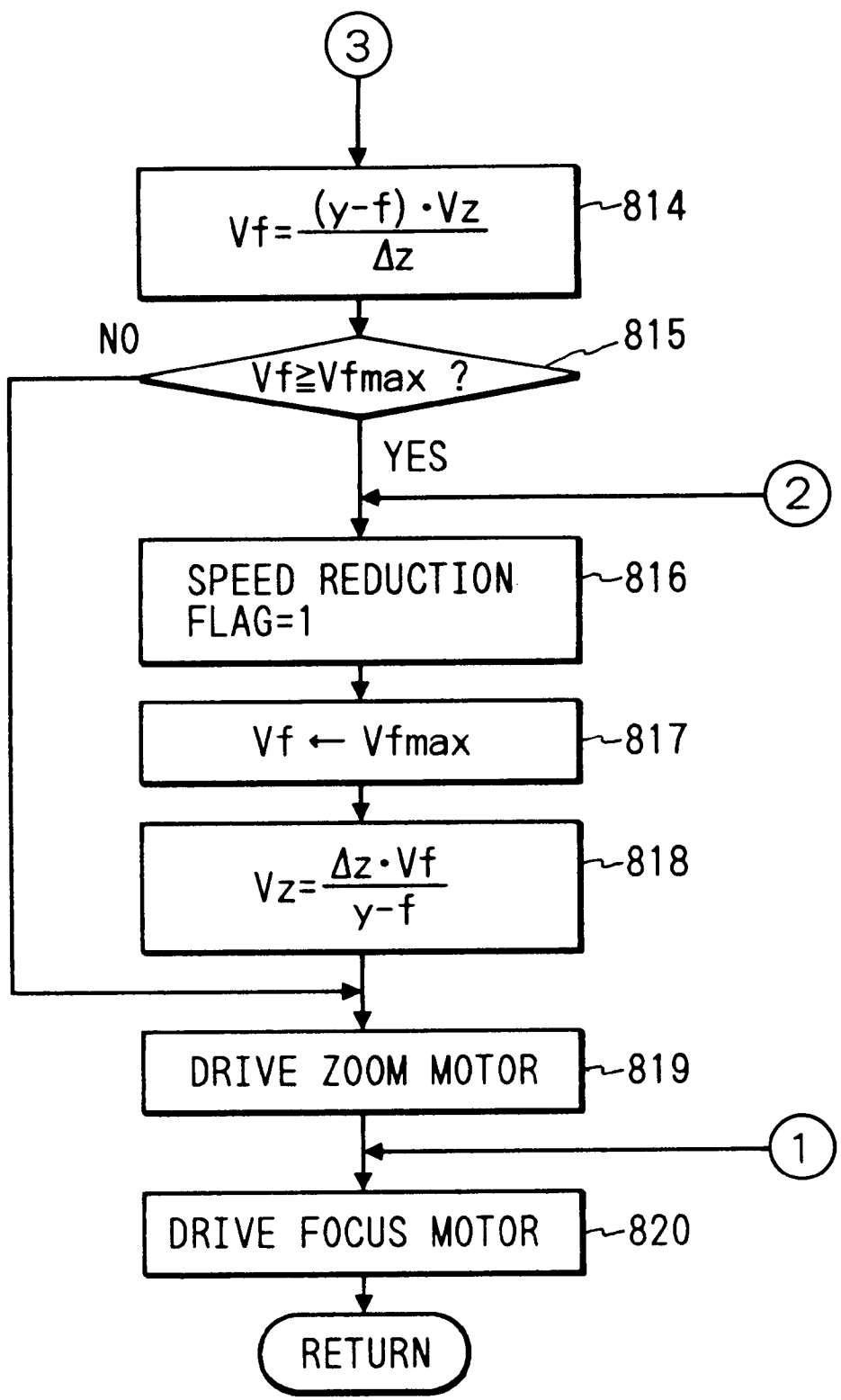
FIG. 23 is a flow chart showing the continuation of FIG. 22.

The lens control operations will be described with reference to flow charts in FIGS. 22 and 23. The flows in FIGS.

22 and 23 are flows executed when zooming is performed in the AF OFF mode. The flows in FIGS. 22 and 23 are subroutines. Prior to execution of these flows, AF mode processing using the contrast scheme (hill climbing scheme) for performing automatic focus control in accordance with a focal voltage (clearness of a video signal) is performed.

The lens control microcomputer 21 detects the ON/OFF conditions of the wide and tele switches 32 and 33 to determine whether the current condition is under zooming (step 801). If neither the wide switch 32 nor the tele switch 33 are turned on, and the current condition is not under zooming, a speed reduction flag is reset (step 802), and a focus motor 23a is driven (step 821).

To the contrary, if one of the wide and tele switches 32 and 33 is ON and the current condition is under zooming, the lens control microcomputer 21 determines whether a current magnification lens position $z_k$ is located on a magnification lens position (this position is called a boundary position) stored in the focusing lens locus table T (step 803). If YES in step 803, the lens control computer 21 determines whether the tele switch 33 is ON and zooming is being performed from the wide direction to the tele direction (step 804). If YES in step 804, an absolute value of a difference (positional difference) between the current magnification lens position $z_k$ and a boundary position $z_{k+1}$ shifted therefrom by one position toward the tele side is stored as a variable $\Delta z$ (step 805). However, if NO in step 804, an absolute value of a difference (positional difference) between the current magnification lens position Zk and a boundary position $z_{k-1}$ shifted therefrom by one position toward the wide direction is stored as a variable $\Delta z$ (step 806).

When processing in step 805 or 806 is completed, the flow advances to step 807 to calculate a focused position (i.e., a position to be traced for focusing) of the focus compensation lens 15 which corresponds to the target magnification lens position $z_{k+1}$ or $z_{k-1}$ of the magnification lens 12 is calculated in accordance with equation (1). In step 808, the lens control microcomputer 21 determines on the basis of the speed reduction flag whether the speed reduction flag represents a speed-reduced condition. If the speed reduction flag is reset and the zoom speed is not set in the speed-reduced condition, the speed reduction flag is reset (step 809). The lens control microcomputer 21 determines the voltage level of the voltage supplied from the voltage control circuit 36, which voltage level corresponds to the depression force of the wide or tele switch 32 or 33, thereby determining that the photographer or user designates a low speed, a middle speed, or a high speed as a standard zoom sped (step 810). As a result, when the voltage level represents low speed zooming, a low speed value a is stored as a zoom speed Vz (step 811). When the voltage level represents middle speed zooming, a middle speed value β is stored as the zoom speed Vz (step 812). When the voltage level represents high speed zooming, a high speed value γ is stored as the zoom speed Vz (step 813).

When the zoom speed Vz is determined as described above, a speed (focus speed) Vf for moving the focus compensation lens 15 upon movement of the magnification lens 12 during zooming is calculated (step 814). This focus speed Vf is given by the following equation if the current position of the focus compensation lens 15 is defined as f:

$$Vf = \{(y-f) \times Vz\}/\Delta z \quad (12)$$

The lens microcomputer 21 determines whether the calculated focus speed Vf is equal to or higher than a maximum speed Vfmax determined in consideration of the step-out limitation speed (step 815). If the focus speed Vf is lower than the maximum focus speed Vfmax, the flow advances to step 819. However, the focus speed Vf is equal to or higher than the maximum focus speed Vfmax, the speed reduction flag is set (step 816). The maximum focus speed Vfmax is stored as the focus speed Vf (step 817). A zoom speed (i.e., a speed reduction speed in this case) Vz is calculated (step 818) in accordance with the following equation obtained by rewriting equation (12):

$$Vz = (\Delta z \times Vf)/(y-f) \quad (13)$$

A zoom motor 22a is driven to move the magnification lens 12 at the zoom speed Vz (step 819), and the focus motor 23a is driven to move the focus compensation lens 15 at the focus speed Vf (step 820). The flow returns to the main flow. In this case, as can be apparent from the above description, when the focus speed Vf calculated in step 814 is determined to be equal to or higher than the maximum focus speed Vfmax in step 815, the magnification lens 12 is driven at the reduced speed calculated in step 818. When the focus speed Vf is determined to be lower than the maximum focus speed Vfmax, the magnification lens 12 is driven at one of the standard speeds stored in steps 811, 812, and 813. If the calculated focus speed Vf is equal to or higher than the maximum focus speed Vfmax, the focus compensation lens 15 is driven at the maximum focus speed Vfmax in the processing of step 817. However, the focus speed Vf is determined to be lower than the maximum focus speed Vfmax, the focus compensation lens 15 is moved at the calculated focus speed Vf.

A method of driving the focus motor 23a and the zoom motor 22a in steps 819 and 820 will be described below.

Drivers 22b and 23b for driving the zoom motor 22a and the focus motor 23a are controlled by H/L direction signals S1 and S2 output from the lens control microcomputer 21 and speed signals S3 and S4 serving as rotation frequency signals having clock waveforms. The H (high) or L (low) level of the direction signal S1 input to the zoom motor 22a is determined in accordance with an ON or OFF state of each of a wide switch 32 and a tele switch 33. The H or L level of the direction signal S2 input to the focus motor 23a is determined by a positive or negative direction of the focus motor speed Vf.

The drivers 22b and 23b set the forward or reverse cycle of four motor excitation phases in accordance with the direction signals S1 and S2 and change applied voltages (or currents) of the four motor excitation phases in accordance with the speed signals S3 and S4, thereby controlling the direction and frequency of motor rotation, i.e., the moving directions and speeds of the magnification lens 12 and the focus compensation lens 15.

The actuators (the zoom motor 22a and the focus motor 23a) for moving the magnification lens 12 and the focus compensation lens 15 do not comprise DC motors, but stepping motors. Servo control as in speed reduction control of the magnification lens 12 need not be performed. The circuit size of the driver 22b (the same also applies to the driver 23b) can be reduced, the program capacity of the lens control microcomputer 21 can be reduced, and control can be simplified.

When the lens control microcomputer 21 determines in step 808 that the speed reduction flag represents a speed-reduced condition, the microcomputer 21 determines whether zooming is being performed from the wide direction to the tele direction (step 821). If YES in step 821, the flow advances to step 816. Otherwise, the flow advances to step 809. This indicates that speed reduction continues once the speed-reduced condition is set during zooming. This aims at limiting speed reduction near the tele end and inhibits alternate switching between the reduced speed and the standard zoom speed.

By the above lens control, the zoom speed Vz and the focus speed Vf change, as shown in FIGS. 24A and 24B.

In FIG. 24A, the magnification lens position is plotted along the abscissa, and the focus speed Vf is plotted along the ordinate. In FIG. 24B, the magnification lens position is plotted along the abscissa, and the zoom speed Vz is plotted along the ordinate.

That is, as can be estimated from the focusing lens locus (FIG. 2) for each object distance, a change in the focus speed Vf with respect to the zoom speed Vz varies depending on object distances. However, when the zoom speed Vz is the middle speed $\beta$, as shown in FIG. 24B, the focus speed Vf changes with respect to a given object distance, as shown in FIG. 24A.

A position P is a zoom speed reduction start position. That is, the focus speed Vf exceeds the maximum speed Vfmax determined in consideration of the step-out limitation speed of the focus motor 23a on the tele side from the zoom speed reduction start position P, and the focused condition cannot be maintained. On the tele side from the zoom speed reduction start position P, as shown in FIG. 24A, the focus speed Vf is set as the maximum speed Vfmax, and the zoom speed Vz is reduced, as shown in FIG. 24B. As can be apparent from the above description, this reduced speed can be calculated to maintain the focused condition in consideration of the inclination of the focusing lens locus and moderately changes. Therefore, the zoom speed can be smoothly reduced. When the focus speed Vf exceeds the maximum speed Vfmax, the focus speed Vf is not set to be lower than the maximum speed Vfmax, but is set as the maximum speed Vfmax, thereby shortening the speed reduction time of the zoom speed Vz.

[Applied Modification]

In this embodiment, since the maximum speed Vfmax of the focus speed Vf is fixed to a predetermined value, the zoom speed reduction start position P in FIGS. 24A and 24B varies depending on the object distances n and the selected standard zoom speed Vz (low speed, middle speed, and high speed). For this reason, a ratio of a normal zooming interval at a constant speed to a zooming interval in a speed-reduced condition, i.e., a ratio of a zooming time at a normal speed to a zooming time in a speed-reduced condition changes depending on the object distance or the selected standard zoom speed Vz (low speed, middle speed, or high speed), thereby making the photographer feel discomfort.

As shown in FIG. 25A, the maximum speed Vfmax is changed by the object distance n. Alternatively, as shown in FIG. 25B, the maximum speed Vfmax is changed in accordance with the magnitude ($\alpha$, $\beta$, or $\gamma$) of the standard zoom speed Vz.

It is also possible to uniform a zooming feeling (rate of change in field angle) which makes the photographer feel a higher speed near the tele end when zooming is performed at a constant zoom speed.

As described above in detail, this embodiment makes it possible to smoothly control the magnification lens moving speed by a simple arrangement and simple control, thereby always maintaining the focused condition.

More specifically, since the stepping motor is used as the magnification lens moving actuator, the focused condition of the focus compensation lens can be maintained to reduce the moving speed of the magnification lens in accordance with a simple control method. A reduction in moving speed of the magnification lens is performed in accordance with the rate of change in speed corresponding to the inclination of the focusing lens locus, thereby performing smooth zooming while maintaining the focused condition.

The speed reduction condition of the moving speed of the magnification lens is set in each mode. For example, the moving speed reduction time of the magnification lens can be maximized without falling outside the step-out limitation of the focus compensation lens actuator. The change in speed of the image magnification, which abruptly increases near the tele end, can be uniformed.

Sixth Embodiment

The sixth embodiment of the present invention will be described below. As described above with reference to FIGS. 1 to 3, the inner focus type lens control is control for driving a focus compensation lens on the basis of stored focusing lens locus information during zooming. The focus compensation lens position is calculated using FIG. 3 and equation (1).

According to equation (1), when the focus compensation lens is located on the locus $p_0$ in FIG. 3, the locus $p_0$ calculates a ratio which interpolates a line segment $b_0$–$a_0$, and a point which interpolates a line segment $b_1$–$a_1$ is defined as $p_1$ in accordance with the resultant ratio. The moving speed of the focus compensation lens 6 to maintain the focused condition is obtained from the positional difference between the points $p_1$ and $p_0$ and the time required for the magnification lens 3 to move from $z_0$ to $z_1$.

When the magnification lens 3 is moved from the tele direction to the wide direction, this direction is a direction to converge divergent focusing lens loci, as is apparent from FIG. 2. However, from the wide direction to the tele direction, it is unknown for a focus compensation lens 6 located at a convergent position to follow a specific focusing lens locus. Therefore, the focused condition cannot be maintained in the same locus tracking scheme described above.

A focusing lens locus for minimizing near- and far-focus pieces of information (blurring information) obtained in an automatic focus control operation (AF) of a contrast scheme (hill climbing scheme) is selected, and zooming is performed such that the focus compensation lens 6 is moved along with the selected focusing lens locus, as previously described.

In a video camera having a two-dimensional image pickup element (CCD), an optical image of an object input from a photographic lens (inner focus type lens system) is photoelectrically converted by the two-dimensional image pickup element. The clearness of the frame is detected in accordance with the photoelectrically converted video signal. The position of the focus compensation lens 6 is controlled to obtain a focused condition so as to maximize the clearness.

The intensity of a high frequency component of the video signal which is extracted by a bandpass filter or the blurring width detection intensity of the video signal which is extracted by a differentiator is generally used as an evaluation reference for the clearness of the frame. The clearness value of the frame is small in a blurred condition upon photography of a normal object. When the object is gradually focused, the clearness value increases. When the object is set in a perfectly focused condition, the clearness value becomes maximum. The position of the focus compensation lens 6 is controlled to be quickly moved in a direction to increase the moving speed when the clearness value of the frame is small. When the clearness value of the frame gradually increases, the moving speed of the focus compensation lens 6 is gradually reduced. When the clearness value of the frame reaches the peak of the clearness locus, i.e., when the focused condition is obtained, the focus compensation lens 6 is stopped. This AF scheme is generally called a hill climbing scheme.

When zooming is to be performed under this AF control, the focusing lens locus to be traced during zooming is limited such that the blurring information (the moving direction and speed of the focus compensation lens 6) obtained by the AF control coincides with the moving speed (to be referred to as a focus speed hereinafter) of the focus compensation lens 6 moved along the focusing lens locus.

In the conventional AF control, the moving direction and speed of the focus compensation lens 6 are determined on the basis of a previous video signal (clearness signal) within a predetermined period of time. If the zooming speed is very high and the magnification lens 3 is moved from the wide end to the tele end within a very short period of time, the response to the instantaneously changing video signal is poor. It is difficult to specify the focusing lens locus to be selected, and blurring greatly occurs. Blurring in AF control is determined using a video signal which reflects two parameters, i.e., movement of the magnification lens 3 and the movement of the focus compensation lens 6. For this reason, erroneous determination may be caused when the moving direction and speed of only the focus compensation lens 6 are determined. As a result, blurring may greatly occur.

This embodiment has been made in consideration of these circumstances, and has as its object to perform zooming while maintaining the focused condition with predetermined precision or more independently of a zooming mode and a zooming atmosphere when the video signal of the object is utilized to perform zooming while maintaining the focused condition.

In order to achieve the above object, there is provided a camera having a first lens for performing a magnification operation, a second lens for correcting movement of a focal plane during movement of the first lens, lens moving means for independently moving the first and second lenses to be parallel to an optical axis, and extracting means for extracting a high frequency component from a video signal of a photographed object, comprising first moving condition switching means for switching a moving condition of the second lens during movement of the first lens so that a high frequency component amount of the video signal changes.

The first lens serves as a lens for performing a magnification operation, and the second lens serves as a lens for correcting movement of a focal plane during movement of the first lens. The lens moving means independently moves the first and second lenses to be parallel to the optical axis.

The extracting means extracts the high frequency component from the video signal of the photographed object.

The first moving condition switching means switches the moving condition of the second lens to change the high frequency component amount of the video signal during movement of the first lens.

The arrangement and operation of this embodiment will be described below. The circuit arrangement is substantially the same as that in FIG. 13, and a detailed description thereof will be omitted.

A focusing lens locus table T (FIG. 14) having the focusing lens loci shown in FIG. 2 is preset in a lens control microcomputer 21. The lens control microcomputer 21 performs zooming while a clearness signal obtained in AF control is utilized to select a proper focusing lens locus from the focusing lens locus table T. At this time, even if a zooming time is short, zooming is performed to minimize blurring. The principle of minimizing blurring within a short zooming time will be described with reference to FIGS. 26A, 26B, and 26C.

Figure 26A:
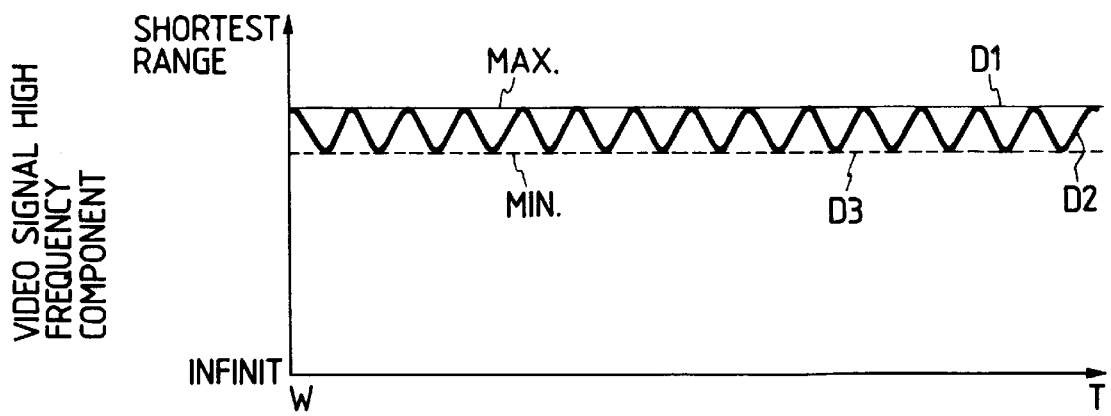
FIGS. 26A, 26B, and 26C are graphs for explaining the principle of the sixth embodiment according to the present invention.
Figure 26B:
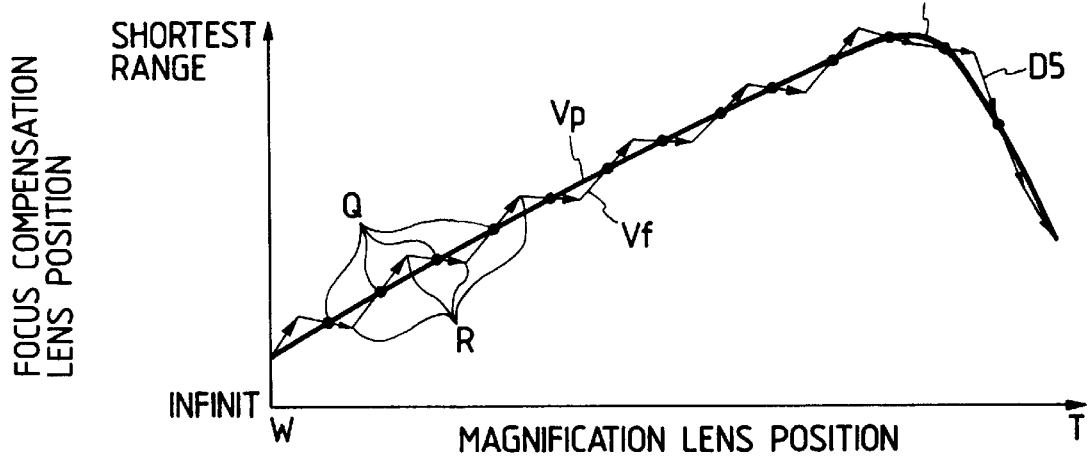
Figure 26C:
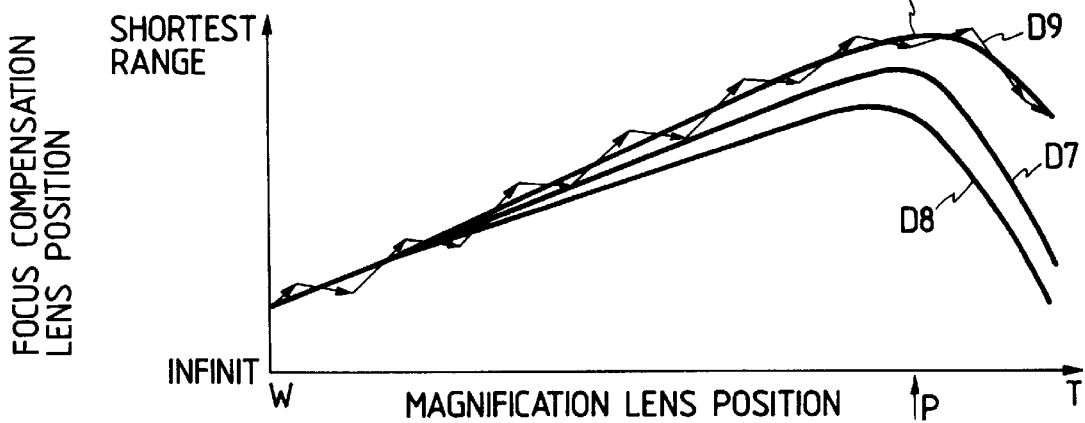

In FIGS. 26A, 26B, and 26C, the magnification lens position is plotted along the abscissa. The high frequency component (clearness signal) level of a video signal is plotted along the ordinate in FIG. 26A. The focus compensation lens positions are plotted along the ordinates in FIGS. 26B and 26C.

Referring to FIGS. 26A, 26B, and 26C, a focusing lens locus in zooming of a given object (object distance) is defined as D4. In this case, a focus speed on the wide side with respect to a magnification lens position P is defined as a positive speed (the focus compensation lens 15 is moved in the shortest range direction), and a focus speed of the focus compensation lens 6 moving in the infinity direction on the tele side with respect to the magnification lens position P is defined as a negative speed.

When the focus compensation lens 15 is moved in a focused condition so as to faithfully trace the focusing lens locus, the magnitude of the clearness signal becomes maximum and is almost constant, as indicated by D1 in FIG. 26A.

As shown in FIG. 26B, in zooming, a focus speed is defined as Vp, a speed higher than the focus speed Vp in the positive direction is represented by +, and a speed lower than the focus speed Vp in the positive direction is represented by −. Zooming is performed by increasing or decreasing (i.e., a higher or lower speed) a focus speed Vf with respect to the ideal focus speed Vp faithfully tracing the focusing lens locus. The resultant locus is given as a zig-zag locus, indicated by D5. The clearness signal level changes to have upper and lower peaks, indicated by D2 in FIG. 26A. This clearness signal D2 becomes maximum at each intersection Q between a focusing lens locus D4 and the locus D5. The clearness signal D2 becomes minimum at each point R where the + (higher speed) and − (lower speed) of the locus D5 are switched.

The clearness signal D2 has a minimum value D3 in FIG. 26A. When the minimum value D3 is set, and the + and − of the locus D5 are switched so that the magnitude of the clearness signal D2 becomes equal to the minimum value D3, the moving direction of the focus compensation lens 6 upon switching can be set in a direction to come close to the focusing lens locus D4.

Every time an image is blurred by a difference between the maximum and minimum values D1 and D3 of the clearness signal level, the moving direction and speed of the focus compensation lens 15 are controlled to reduce blurring, thereby performing zooming whose blurring amount is reduced.

According to the above technique, in zooming from the wide direction to the tele direction so as to cause focusing lens loci D6, D7, and D8 to diverge from the converged condition, as shown in FIG. 26C, even if the focus speed Vp is unknown, a switching operation as indicated by D9 is repeated at the focus speed Vf which becomes higher (+) or lower (−) than the tracking speed obtained on the basis of the target position $p_{(n+1)}$ obtained in equation (1). In this case, a focusing lens locus can be selected so as to prevent the clearness signal level from reducing below the minimum value D3, i.e., so as to prevent blurring having a predetermined value or more. The magnitude of the blurring amount can be reduced as small as negligible in zooming by appropriately setting the clearness signal level to the minimum value D3.

In zooming from the wide direction to the tele direction, the previous clearness signal within a predetermined period of time need not be used, and the current clearness signal level is monitored and determined. When a predetermined amount of blurring is caused, the direction in which the focus compensation lens 15 is moved to reduce blurring can be recognized. Therefore, zooming almost free from blurring can be performed independently of zooming times.

Figure 27:
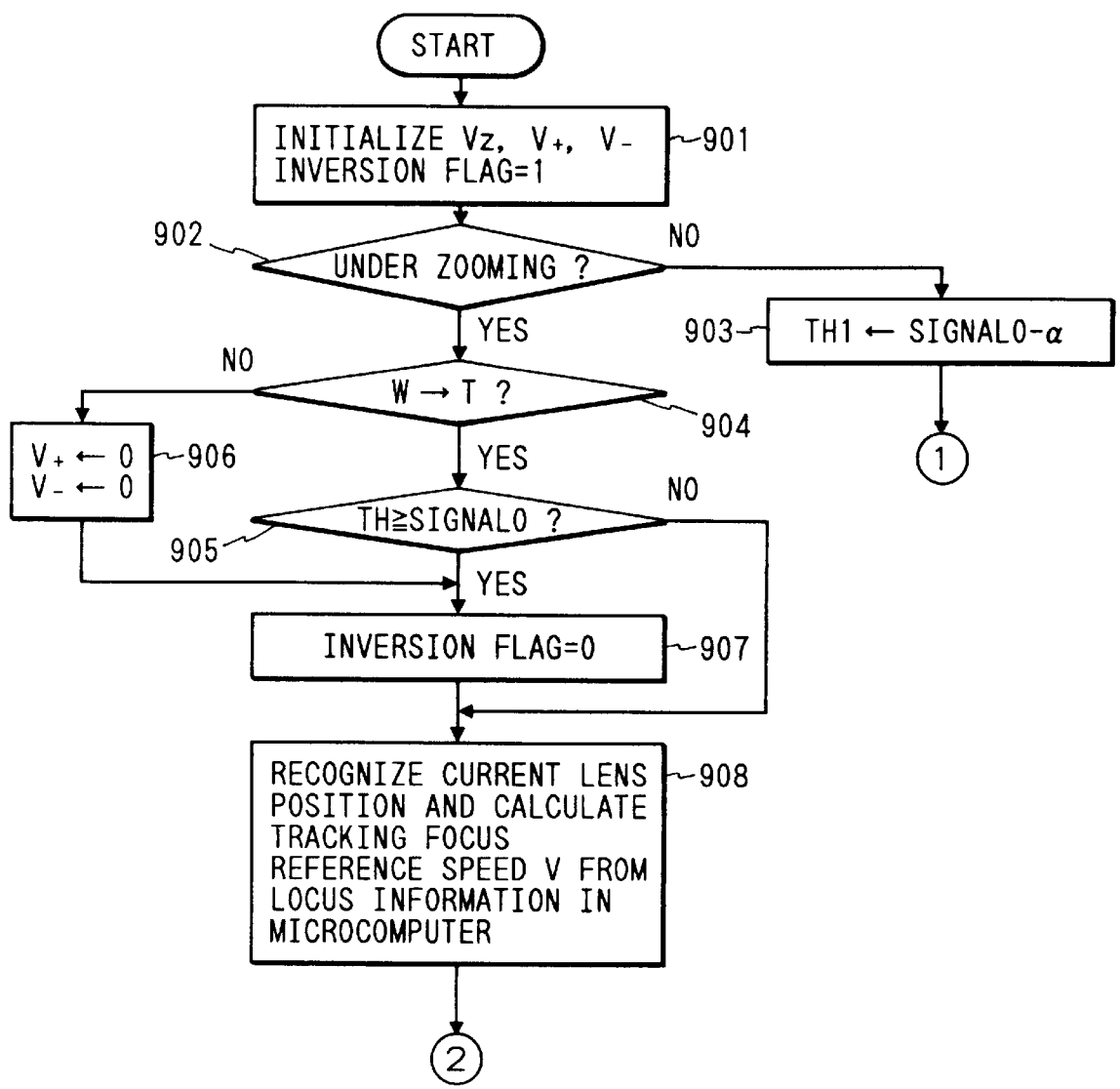
FIG. 27 is a flow chart showing a lens control operation according to the sixth embodiment of the present invention.
Figure 28:
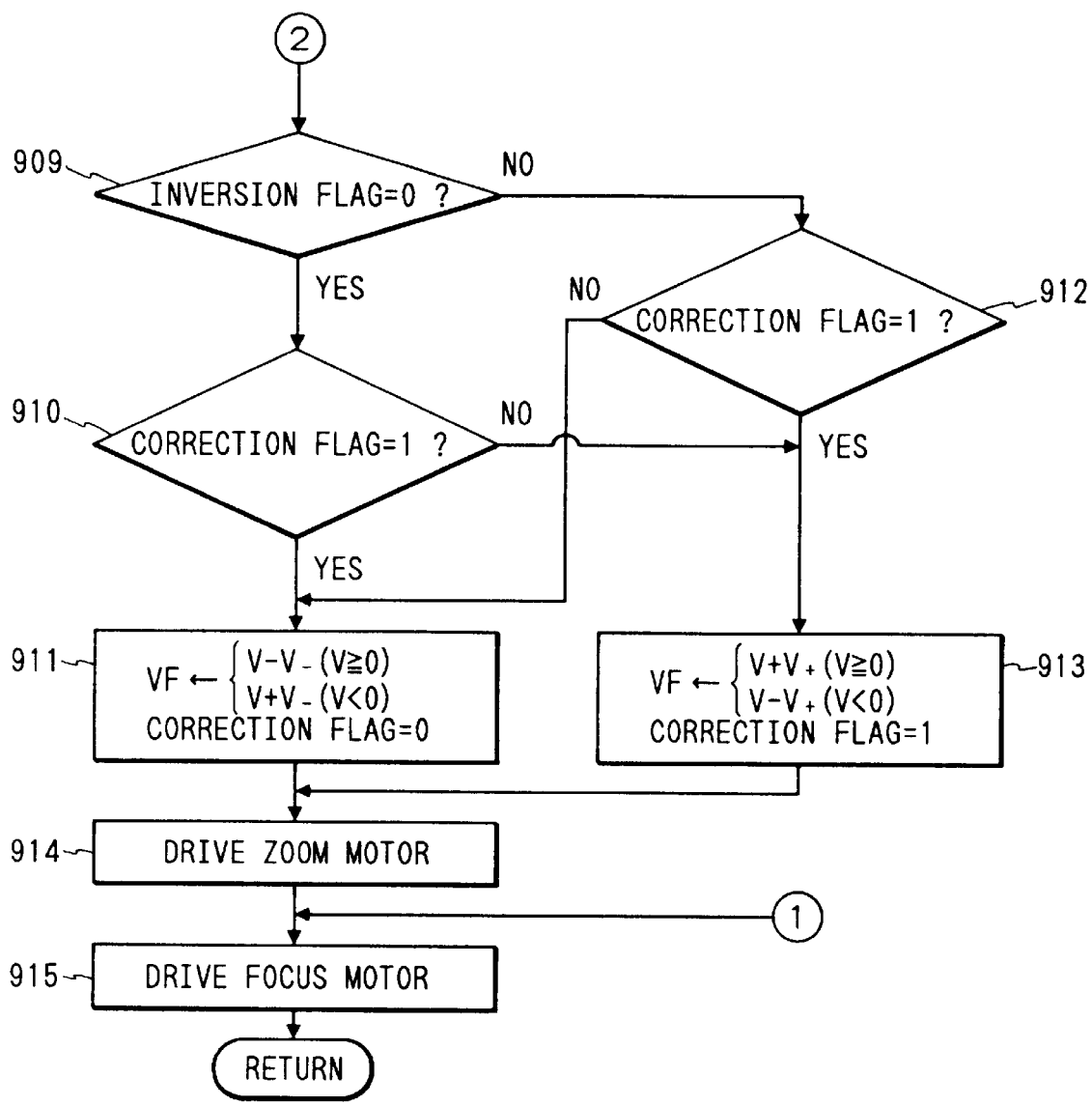
FIG. 28 is a flow chart showing the continuation of FIG. 27.

Lens control operations for the above zooming will be described with reference to flow charts in FIGS. 27 and 28. The flows in FIGS. 27 and 28 are subroutines. Prior to execution of these flows, processing for fetching a video signal high frequency component (clearness signal level), AF mode processing, manual mode processing, and the like are performed.

The lens control microcomputer 21 sets initial values of the zoom speed Vz and correction speeds V+ and V − in the + and − directions of FIGS. 26A to 26C, i.e., speeds for moving the focus compensation lens 15 at speeds higher (+) and lower (−) than the focusing lens locus tracking speed V. The lens control microcomputer 21 sets "1" in an inversion flag representing whether switching between the higher speed (+) and the lower speed (−) is performed (step 901). The inversion flag of "0" represents that inversion should be performed, and the inversion flag of "1" represents that inversion need not be performed.

The lens control microcomputer 21 detects the ON/OFF conditions of a wide switch 32 and a tele switch 33 to determine whether the current condition is under zooming (step 902). If both the wide and tele switches 32 and 33 are OFF, and the current condition is under zooming, a value obtained by subtracting an arbitrary constant a from a current value of "signal 0" of the clearness signal level stored in a routine of fetching a clearness signal processed once within one vertical sync period is defined as a minimum value (threshold value) TH1 corresponding to D3 in FIGS. 26A to 26C (step 903). The flow then advances to step 915 to drive a focus motor 23a (in this case, the focus speed VF is determined by another subroutine), and the subroutine returns to the main flow. That is, the threshold value TH1 is determined prior to the start of zooming.

When one of the wide and tele switches 32 and 33 is ON, and the current condition is under zooming, the lens control microcomputer 21 detects the ON switch to determine whether zooming is being performed from the wide direction to the tele direction (step 904). If the tele switch 33 is ON and zooming is being performed from the wide direction to the tele direction, the lens control microcomputer 21 determines whether the current clearness signal level "signal 0" is less than the threshold value TH1, i.e., whether the focus compensation lens 15 reaches the direction (speed) switching point R in FIG. 26B (step 905). If the current clearness signal level "signal 0" is less than the threshold value TH1, and the focus compensation lens 15 has reached the speed switching point R, switching between the + and − directions (higher and lower speeds) must be performed. The lens control microcomputer 21 sets "0" in the inversion flag (step 907), and the flow advances to step 908. However, when the current clearness signal level "signal 0" is equal to or more than the threshold value TH1, and the focus compensation lens 15 do not reach the speed switching point R, switching between the higher and lower speeds need not be performed. The flow skips step 907 and advances to step 908 so as to maintain the condition of the preset inversion flag of "1".

The lens control microcomputer 21 determines in step 904 that zooming is being performed from the tele direction to the wide direction, the correction speeds V+ and V− are set to "0" so as to prevent correction of the focusing lens locus tracking speed V (step 906), and the flow advances to step 907.

In step 908, the focusing lens locus tracking speed V of the focus compensation lens 15 is calculated on the basis of the current positions of the magnification lens 12 and the focus compensation lens 15, and the locus data in the focusing lens locus table T. By determining whether "0" is set in the inversion flag, the lens control microcomputer 21 determines whether switching between the higher and lower speeds is performed (step 909). If "0" is set in the inversion flag and switching between the higher and lower speeds must be performed, the lens control microcomputer 21 determines whether "1" is set in the correction flag so that it determines whether focusing lens locus tracking is being performed at the high speed (step 910).

When "1" is set in the correction flag and focusing lens locus tracking is being performed at the higher speed, the higher speed is switched to the lower speed in step 908. More specifically, in step 908, if the calculated focusing lens locus tracking speed V is "+", and the focus compensation lens 15 is to be moved in the shortest range direction, (Focus Speed VF)=(Focusing Lens Locus Tracking Speed V)−(Correction Speed V−). However, if the focusing lens locus tracking speed V is "−", and the focus compensation lens 15 is to be moved in the infinity direction, (Focus Speed VF)=(Focusing Lens Locus Tracking Speed V)+(Correction Speed V−), and "0" is set in the correction (step 911).

If "0" is set in the correction flag, and the focusing lens locus tracking is being performed at the lower speed, the lower speed is switched to the higher speed in step 908. More specifically, if the focusing lens locus tracking speed V is "+", and the focus compensation lens 15 is to be moved in the shortest range direction, (Focusing Speed VF)=(Focusing Lens Locus Tracking Speed V)+(Correction Speed V+). However, if the focusing lens locus tracking speed V is "−", and the focus compensation lens 15 is to be moved in the infinity direction, (Focus Speed VF)=(Focusing Lens Locus Tracking Speed V)−(Correction Speed V+), and "1" is set in the correction flag (step 913).

If it is determined in step 909 that "1" is set in the inversion flag, and switching between the higher speed and the lower speed need not be performed, it is determined whether "1" is set in the correction flag to determine whether focusing lens locus tracking is being performed at the higher speed (step 912).

If "1" is set in the correction flag, and the focusing lens locus tracking is being performed at the higher speed, the flow advances to step 913 to maintain this higher speed. However, if "0" is set in the correction flag, and the focusing lens locus tracking is being performed at the lower speed, the flow advances to step 911 to maintain this lower speed.

After processing in step 911 or 913 is performed, a zoom motor 22a is driven so that the magnification lens 12 is moved at the zoom speed Vz (step 914). A focus motor 23a is driven so that the focus compensation lens 15 is moved at the focus speed VF (step 915). The subroutine then returns to the main flow.

As described above, during zooming from the wide direction to the tele direction, the focus compensation lens 15 is moved while the speed is switched to speeds higher and lower than the focusing lens locus tracking speed V (i.e., a zig-zag locus). The level of the video signal high frequency component (clearness signal) is increased or decreased. Every time the clearness signal level is less than the threshold value TH1, switching between the higher and lower speeds is performed.

By this processing, the factor of a change in clearness signal is limited to the movement of the focus compensation lens 15. Without using the previous clearness signal within the predetermined period of time, a positional relationship between the focused position and the focus compensation lens position during moving speed switching can be known.

Zooming in which the clearness signal level is not less than the threshold value, i.e., zooming free from blurring whose amount exceeds the threshold value, can be performed regardless of zooming times.

A method of driving the focus motor 23a and the zoom motor 22a in steps 931 and 932 will be described below.

Drivers 22b and 23b for driving the zoom motor 22a and the focus motor 23a are controlled by H/L direction signals S1 and S2 output from the lens control microcomputer 21 and speed signals S3 and S4 serving as rotation frequency signals having clock waveforms. The H (high) or L (low) level of the direction signal S1 input to the zoom motor 22a is determined in accordance with an ON or OFF state of each of a wide switch 32 and a tele switch 33. The H or L level of the direction signal S2 input to the focus motor 23a is determined by a positive or negative direction of the focus motor speed Vf.

The drivers 22b and 23b set the forward or reverse cycle of four motor excitation phases in accordance with the direction signals S1 and S2 and change applied voltages (or currents) of the four motor excitation phases in accordance with the speed signals S3 and S4, thereby controlling the direction and frequency of motor rotation.

Seventh Embodiment

The seventh embodiment of the present invention will be described with reference to FIGS. 29 to 31B.

In the sixth embodiment, a change in clearness signal level may not be symmetrical about the axis of a polarity change point, depending on the balance of the higher (+) and lower (−) speeds. In this case, for example, the focusing lens locus can be easily selected near the shortest range, but the focusing lens locus cannot be easily selected on the infinity side. It is therefore difficult to perform zooming while the focused condition is maintained at a specific object distance. If the period of increasing or decreasing the clearness signal level is predetermined, for example, focus compensation lens position greatly changes during switching between the higher and lower speeds near the tele end where the inclination of the focusing lens locus is large. Precision of focusing lens locus selection is degraded, and a focusing lens locus to be traced cannot often be specified. When zooming of a high-luminance object is to be performed or zooming is being performed in a small-iris condition or a large depth of field, a change in increase or decrease of the clearness signal level becomes small. The period between the higher speed and the lower speed is prolonged. In high-speed zooming or the like, the tracking operation of a focus compensation lens 15 on the basis of the focusing lens locus may become impossible.

This problem is solved in the seventh embodiment. Correction speeds V+ and V− for moving a focus compensation lens 15 at speeds higher (+) and lower (−) than a focusing lens locus tracking speed V are appropriately determined in accordance with given conditions.

The lens control operations of the seventh embodiment which include the above processing will be described below. The hardware arrangement of the seventh embodiment is substantially the same as that of the sixth embodiment, and a detailed description thereof will be omitted (this will also applies to the eighth embodiment).

Figure 29:
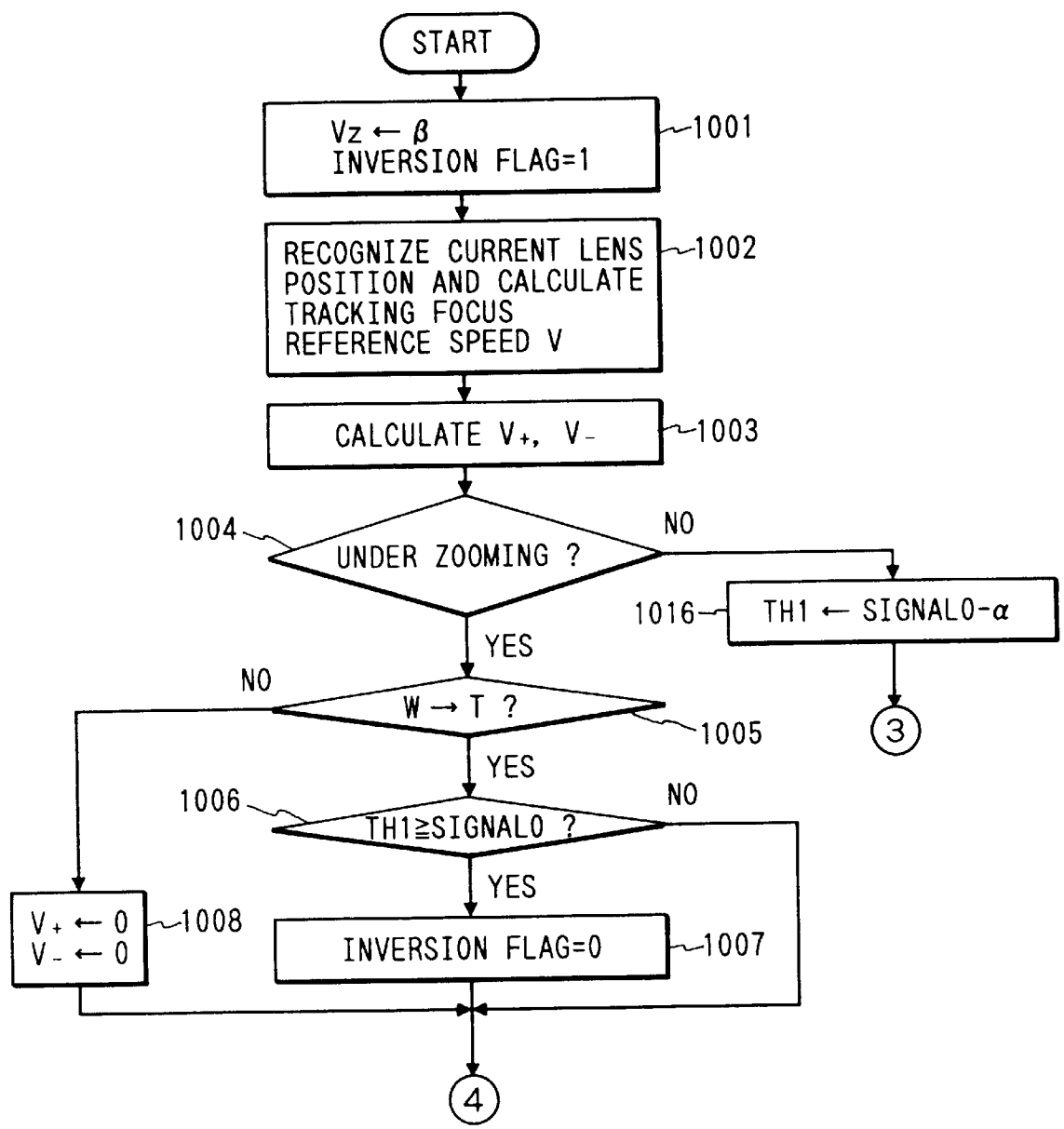
FIG. 29 is a flow chart showing a lens control operation according to the seventh embodiment of the present invention.

FIGS. 29 and 30 are flow charts showing the lens control operations of the seventh embodiment.

A lens control microcomputer 21 sets an initial value β in a zoom speed Vz and sets "1" in an inversion flag representing whether switching between the higher speed (+) and the lower speed (−) is performed (step 1001). The inversion flag of "0" represents that inversion should be performed, and the inversion flag of "1" represents that inversion need not be performed.

The focusing lens locus tracking speed V of the focus compensation lens 15 is calculated on the basis of the current positions of a magnification lens 12 and the focus compensation lens 15, and the locus data in the focusing lens locus table T (step 1002). The correction speeds V+ and V− for moving the focus compensation lens 15 at speeds higher (+) and lower (−) than the tracking speed V are calculated (step 1003).

The description of the flow charts will be temporarily interrupted, and a method of calculating the correction speeds V+ and V− will be described with reference to FIGS. 31A and 31B.

Figures 31A, 31B, 32A, 32B:
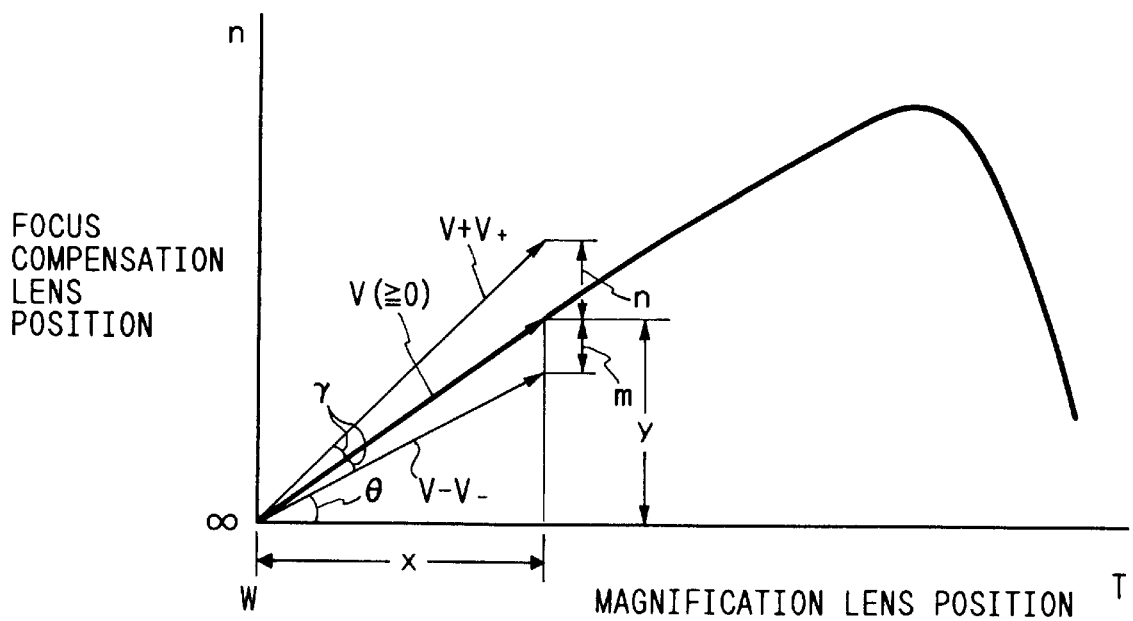
FIGS. 31A and 31B are a graph and a table, respectively, for explaining a method of calculating a correction speed.
FIGS. 32A and 32B are tables for explaining a modification of the seventh embodiment of the present invention.

In FIG. 31A, the magnification lens position is plotted along the abscissa, the focus compensation lens position is plotted along the ordinate, and D10 represents a focusing lens locus.

Referring to FIG. 31A, a focus speed for changing the magnification lens position by x and changing the focus compensation lens by y upon movement of the magnification lens is the focusing lens locus tracking speed V calculated in step 1002. Focus speeds for changing the focus compensation lens position by n or m upon movement of the magnification lens are the correction speeds V+ and V− to be calculated in step 1003.

The values n and m are determined such that a speed (V+V+) obtained by adding the correction speed V+ to the focusing lens locus tracking speed V and a speed (V−V−) obtained by subtracting the correction speed V− from the focusing lens locus tracking speed V have direction vectors equally spaced apart by an angle γ with respect to the direction vector of the focusing lens locus tracking speed V. In this case, the conventional problem in which the focusing lens locus on the shortest range can be easily selected but the focusing lens locus on the infinity cannot be easily selected can be solved. Zooming can be performed while the focused condition is maintained at all object distances.

The values n and m are obtained by equations (14) to (17). That is, the following equations are established in FIG. 31A:

$$\tan(\theta)=y/x$$

$$\tan(\theta-\gamma)=(y-m)/x$$

$$\tan(\theta+\gamma)=(y+n)/x \tag{14}$$

The following equation is also established:

$$\tan(\theta\pm\gamma)=(\tan\theta\pm\tan\gamma)/(1+\tan\theta\tan\gamma) \tag{15}$$

Equations (14) and (15) derive the following equations to obtain m and n:

$$m=(x2+y2)/(x/k+y) \text{ for } k=\tan \gamma \quad (16)$$

$$n=(x2+y2)/(x/k-y) \text{ for } k=\tan \gamma \quad (17)$$

As shown in FIG. 31B, the magnitude of γ changes 0.8 times in the middle area and twice in the tele area by the focus length in accordance with the inclination of the focusing lens locus when the value on the wide side is defined as a reference value of "1".

The period of increasing or decreasing the clearness signal changing in accordance with the moving condition of the focus compensation lens 15 can be maintained constant with respect to a predetermined change in focus compensation lens position. Therefore, a possibility of missing the focusing lens locus during tracking in zooming can be greatly reduced.

The relationship between the γ value and the k (k=tan γ) value is stored in the form of a table in a memory in the lens control microcomputer 21 and is read out as needed, thereby calculating the values in accordance with equations (16) and (17).

When the magnification lens position changes by x per unit time, x=(Zoom Speed Vz) and y=(Focusing Lens Locus Tracking Speed V). In actual calculations of equations (16) and (17), the zoom speed Vz and the focusing lens locus tracking speed V are given as x and y to calculate the values n and m, respectively. Since n=(Correction Speed V+) and m=(Correction Speed V−), the calculated values n and m are defined as correction values V+ and V−, respectively.

When the correction speeds V+ and V− are obtained, as described above, the lens control microcomputer 21 detects the ON/OFF conditions of a wide switch 32 and a tele switch 33 to determine whether the current condition is under zooming (step 1004). If both the wide and tele switches 32 and 33 are OFF, and the current condition is under zooming, a value obtained by subtracting an arbitrary constant a from a current value of "signal 0" of the clearness signal level stored in a routine of fetching a clearness signal processed once within one vertical sync period is defined as a minimum value (threshold value) TH1 (step 1016). The flow then advances to step 1015 to drive a focus motor 23a (in this case, the focus speed VF is determined by another subroutine), and the subroutine returns to the main flow. That is, the threshold value TH1 is determined prior to the start of zooming.

When one of the wide and tele switches 32 and 33 is ON, and the current condition is under zooming, the lens control microcomputer 21 determines the ON switch to determine whether zooming is being performed from the wide direction to the tele direction (step 1005). If the tele switch 33 is ON and zooming is being performed from the wide direction to the tele direction, the lens control microcomputer 21 determines whether the current clearness signal level "signal 0" is less than the threshold value TH1, i.e., whether the focus compensation lens 15 reaches the direction (speed) switching point R in FIG. 26B (step 1006). If the current clearness signal level "signal 0" is less than the threshold value TH1, and the focus compensation lens 15 has reached the speed switching point R, switching between the + and − directions (higher and lower speeds) must be performed. The lens control microcomputer 21 sets "0" in the inversion flag (step 1007), and the flow advances to step 1009. However, when the current clearness signal level "signal 0" is equal to or more than the threshold value TH1, and the focus compensation lens 15 does not reach the speed switching point R, switching between the higher and lower speeds need not be performed. The flow skips step 1007 and advances to step 1009 so as to maintain the condition of the preset inversion flag of "1".

The lens control microcomputer 21 determines in step 1005 that zooming is being performed from the tele direction to the wide direction, the correction speeds V+ and V− are set to "0" so as to prevent correction of the focusing lens locus tracking speed V (step 1008), and the flow advances to step 1009.

In step 1009, by determining whether "0" is set in the inversion flag, the lens control microcomputer 21 determines whether switching between the higher and lower speeds is performed. If "0" is set in the inversion flag and switching between the higher and lower speeds must be performed, the lens control microcomputer 21 determines whether "1" is set in the correction flag so that it determines whether focusing lens locus tracking is being performed at the high speed (step 1010). When "1" is set in the correction flag and focusing lens locus tracking is being performed at the higher speed, the higher speed is switched to the lower speed in step 1002. More specifically, in step 1002, if the calculated focusing lens locus tracking speed V is "+", and the focus compensation lens 15 is to be moved in the shortest range direction, (Focus Speed VF)=(Focusing Lens Locus Tracking Speed V)−(Correction Speed V−). However, if the focusing lens locus tracking speed V is "−", and the focus compensation lens 15 is to be moved in the infinity direction, (Focus Speed VF)=(Focusing Lens Locus Tracking Speed V)+(Correction Speed V−), and "0" is set in the correction (step 1011).

If "0" is set in the correction flag, and the focusing lens locus tracking is being performed at the lower speed, the lower speed is switched to the higher speed in step 1002. More specifically, if the focusing lens locus tracking speed V is "+", and the focus compensation lens 15 is to be moved in the shortest range direction, (Focusing Speed VF)= (Focusing Lens Locus Tracking Speed V)+(Correction Speed V+). However, if the focusing lens locus tracking speed V is "−", and the focus compensation lens 15 is to be moved in the infinity direction, (Focus Speed VF)= (Focusing Lens Locus Tracking Speed V)−(Correction Speed V+), and "1" is set in the correction flag (step 1013).

If it is determined in step 1009 that "1" is set in the inversion flag, and switching between the higher speed and the lower speed need not be performed, it is determined whether "1" is set in the correction flag to determine whether focusing lens locus tracking is being performed at the higher speed (step 1012).

If "1" is set in the correction flag, and the focusing lens locus tracking is being performed at the higher speed, the flow advances to step 1013 to maintain this higher speed. However, if "0" is set in the correction flag, and the focusing lens locus tracking is being performed at the lower speed, the flow advances to step 1011 to maintain this lower speed.

After processing in step 1011 or 1013 is performed, a zoom motor 22a is driven so that the magnification lens 12 is moved at the zoom speed Vz (step 1014). A focus motor 23a is driven so that the focus compensation lens 15 is moved at the focus speed VF (step 1015). The subroutine then returns to the main flow.

[Applied Modification of Seventh Embodiment]

The γ value shown in FIG. 31A may be changed in accordance with the depth of field (iris condition) or the object (object luminance). That is, in step 1003 in FIG. 29, in calculation of the correction values V+ and V−, the k values in equations (15) and (16) are changed in accordance with the magnitude of the γ value determined in FIGS. 32A and 32B.

FIG. 32A shows the γ values corresponding to the depths of field (iris conditions). If the iris value is zero, the magnitude of the γ value is set to a reference value of "1". The magnitudes of the γ values for iris values except for the iris value of "0" are represented as magnifications with respect to the reference value. For example, the magnitude of the γ value for the iris value of "3" is twice the reference value of "1".

FIG. 32B shows γ values corresponding to objects (object luminance). The γ magnitude for the normal object luminance is defined as a reference value of "1", and a γ magnitude for a high-luminance object is twice the normal object luminance.

Even if high-speed zooming is performed in a small iris condition (i.e., a condition wherein the depth of field is large), or high-speed zooming of high-luminance object is performed, proper focusing lens locus tracking can be performed.

Eighth Embodiment

Figure 33:
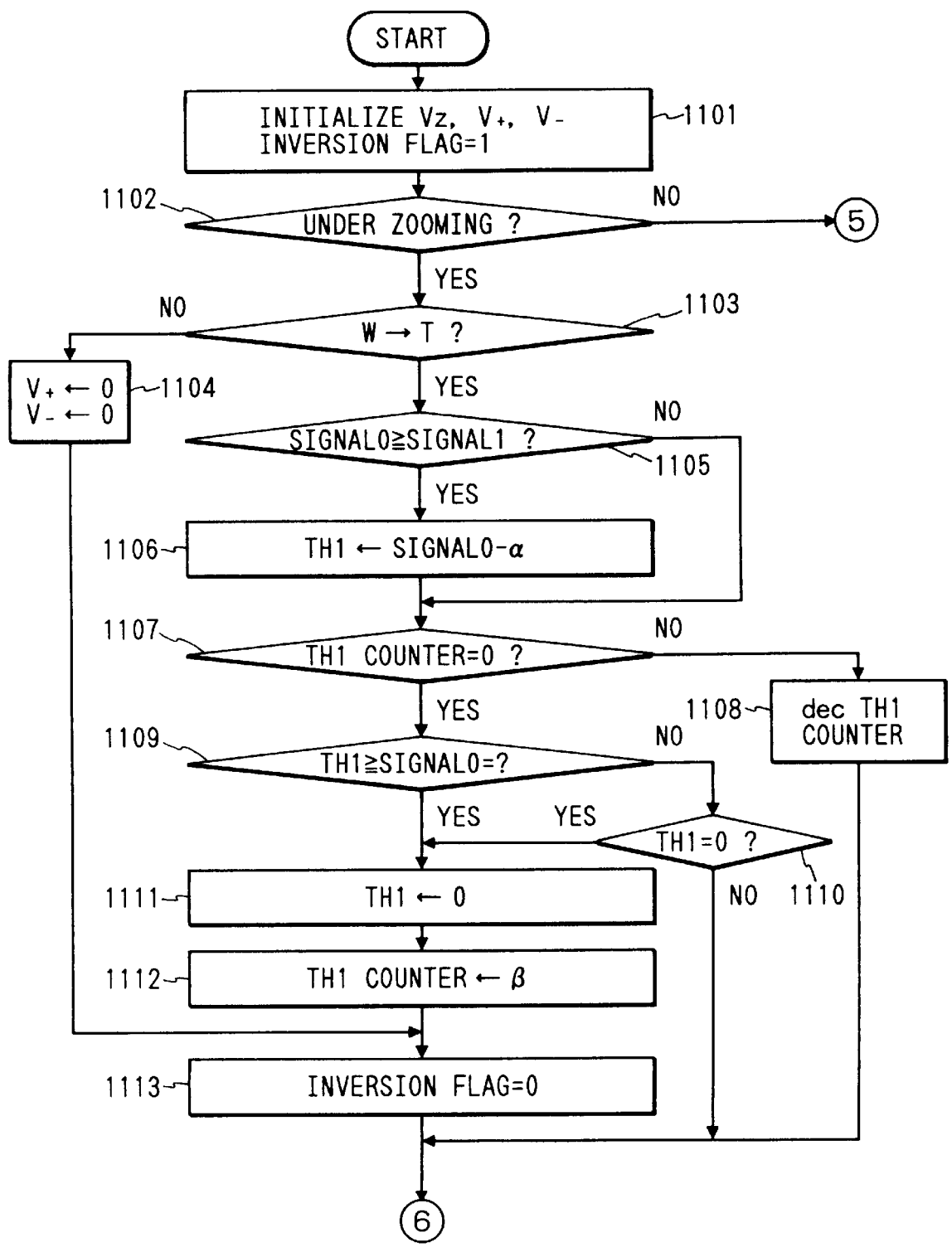
FIG. 33 is a flow chart showing a lens control operation according to the eighth embodiment of the present invention.
Figure 34:
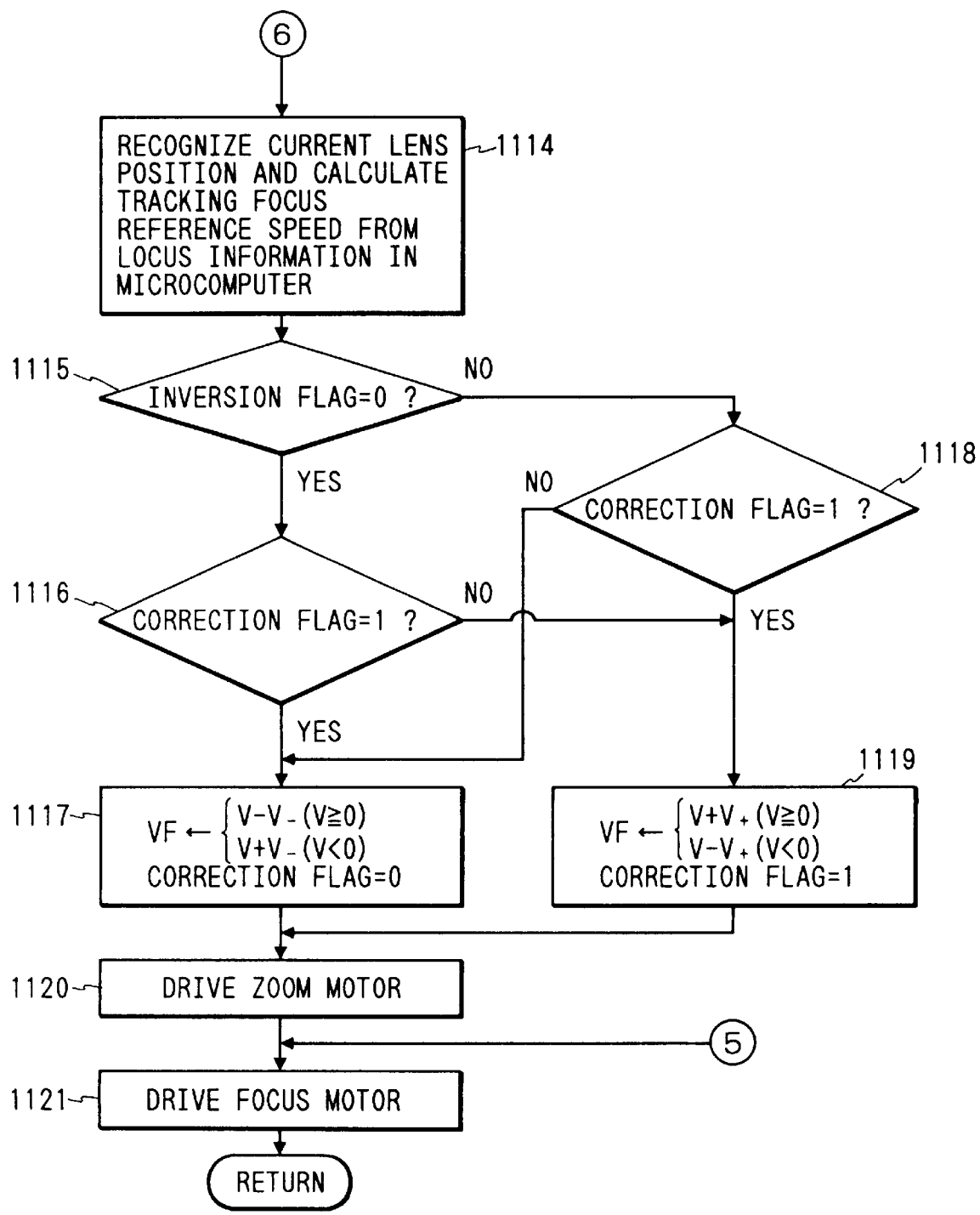
FIG. 34 is a flow chart showing the continuation of FIG. 33.

The eighth embodiment of the present invention will be described with reference to FIGS. 33 to 35.

In the sixth embodiment, the threshold value TH1 of the clearness signal serving as the determination reference for switching between the higher speed and the lower speed is fixed. In an object whose clearness signal level changes (e.g., when a low-contrast object is selected from a large number of objects present and spread within a frame, and zooming is performed in the focused condition, the clearness signal level is gradually reduced near the tele end), the clearness signal level is often lower than the clearness signal level corresponding to the focused condition. In this case, a focusing lens locus to be traced is lost, and zooming is performed up to the tele end while an image is greatly blurred. This problem also occurs when zooming is performed while the principal object is changed from an object having a high clearness signal level to an object having a low clearness signal level.

In the eighth embodiment, a threshold value TH1 of the clearness signal level which serves as the determination reference for switching between the higher and lower speeds is peak-held and changed in accordance with a change in clearness signal during zooming. This processing is performed on the basis of flow charts in FIGS. 33 and 34.

The above processing on the basis of the flow charts in FIGS. 33 and 34 will be described. These flow charts are very difficult to understand. For this reason, after the respective steps are briefly described, the flow charts will be described in detail. Steps 1113 to 1121 in FIGS. 33 and 34 are the same as steps 907 to 915 in FIGS. 27 and 28 of the sixth embodiment, and a detailed description thereof will be omitted.

A lens control microcomputer 21 sets initial values of the zoom speed Vz and correction speeds V+ and V− in the + and − directions of FIGS. 26A to 26C, i.e., speeds for moving the focus compensation lens 15 at speeds higher (+) and lower (−) than the focusing lens locus tracking speed V. The lens control microcomputer 21 sets "1" in an inversion flag representing whether switching between the higher speed (+) and the lower speed (−) is performed (step 1101). The inversion flag of "0" represents that inversion should be performed, and the inversion flag of "1" represents that inversion need not be performed.

The lens control microcomputer 21 detects the ON/OFF conditions of a wide switch 32 and a tele switch 33 to determine whether the current condition is under zooming (step 1102). If both the wide and tele switches 32 and 33 are OFF, and the current condition is under zooming, the flow advances to step 1121 to drive a focus motor 23a (in this case, the focus speed VF is determined by another subroutine). The subroutine then returns to the main flow.

If the wide or tele switch 32 or 33 is ON, and the current condition is under zooming, the lens control microcomputer 21 determines which of the switches is ON and determines whether zooming is being performed from wide direction to the tele direction (step 1103). If the wide switch 32 is determined to be ON and zooming is determined to be from the tele direction to the wide direction, the correction speeds V+ and V− are set to "0" so as not to correct the focusing lens locus tracking speed V (step 1104). The flow then advances to step 1113.

If the lens control microcomputer 21 determines that the tele switch 33 is ON and zooming is performed from the wide direction to the tele direction, the microcomputer 21 determines in a routine for fetching a clearness signal processed once within one vertical sync period whether a current value "signal 0" of the clearness signal levels stored within a plurality of vertical sync periods is a value "signal 1" of the immediately preceding vertical sync period, i.e., whether the current value has a better focused condition than the previous value (step 1105). If YES in step 1105, a value obtained by subtracting an arbitrary constant a from the current value "signal 0" of the clearness signal level is set as a threshold value TH1 (step 1106). The flow then advances to step 1107. If the current value "signal 0" is smaller than the value "signal 1" of the immediately preceding vertical sync period, and the current value has a better focused condition than the previous value, the threshold value TH1 is not set. The flow advances to step 1107. By processing in steps 1105 and 1106, peak holding of the threshold value TH1 corresponding to a change in clearness signal level is performed.

The lens control microcomputer 21 determines whether the count value of a TH1 counter is "0" (step 1107). The TH1 counter is a down counter and is used to consider the delay of a video signal for lens movement and the like. This down counter is utilized to properly recognize whether the intensity (clearness signal level) of the video signal high frequency component is high or low. It is determined in step 1107 that the count value of the TH1 counter is not "0", i.e., when it is determined that a predetermined period of time has not yet elapsed, the count value of the TH1 counter is decremented (step 1108), and the flow advances to step 1114.

If the count value of the TH1 counter is determined to be "0", i.e., it is determined that the predetermined period of time has elapsed, the lens control microcomputer 21 determines whether the current value "signal 0" of the clearness signal level is less than the threshold value TH1 (step 1109). If the current value "signal 0" of the clearness signal level is equal to or larger than the threshold value TH1, the microcomputer 21 determines whether the threshold value TH1 is "0" (step 1110). If the threshold value TH1 is "0", the threshold value TH1 is set as "0" (step 1111). A predetermined value β is set in the TH1 counter (step 1112), and the inversion flag is set to "0" (step 1113). However, if the threshold value TH1 is not "0", the flow advances to step 1114. A description of the subsequent steps will be omitted, as described above.

In processing from step 1105 to step 1113, the threshold value TH1 serving as the determination reference for switching between the higher and lower speeds changes, as shown in FIG. 35.

In FIG. 35, the zoom lens position (corresponding to the time axis) is plotted along the abscissa, and the clearness signal level "signal 0" is plotted along the ordinate. Unlike in FIG. 26A, the clearness signal level "signal 0" changes in FIG. 35. The threshold value TH1 increases while maintaining a level lower than the clearness signal level "signal 0" by α and is peak-held at a maximum value. Positions P1 to P3 are obtained when the moving speed of the focus compensation lens 15 is changed from the higher speed to the lower speed (or from the lower speed to the higher speed) so as to increase or decrease the clearness signal level. A position P4 is a second peak position of the clearness signal level "signal 0". Positions P5 to P7 are obtained when a count time of the count value β of the TH1 counter has elapsed upon speed switching.

Processing in steps 1105 to 1113 in FIG. 36 will be described using the case in FIG. 35.

Assume that the focus compensation lens 15 is moved at the focus speed VF determined in step 1119, and that the clearness signal level "signal 0" is high. At this time, the threshold value TH1 increases while maintaining the level lower than the clearness signal level "signal 0" by a and is peak-held at a maximum value.

When the focus compensation lens position is deviated from the focusing lens locus, the clearness signal level "signal 0" is decreased. Thereafter, when the clearness signal level "signal 0" becomes smaller than the threshold value TH1, YES is obtained in step 1109. The flow advances to operations from step 1111. The moving speed of the focus compensation lens 15 is switched from the higher speed to the lower speed. At this time, the threshold value TH1 becomes "0". The threshold value TH1 is kept "0" until the clearness signal level "signal 0" is increased again. During the period in which the focus compensation lens 15 is moved from the position P3 to the position P5, speed switching is inhibited to maintain the lower focus speed determined at the position P3.

When the clearness signal level "signal 0" is increased, the threshold value TH1 is peak-held in processing of step 1106. The moving speed is switched from the lower speed to the higher speed at the position P2, and step 1109 is determined at the position P3.

At the position P3, the clearness signal level "signal 0" is being reduced. That is, when the clearness signal level "signal 0" is decreased from the position P4 due to a change in object or object distance, the moving direction of the focus compensation lens 15 upon speed switching (after the position P3) may be set in a direction away from the focusing direction. In this case, the clearness signal level "signal 0" is continuously decreased.

In this case, a focusing lens locus to be traced may be lost, and zooming is performed up to the tele end while an image is greatly blurred. Speed switching is performed again, and the focus compensation lens 15 must be moved again in the true focusing direction.

This processing is performed as follows. That is, when the clearness signal level "signal 0" is decreased, the threshold value TH1 is kept maintained to be "0". YES is obtained in step 1110. The flow advances to processing from step 1111. Switching from the higher speed to the lower speed is performed again (the position P3).

According to the lens control apparatus of this embodiment, as has been described above, when zooming is to be performed while the focused condition is kept maintained using the object video signal, zooming can be performed while maintaining focusing precision having a predetermined level or more regardless of the length of zooming time, the length of the object distance, and the object luminance.

What is claimed is:

1. A lens control apparatus comprising:
    lens position detecting means for detecting a position of a magnification lens and a position of a focus compensation lens;
    lens moving means for moving said magnification lens and said focus compensation lens in a direction of an optical axis for a zooming operation;
    storage means for storing a plurality of position information of said focus compensation lens for maintaining in focus state during said magnification lens being driven;
    calculating means for calculating a position to which said focus compensation lens is to be moved by using the magnification lens and the focus compensation lens positions detected by said lens position detecting means and the lens position information stored in said storage means in the case that the lens position information detected by said lens position detecting means is not included in the plurality of position information in said storage means; and
    control means for controlling said lens moving means to drive said focus compensation lens on the basis of a calculation result of said calculating means during a zooming operation by a driving operation of said magnification lens and to drive said magnification lens to the position corresponding to the position information of said focus compensation lens stored in said storage means when the zooming operation is completed.

2. An apparatus according to claim 1, wherein said storage means is provided in a lens control microcomputer.

3. An apparatus according to claim 1, further including automatic focus detecting means for detecting a focusing condition of the object and moving said focus compensation lens to an in-focus point.

4. An apparatus according to claim 1, wherein said calculating means estimates a target position of said focus compensation lens in accordance with the positions of said magnification lens and said focus compensation lens and data adjacent to the positions and stored in said storage means.

5. A lens control apparatus comprising:
    lens position detecting means for detecting a position of a magnification lens and a position of a focus compensation lens;
    lens moving means for moving said magnification lens and said focus compensation lens in a direction of an optical axis for a zooming operation;
    storage means for storing a plurality of position information of said focus compensation lens for maintaining an in-focus position when said magnification lens positions are at predetermined positions; and
    control means for controlling said lens moving means so as to continue to move said magnification lens until the magnification lens position detected by said lens position detection means reaches one of the predetermined positions in response to a completion of the zooming operation.

6. An apparatus according to claim 5, wherein said control means comprises a microcomputer, and said storage means is constituted by a RAM arranged in said microcomputer or connected to said microcomputer.

7. An apparatus according to claim 5, further comprising focus condition detecting means for detecting a focus condition of the object.

8. An apparatus according to claim 7, wherein said control means can simultaneously control a control operation of said focus compensation lens by said focus detecting means and an in-focus position auxiliary operation of said focus compensation lens along with the zooming operation.

9. A lens control apparatus comprising:

a first lens for performing a magnification operation;

a second lens for correcting movement of a focal plane during movement of said first lens;

lens moving means for independently moving first and second lenses in a direction of an optical axis for a magnification operation;

focusing position storage means for prestoring in-focus positions of said second lens at least during the magnification operation by said first lens;

object distance determining means for determining an object distance by using the current positions of said first and second lenses and information stored in said focusing position storage means when manual focus control is performed with said first lens being fixed;

calculating means for calculating an in-focus position of said second lens during the magnification operation by said first lens, by using the object distance specified by said object distance determining means and the information stored in said focusing position storage means; and control means for controlling said lens moving means to drive said second lens on the basis of a calculation result of said calculating means during a zooming operation by said first lens, and to drive said first lens to one of the positions corresponding to the in-focus positions of said second lens stored in said focusing position storage means when the magnification operation is completed.

10. An apparatus according to claim 9, wherein said first lens is a magnification lens, and said second lens is a focus compensation lens.

11. An apparatus according to claim 10, wherein said object distance specifying means calculates the focus compensation lens position in accordance with the current lens positions and information stored in said storage means when said focus compensation lens is switched from auto-focus control to manual focus control or said focus compensation lens is driven by the manual focus control.

12. An apparatus according to claim 11, further comprising power focus means for driving said focus compensation lens in accordance with an operation of an operator.

13. A lens control apparatus comprising:

a first lens for performing a magnification operation;

a second lens for correcting movement of a focal plane during movement of said first lens;

lens moving means for moving said first and second lenses in a direction of an optical axis for a zooming operation;

storage means for prestoring in-focus positions of said second lens when first lens positions are at predetermined positions;

focusing position calculating means for calculating an in-focus position of said second lens by using current positions of said first and second lenses and information stored in said storage means, when the current position of the first lens is between the predetermined positions; and moving speed calculating means for calculating a moving speed of said second lens by using a difference between the current position of said second lens and the in-focus position thereof calculated by said focusing position calculating means, in response that said first lens passes each of the predetermined positions of said first lens during a zooming operation.

14. An apparatus according to claim 13, wherein said storage means comprises a table stored in a lens control microcomputer.

15. An apparatus according to claim 13, wherein said moving speed calculating means calculates a next lens moving speed every time the discrete position is passed.

16. An apparatus according to claim 15, wherein said first lens is a magnification lens, and said second lens is a focus compensation lens.

17. An apparatus according to claim 13, wherein said first and second lenses are driven by stepping motors, respectively.

18. A lens control apparatus comprising:

a first lens for performing a magnification operation;

a second lens for correcting movement of an in-focus position during movement of said first lens;

first lens moving means for moving said first lens in a direction of an optical axis;

second lens moving means for moving said second lens in the direction;

focusing position storage means for storing in-focus positions of said second lens when first lens positions are at predetermined positions of said first lens;

focusing position calculating means for calculating an in-focus position of said second lens by using current positions of said first and second lenses and information stored in said focusing position storage means when the current position of the first lens is between the predetermined positions; and control means for controlling said second lens moving means according to result of calculation by said focusing position calculating means and for controlling said first lens moving means to change a moving speed of said first lens when a moving speed of said second lens exceeds a predetermined value during movement of said first lens, said control means changes the predetermined value in accordance with the position of said second lens.

19. An apparatus according to claim 18, wherein said control means controls said stepping motor to change the moving speed of said first lens in accordance with a distance between the current position of said second lens and the focused position of said second lens which is calculated by said focusing position calculating means when the moving speed of said second lens exceeds a predetermined value during movement of said first lens.

20. An apparatus according to claim 18, wherein said control means controls said stepping motor to change the moving speed of said first lens while the moving speed of said second lens is kept at a predetermined value when the moving speed of said second lens exceeds the predetermined value during movement of said first lens.

21. An apparatus according to claim 18, wherein said control means changes the predetermined value in accordance with the object distance.

* * * * *

UNITED STATES PATENT AND TRADEMARK OFFICE
CERTIFICATE OF CORRECTION

PATENT NO. : 6,314,240 B1
DATED : November 6, 2001
INVENTOR(S) : Hiroto Okawara

It is certified that error appears in the above-identified patent and that said Letters Patent is hereby corrected as shown below:

Column 2,
Line 37, delete "$Z_{d2}$," and insert -- $Z_2$ --.

Column 8,
Line 61, delete "a-wide" and insert -- a wide --.

Column 22,
Line 49, delete "zX" and insert -- $z_x$ --.

Column 24,
Line 29, delete "step 714)." and insert -- (step 714) . --.
Line 36, delete "step 717)," and insert -- (step 717), --.
Line 51, delete "px" and insert -- $p_x$ --.
Line 52, delete "step 717)," and insert -- (step 717), --.

Column 25,
Line 10, delete "$A_{(yk)}$" and insert -- $A_{(y>k)}$ --.

Column 26,
Line 58, delete "Si" and insert -- Sl --.

Column 29,
Line 29, delete "Zk" and insert -- $Z_k$ --.
Line 38, delete "or$z_{k-1}$" and insert -- or $z_{k-1}$ --.
Line 52, delete "value a" and insert -- value $\alpha$ --.

Column 31,
Line 4, delete "an d" and insert -- and --.
Line 21, delete "exceed s" and insert -- exceeds --.

UNITED STATES PATENT AND TRADEMARK OFFICE
CERTIFICATE OF CORRECTION

PATENT NO.    : 6,314,240 B1
DATED         : November 6, 2001
INVENTOR(S)   : Hiroto Okawara It is certified that error appears in the above-identified patent and that said Letters Patent is hereby corrected as shown below:

<u>Column 43,</u>
Line 19, delete "by a" and insert -- by $\alpha$ --.

<u>Column 44,</u>
Line 57, delete "positions in response" and insert -- positions stored in said storage means in response --.

Signed and Sealed this

Eighteenth Day of March, 2003

JAMES E. ROGAN
*Director of the United States Patent and Trademark Office*